United States Patent [19]

Sato et al.

[11] Patent Number: 5,450,254
[45] Date of Patent: Sep. 12, 1995

[54] AUTOMATIC CASSETTE CHANGER

[75] Inventors: Keiji Sato; Motofumi Itawaki; Yoshitaka Otonomiya; Tetsuro Tsubota; Wataru Nonaka, all of Kanagawa, Japan

[73] Assignee: Sony Corporation, Tokyo, Japan

[21] Appl. No.: 971,070

[22] Filed: Nov. 3, 1992

[30] Foreign Application Priority Data

Nov. 5, 1991 [JP] Japan .................. 3-315196

[51] Int. Cl.$^6$ ............................. G11B 15/68
[52] U.S. Cl. ...................... 360/71; 360/85; 360/94; 360/92; 360/96.5
[58] Field of Search ............... 360/92, 71, 96.5, 132, 360/94; 369/36

[56] References Cited

U.S. PATENT DOCUMENTS

| | | |
|---|---|---|
| 3,561,614 | 2/1971 | Tezuka et al. . |
| 4,229,136 | 10/1980 | Panissidi . |
| 4,527,262 | 7/1985 | Manto .................. 369/33 |
| 4,607,354 | 7/1986 | Ishibashi et al. .......... 369/36 X |
| 4,827,463 | 5/1989 | Motoyoshi et al. ......... 369/36 |
| 4,860,133 | 8/1989 | Baranski .................. 360/92 |
| 4,907,889 | 3/1990 | Simone .................. 360/92 |
| 4,945,430 | 7/1991 | Konishi et al. . |
| 5,019,927 | 5/1991 | Simone .................. 360/92 |
| 5,032,939 | 7/1991 | Minara et al. ........... 360/96.5 X |
| 5,036,503 | 7/1991 | Tomita .................. 360/92 X |
| 5,040,159 | 8/1991 | Oliver et al. .............. 369/34 |
| 5,043,962 | 8/1991 | Wagner et al. ............ 369/36 |
| 5,101,304 | 3/1992 | Sakumoto et al. ......... 360/96.5 |
| 5,157,565 | 10/1992 | Domel .................. 360/92 |
| 5,182,687 | 1/1993 | Campbell et al. .......... 360/92 |
| 5,253,246 | 10/1993 | Leonhardt et al. ........ 360/132 X |
| 5,264,974 | 11/1993 | Campbell et al. .......... 360/92 |
| 5,274,516 | 12/1993 | Kakuta et al. ............ 360/92 |

FOREIGN PATENT DOCUMENTS

| | | |
|---|---|---|
| 704864 | 4/1968 | Belgium . |
| 0145268 | 6/1985 | European Pat. Off. . |
| 288165 | 10/1988 | European Pat. Off. . |
| 0289986 | 11/1988 | European Pat. Off. . |
| 334257 | 9/1989 | European Pat. Off. . |
| 8713515 U | 12/1987 | Germany . |
| 59-213541 | 5/1986 | Japan . |
| 60-57404 | 9/1986 | Japan . |
| 61-86407 | 10/1987 | Japan . |
| 2-113465 | 4/1990 | Japan . |
| WO91/07731 | 5/1991 | WIPO . |
| 9106100 | 5/1991 | WIPO . |

OTHER PUBLICATIONS

JP1-66858 Mar. 1989 Japan Yamamoto.
Patent Abstracts of Japan, vol. 11, No. 49 (P-547) (Feb. 14, 1987) & JP-A-61 216 154 (Sep. 25, 1986).

Primary Examiner—Aristotelis Psitos
Assistant Examiner—Jim Habermehl
Attorney, Agent, or Firm—William S. Frommer; Alvin Sinderbrand

[57] ABSTRACT

An automatic cassette changer wherein a plurality of types of cassettes having different recording formats can be used. The automatic cassette changer comprises a plurality of types of cassettes in which different types of record media having different recording formats are accommodated, a cassette storage rack having a plurality of bins for storing the cassettes therein, a plurality of recording and/or reproducing apparatus each provided for selectively recording and/or reproducing a format signal in accordance with a selected one of the recording formats of the plurality of types of cassettes, and a transport mechanism for selectively transporting the cassettes between the bins and the recording and/or reproducing apparatus.

17 Claims, 62 Drawing Sheets

F I G. 7
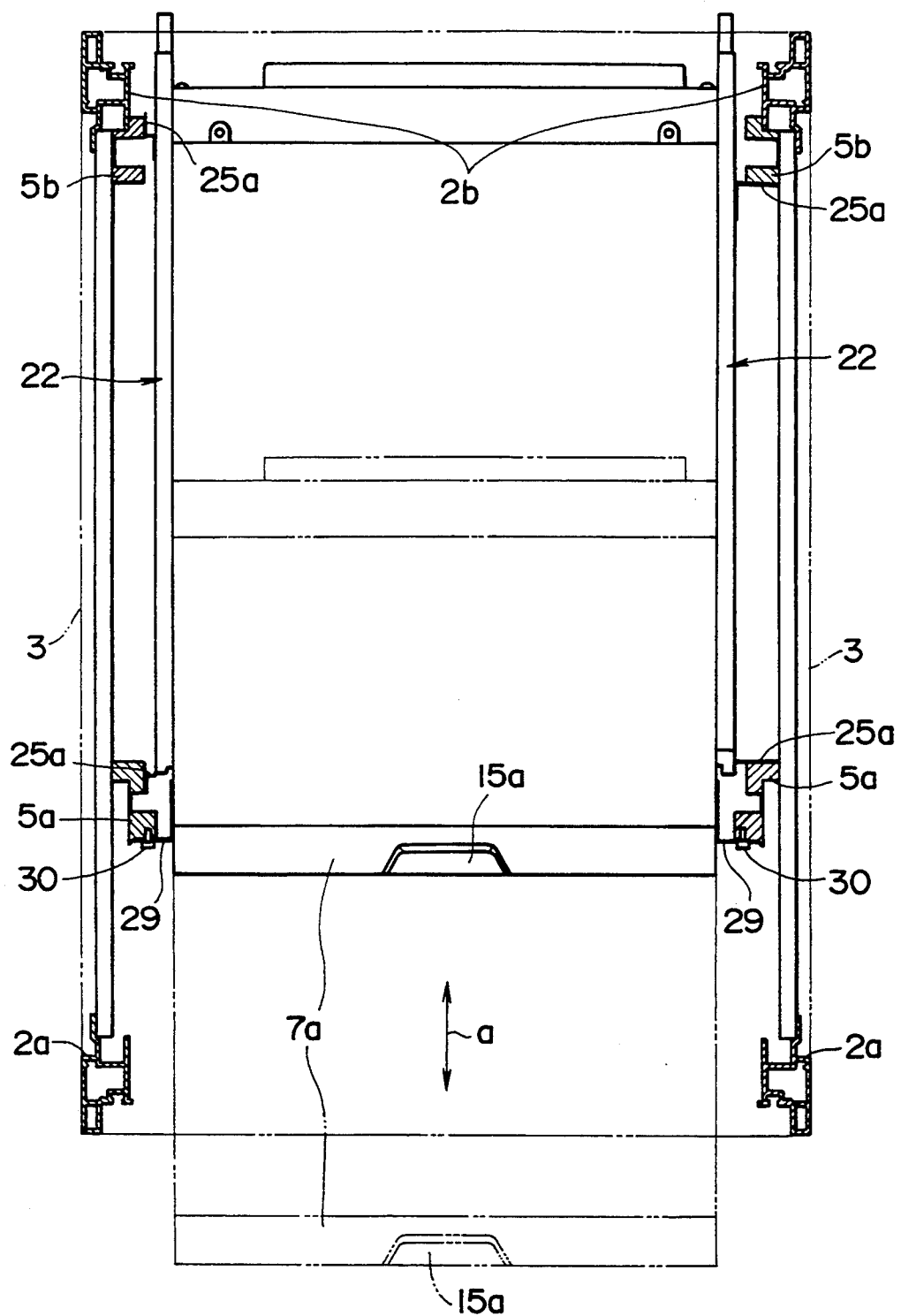

F I G. 30
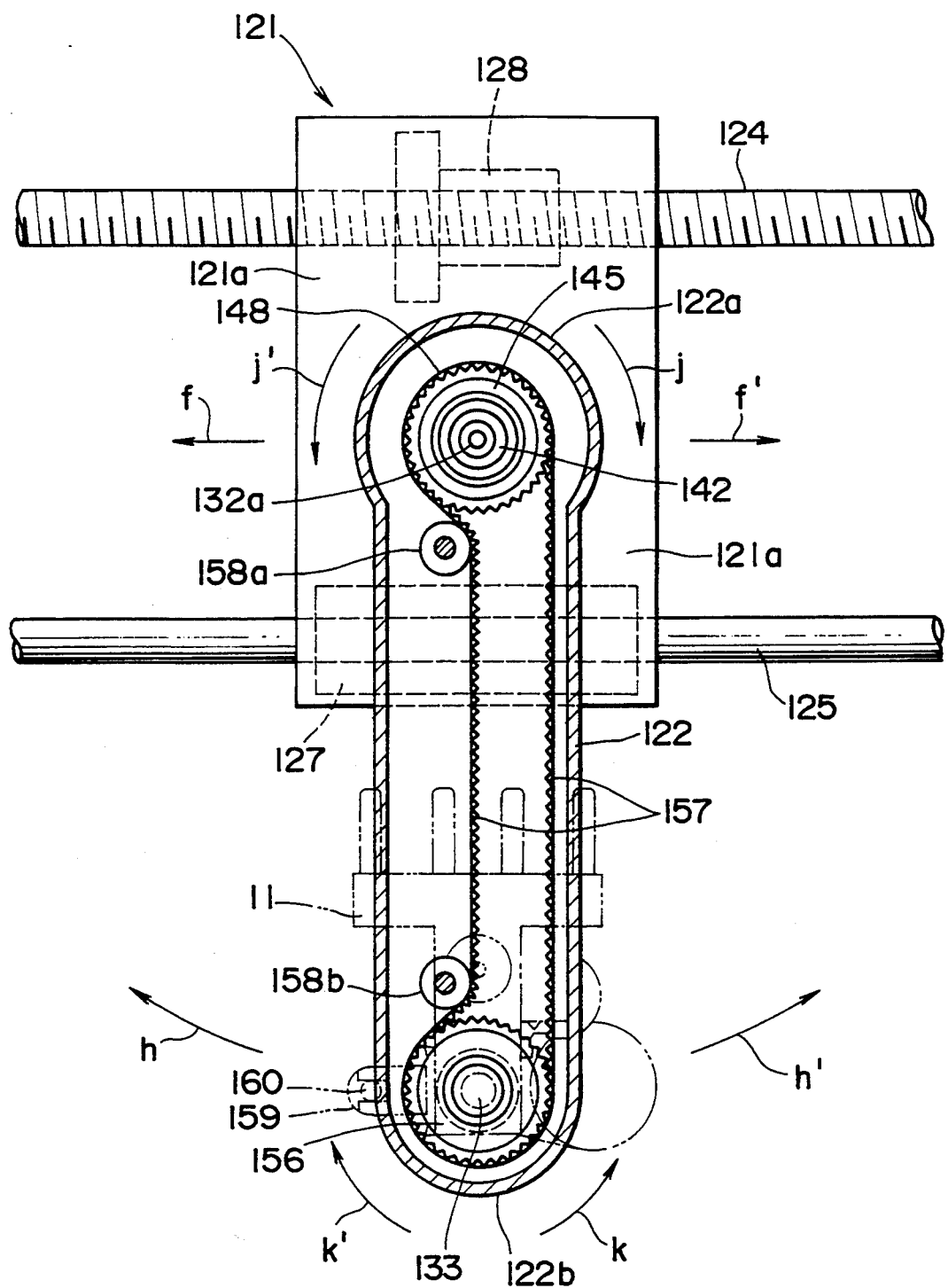

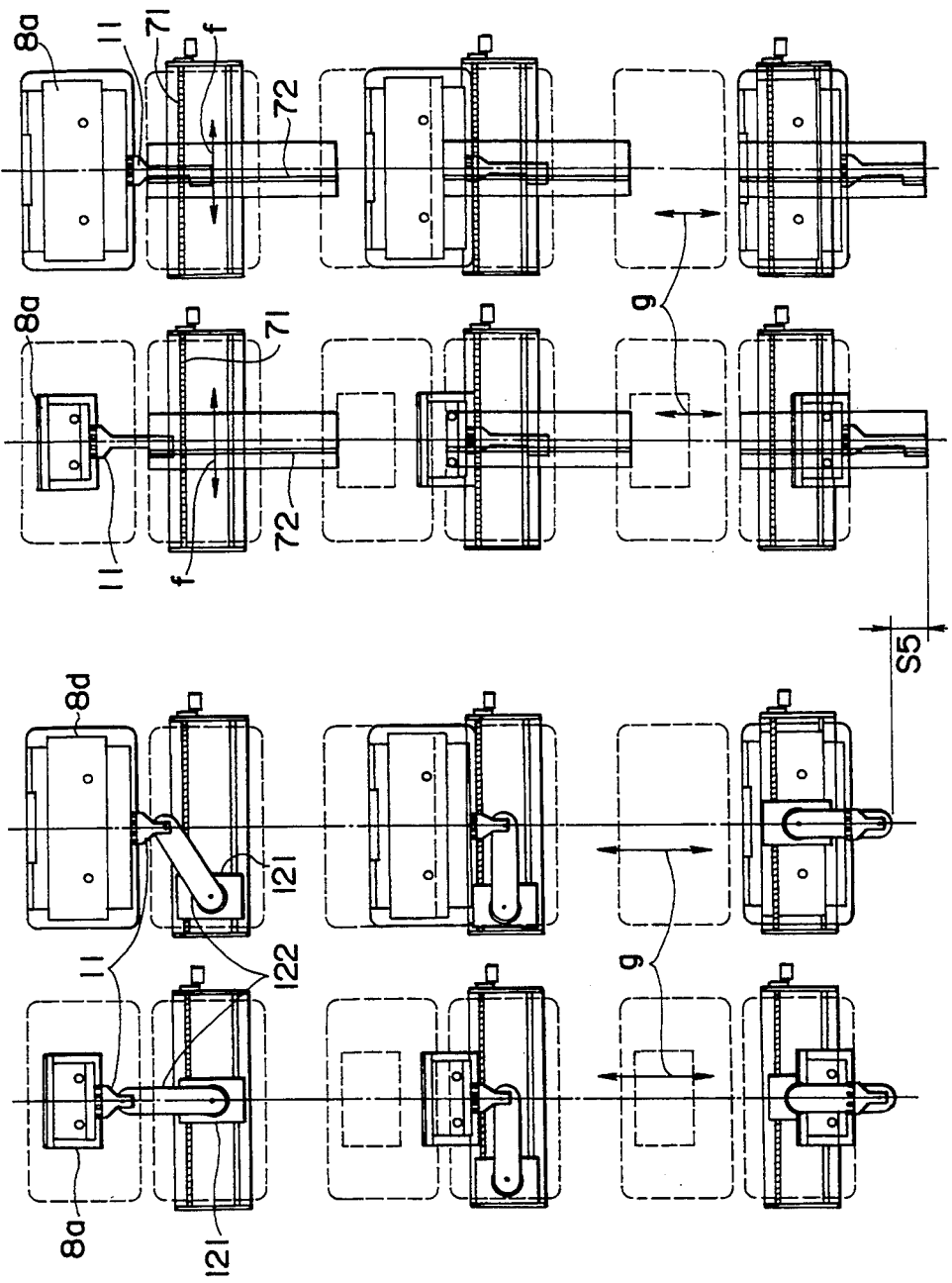

F I G. 40
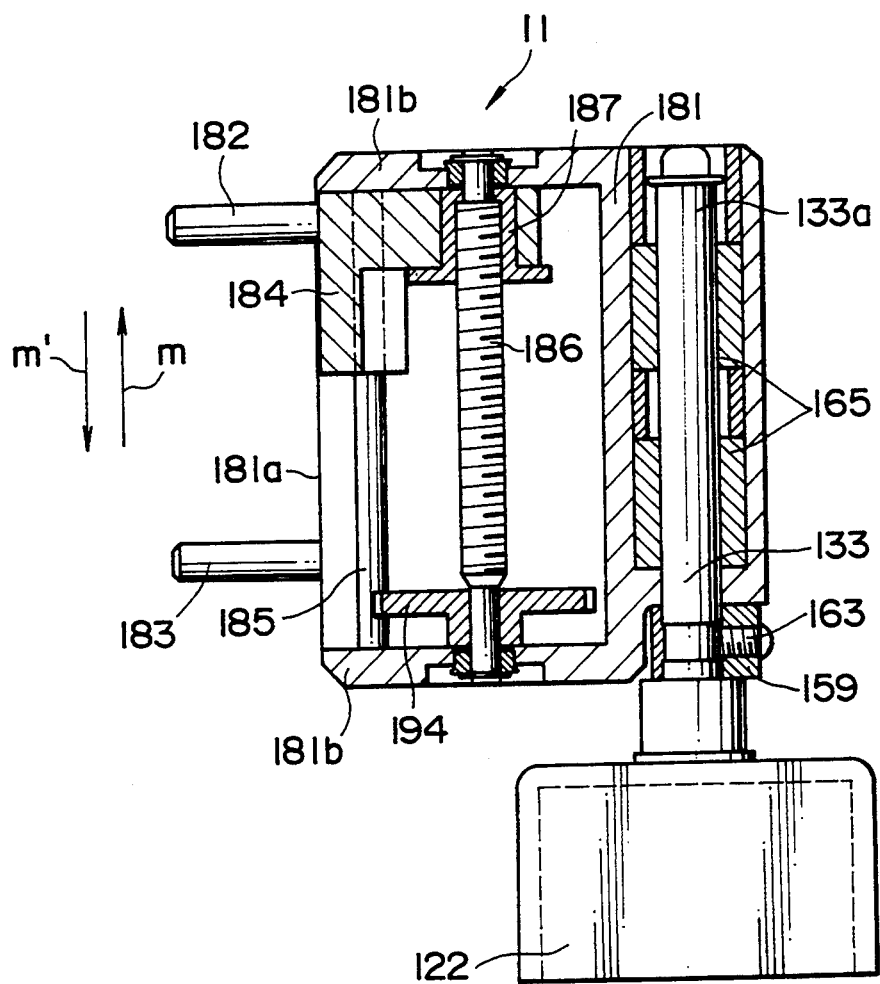

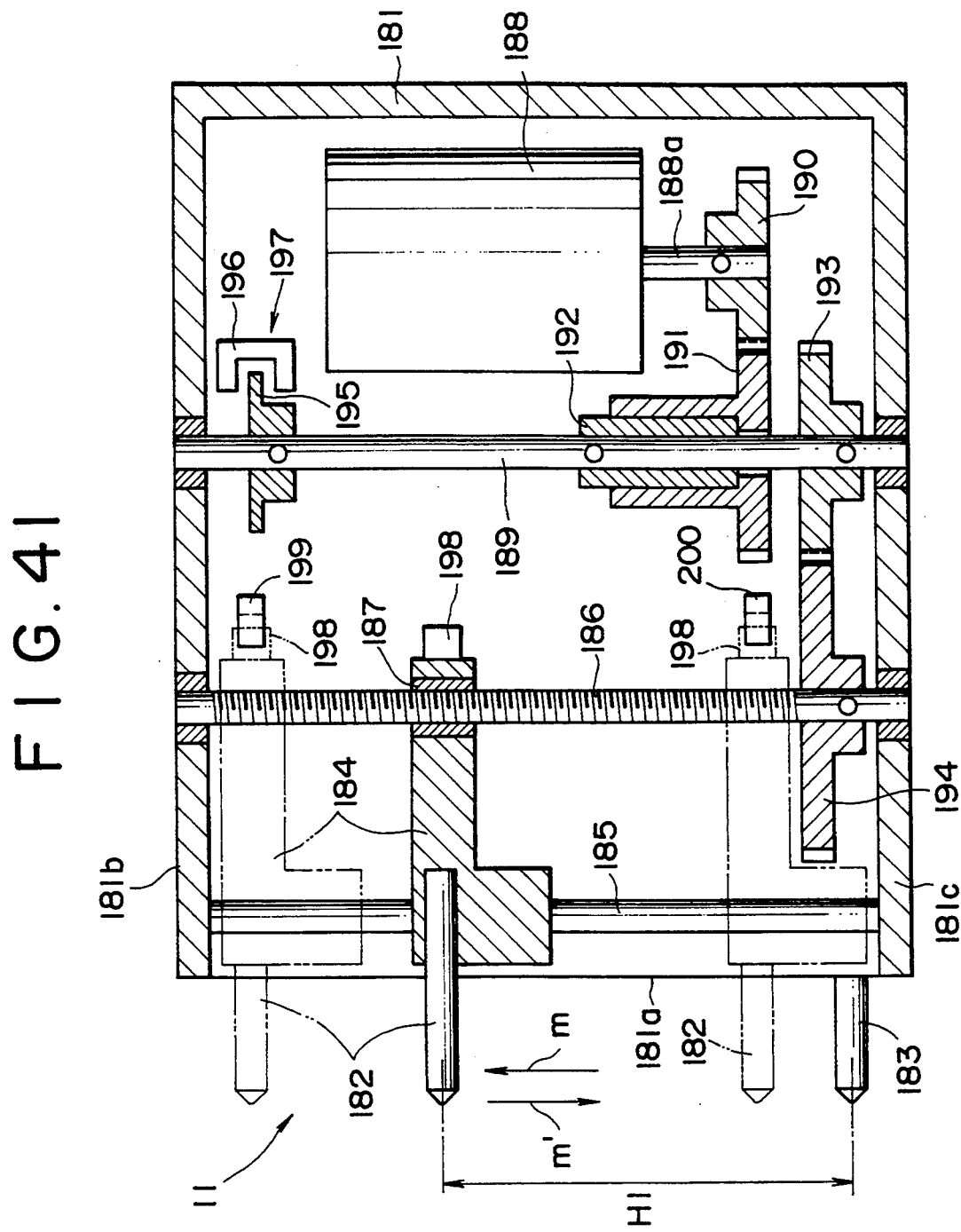

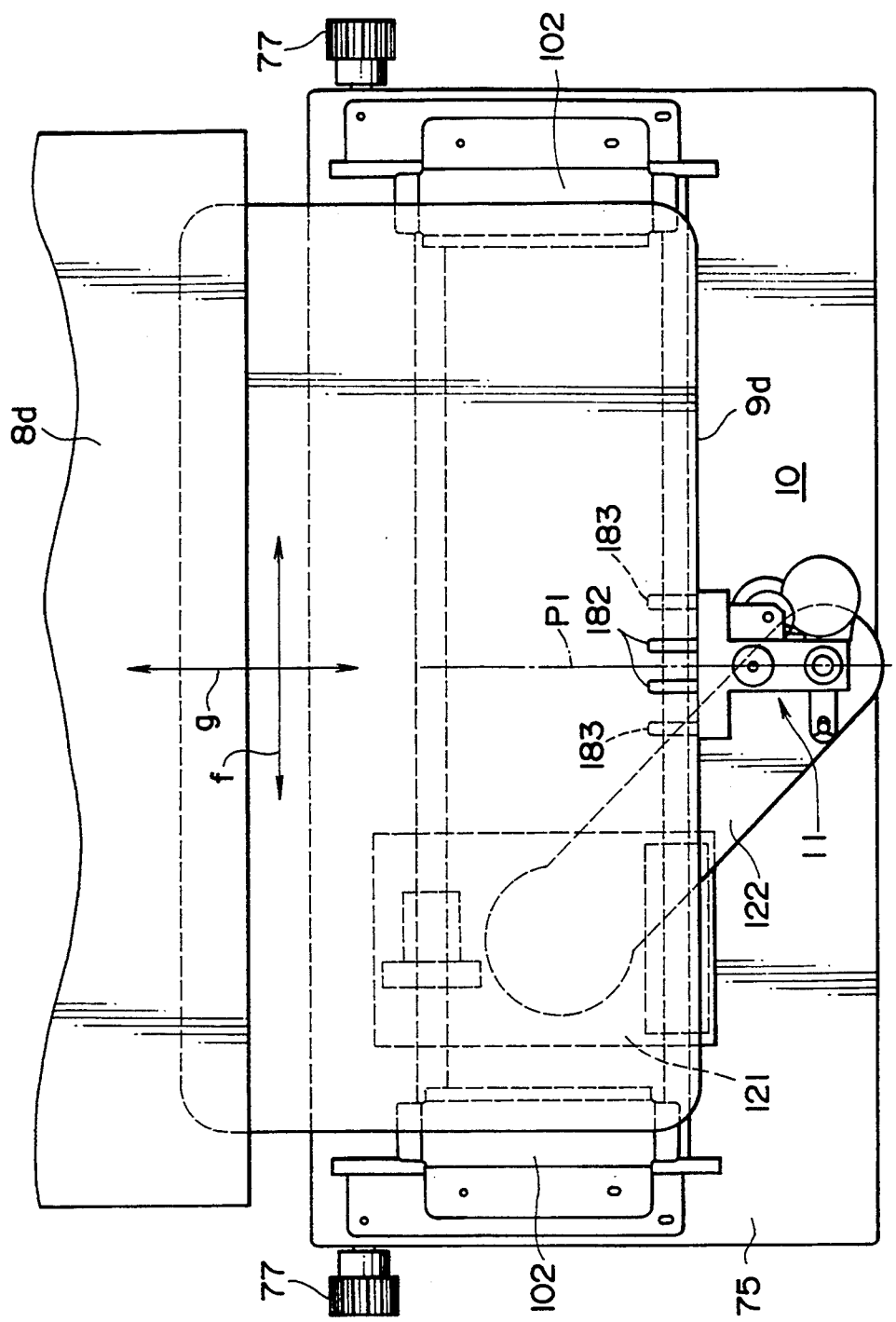

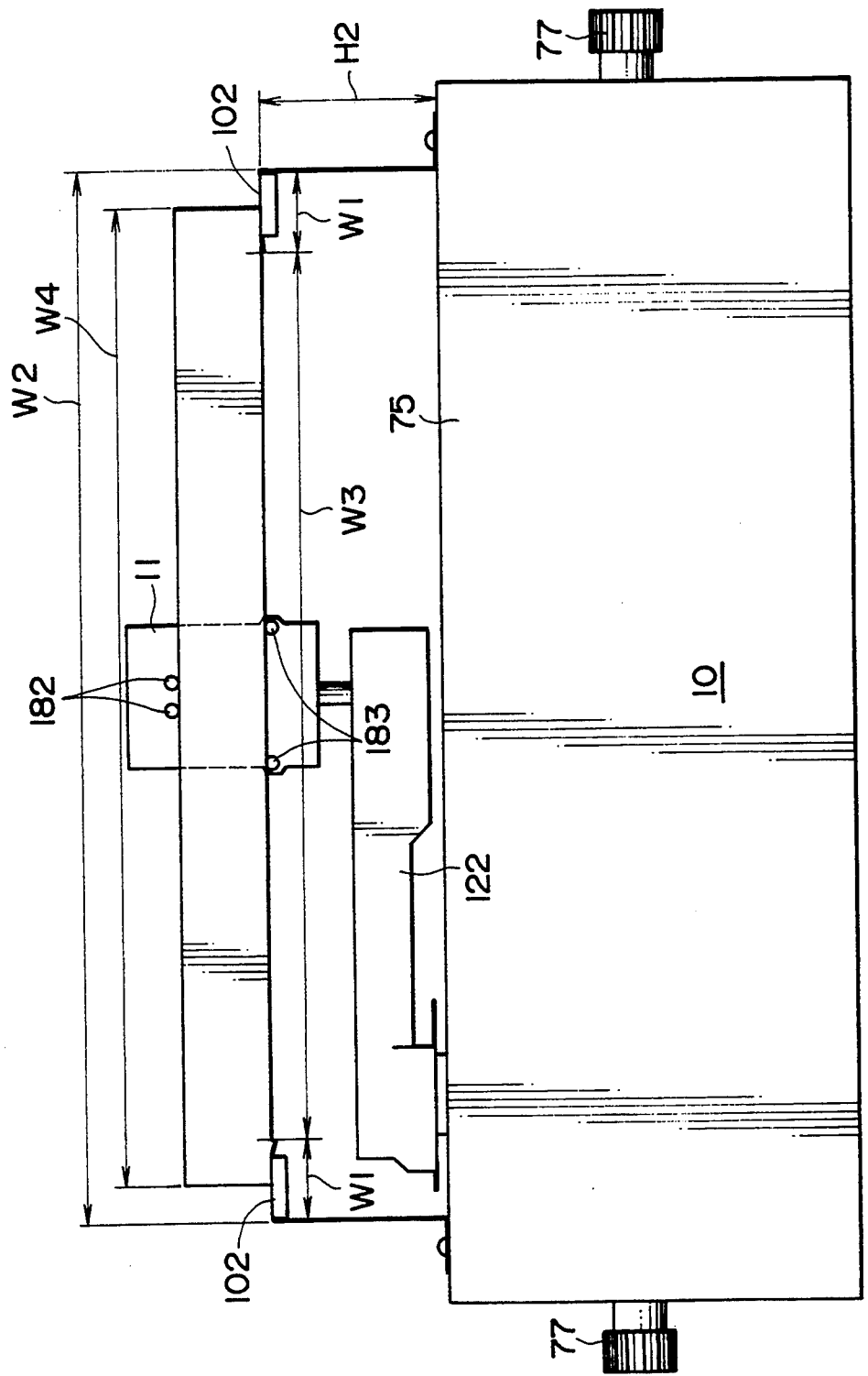

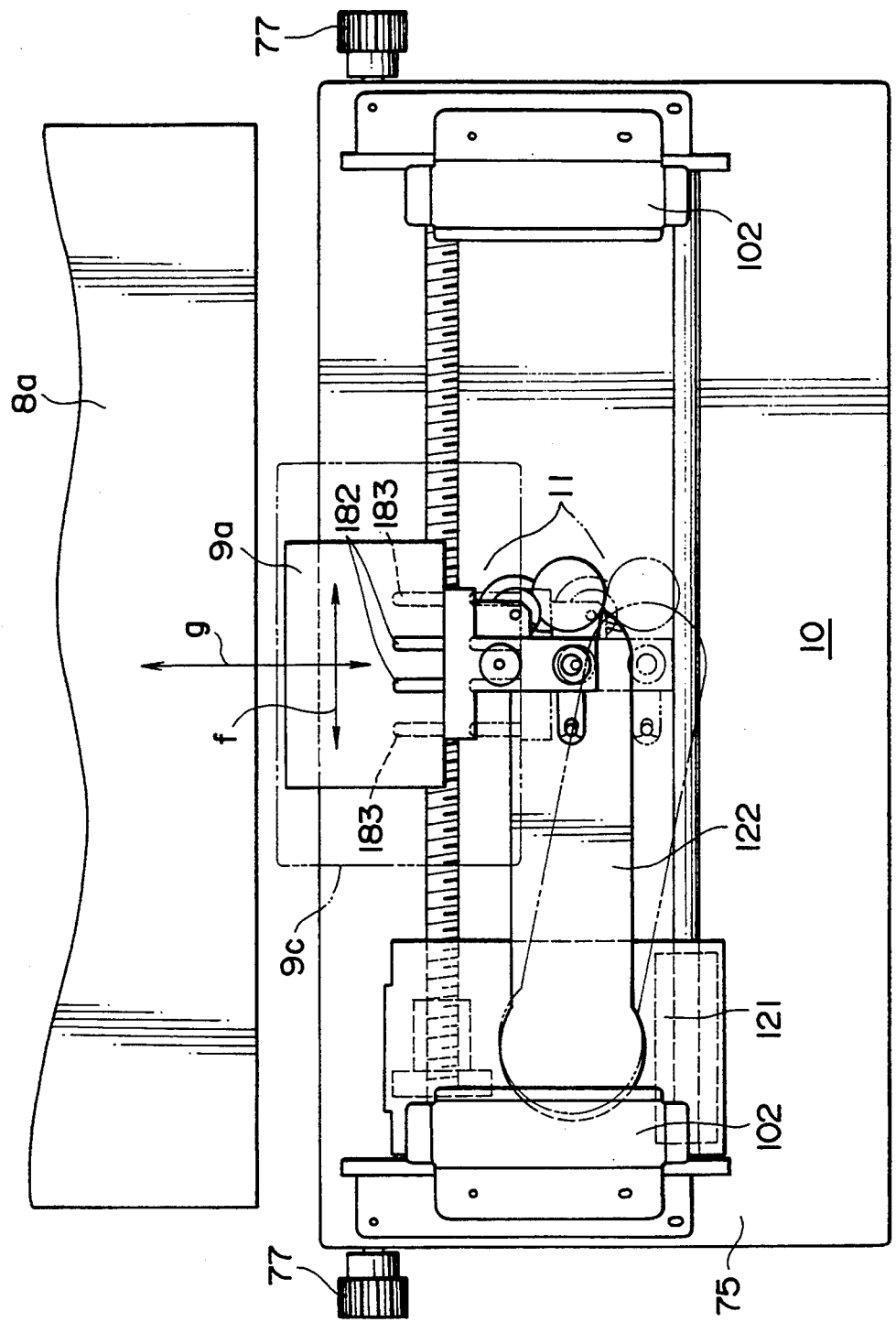

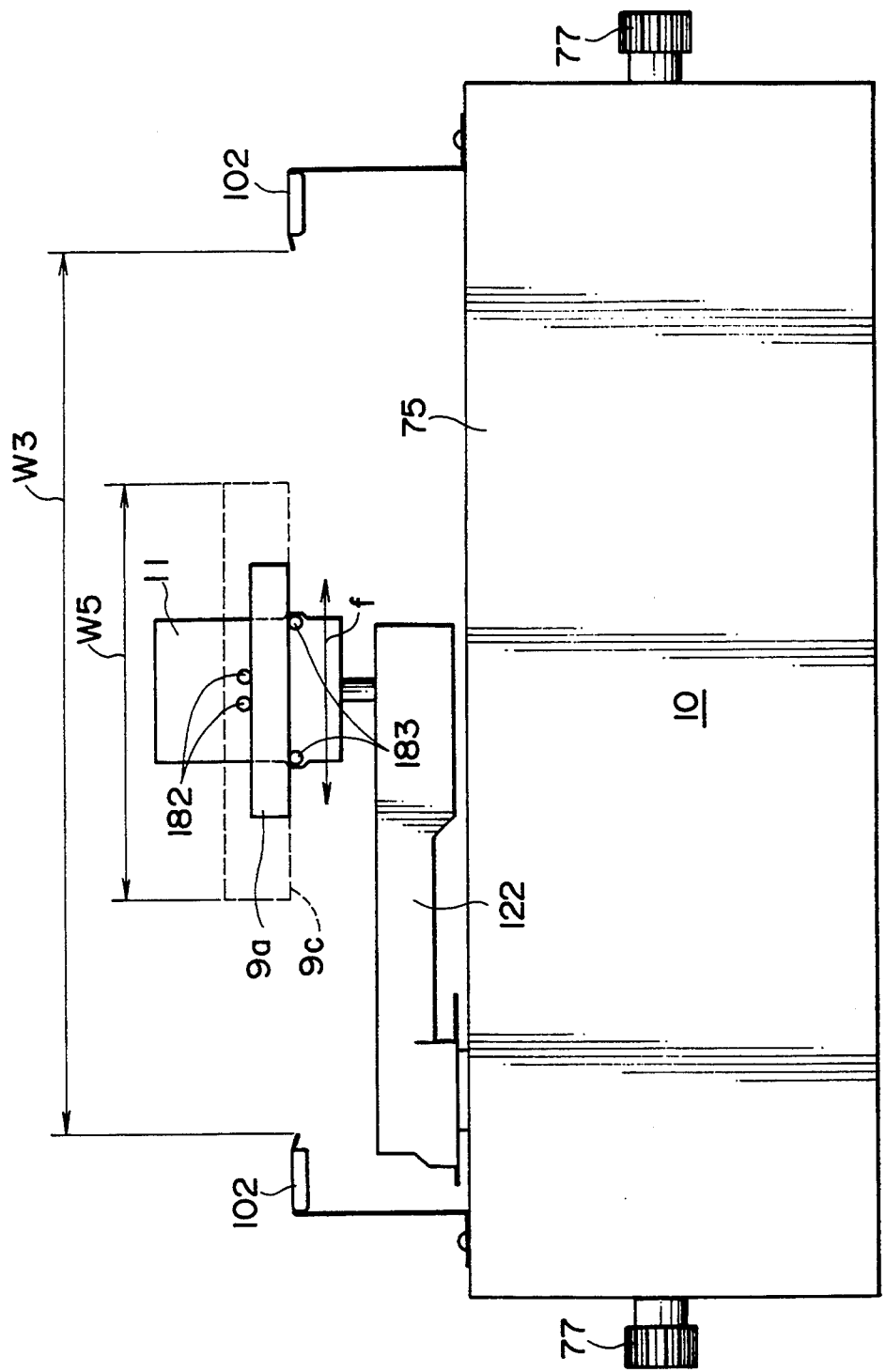

F I G. 57(A)
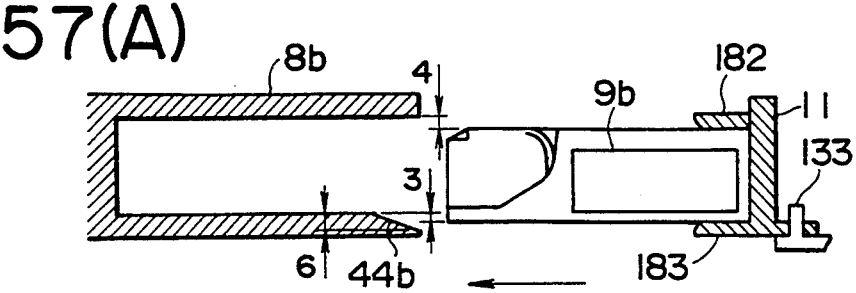
F I G. 57(B)
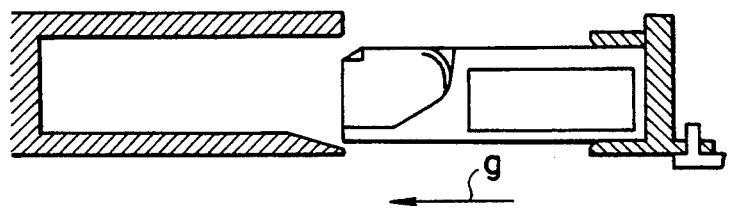
F I G. 57(C)
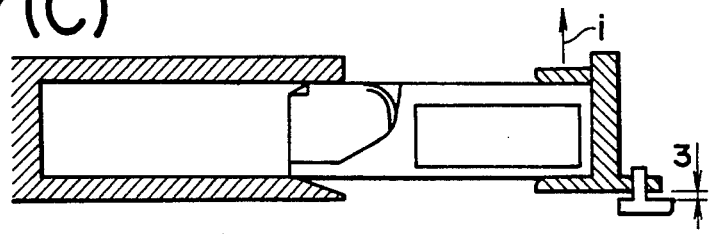
F I G. 57(D)
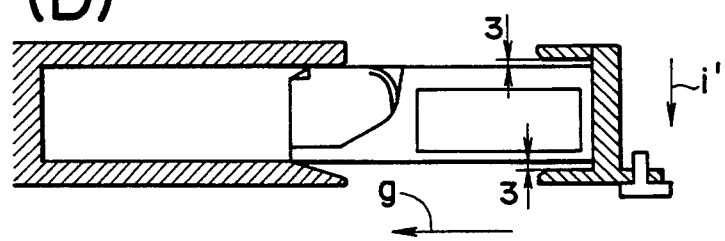
F I G. 57(E)
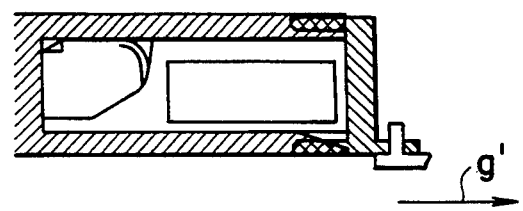
F I G. 57(F)
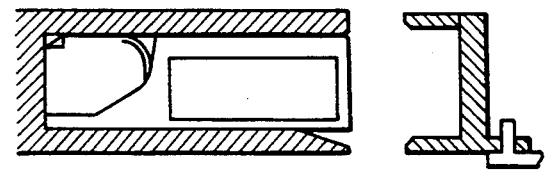

AUTOMATIC CASSETTE CHANGER

BACKGROUND OF THE INVENTION

1. Field on the Invention

This invention relates to an automatic cassette changer which automatically exchanges various cassettes in which record media in the form of tapes or disks are accommodated to effect continuous recording and/or reproduction of the cassettes over a long period of time.

2. Description of the Prior Art

An automatic cassette changer for a television broadcasting station wherein a plurality of types of cassettes having different sizes are automatically exchanged to effect continuous reproduction, recording or edition of video signals over a long period of time has been proposed by the assignee of the present patent application and is disclosed, for example, in Japanese Patent Laid-Open Application No. 1-243265.

The automatic cassette changer is convenient in that cassettes of different sizes are selectively used in such a manner that a small cassette is used to televise a video signal for a comparatively short period of time such as a commercial, but a large cassette is used to televise a video signal for a comparatively long period of time such as a news program or other type of program.

This prior art automatic cassette changer, however, can handle only cassettes wherein the tapes thereof have a common recording format. Consequently, it is impossible to properly use a plurality of types of cassettes wherein the tapes have different recording formats such as tapes which have been recorded with different video cameras having different recording formats.

Also, an automatic cassette changer with a transport mechanism wherein a plurality of cassettes are successively exchanged to effect continuous reproduction, recording editing or the like over a long period of time has been proposed by the assignee of the present patent application and disclosed, for example, in Japanese Patent Application No. 3-156382.

The automatic cassette changer with a cassette transport mechanism includes two loading mechanisms including a main cassette loading mechanism and an auxiliary cassette loading mechanism, by means of which a cassette loading operation having a long stroke can be performed compactly.

With the automatic cassette changer which has a transport mechanism, however, the cassette loading mechanisms cannot be moved with respect to the transport mechanism in a direction perpendicular to the direction for inserting or removing a cassette, and the movement in the perpendicular direction can be achieved only by horizontal movement of the entire transport mechanism.

Accordingly, in the prior art automatic cassette changer, the entire transport mechanism must be moved in the vertical direction and the leftward and rightward horizontal direction, which makes the moving apparatus large. Thus, it is impossible to freely select the position for transferring a cassette in a direction perpendicular to the cassette inserting or removing direction with the transport mechanism simply being moved only in the vertical direction.

The automatic cassette changer disclosed in Japanese Patent Laid-Open Application No. 3-156382 is further constructed such that the transport mechanism includes a pair of upper and lower cassette holding pawls mounted for pivotal motion in the upward and downward directions such that a cassette is held in its thicknesswise direction by and between the cassette holding pawls to effect insertion or removal of the cassette into or from a cassette storage rack or the recording and reproducing apparatus.

With the automatic cassette changer, however, if the transport mechanism is displaced or offset in the vertical direction with respect to the cassette storage rack and the recording and reproducing apparatus, then, when a cassette is to be inserted from the transport mechanism into the cassette storage rack or the recording and reproducing apparatus, an end of the cassette may be abutted with and pinched in the cassette storage rack or the recording reproducing apparatus, each of which is quite rigid so that the cassette cannot be inserted farther than an intermediate position. On the other hand, when a cassette is to be removed from the cassette storage rack or the recording and/or reproducing apparatus there is a problem in that an end of the cassette may be pinched and stopped in the cassette storage rack of the recording/reproducing apparatus so that the cassette holding pawls to slip off the cassette, and consequently, the cassette cannot be withdrawn beyond an intermediate position.

Incidentally, in an automatic cassette changer of the type mentioned, a cassette which is discharged, for example, from the recording and reproducing apparatus does not always assume a correct position but instead assumes, in most cases, an inclined position within a horizontal plane with respect to the transport mechanism, due to the structure of the automatic cassette changer. Further, the relative distances between the transport mechanism and the cassette storage rack and the recording and reproducing apparatus, respectively, in the cassette inserting or removing direction are liable to present a considerable displacement.

With the automatic cassette changer disclosed in Japanese Patent Laid-Open Application No. 3-156382, however, when a cassette discharged, for example, from the recording and reproducing apparatus is to be held by and between the cassette holding pawls and taken into the transport mechanism, it is impossible to correct the inclination of the cassette with respect to the transport mechanism or to compensate for displacement between the cassette and the transport mechanism. Accordingly, there are difficulties in that the cassette is held in an unstable posture and in an inclined condition by and between the cassette holding pawls and the position at which the cassette is held by and between the cassette holding pawls is within such a narrow range that the cassette cannot be held with certainty.

Further, since this prior art automatic cassette changer cannot cope with cassettes having different thicknesses, it is difficult to provide an automatic cassette changer in which a plurality of types of cassettes having different thickness in accordance with different recording formats can be used.

Moreover, when a cassette is to be held from above and below between a pair of cassette holding pawls mounted for upward and downward pivotal motion as in the prior art automatic cassette changer, when it is desired to hold cassettes of varying thickness in accordance with diverse recording formats such as, for example, an 8 mm tape cassette and a digital tape cassette, one of the various types of cassette may not be held stably between the cassette holding pawls.

Accordingly, the prior art automatic cassette changer can handle only cassettes of uniform thickness, and it is difficult to provide an automatic cassette changer in which a plurality of cassettes having different thicknesses in accordance with diverse recording formats can be used to effect continuous video signal reproduction, recording, editing or the like over a long period of time.

A further automatic cassette changer has been proposed by the assignee of the present patent application and is disclosed in Japanese Patent Laid-Open Application No. 1-151448 wherein plurality of types of cassettes having different large and small sizes can be automatically exchanged to effect continuous video signal reproduction, recording, editing or the like over a long period of time.

This automatic cassette changer is convenient in that cassettes of different sizes are selectively used in such a manner that a small cassette is used to televise a video signal for comparatively short period of time such as a commercial, but a large cassette is used to televise a video signal for a comparatively long period of time such as a news program or other type of program.

This automatic cassette changer, however, can handle only cassettes wherein the tapes have a common recording format. Consequently, it is impossible to use a plurality of types of cassettes wherein the tapes have different recording formats such as tapes which have been recorded with difference video cameras having different recording formats.

In particular, one problem encountered with a automatic cassette changer that uses a plurality of types of cassettes having tapes of different recording formats and tape widths of ¾ inches, ½ inch, 8 mm and so forth is that a cassette of the wrong type, such as a medium size cassette with ½ inch tape or a small cassette with 8 mm tape, may sometimes be inserted erroneously into a storage rack for large cassettes with ¾ inch tape.

Another automatic cassette changer with a transport mechanism has been proposed by the assignee of the present patent application and is disclosed in Japanese Patent Application No. 3-204265 wherein a plurality of types of cassettes can automatically be exchanged to effect continuous video signal reproduction, recording, editing or the like over a long period of time.

This automatic cassette changer includes a transport mechanism that moves itself by means of a motor provided on the transport mechanism itself. The transport mechanism moves, in a vertical direction along a vertical rack provided on the body of the automatic cassette changer, and the entire automatic cassette changer is of a compact design.

With this automatic cassette changer, however, a pair of left and right travel guides for the transport mechanism are each formed by a fixed rail mounted on the automatic cassette changer body and extending in a direction perpendicular to the cassette inserting or removing direction, and a plurality of guide rollers are mounted on a transport mechanism and maintained in contact in the cassette inserting or removing direction with the fixed rail, and accordingly, it is difficult to restrict the movement or play of the transport mechanism in the leftward or rightward direction, that is, in a direction perpendicular to the cassette inserting or removing direction.

In order to restrict the movement of the transport mechanism in the leftward or rightward direction, an additional fixed rail extending in parallel to the cassette inserting and removing direction and a plurality of additional guide rollers normally held in contact with the additional fixed rail in a direction perpendicular to the cassette inserting or removing direction must be provided. This causes the overall size of the automatic cassette changer to be excessive, on account of the space occupied by the travel guides in the leftward and rightward directions, that is, in the direction perpendicular to the cassette inserting and removing direction, and also in the forward and backward directions, that is, in the cassette inserting and removing direction.

The prior art automatic cassette changer disclosed in Japanese Patent Laid-Open Application No. 243265 further has a disadvantage in that any cassette, whether of the large or small size, is positioned at the center of the transport mechanism by means of a cassette guide disposed in the transport mechanism, so that the position at which a cassette, for example, of the small size, is transferred to or from the cassette storage rack or the recording and reproducing apparatus cannot be selected freely in a direction perpendicular to the cassette inserting and removing direction.

Also the prior art automatic cassette changer disclosed in Japanese Patent Laid-Open Application No. 3-156382 has a further drawback in that it cannot handle a plurality of types of cassettes having different sizes.

The automatic cassette changer disclosed in Japanese Patent Laid-Open Application No. 3-156382 includes two loading mechanisms including a main cassette loading mechanism and an auxiliary cassette loading mechanism, by means of which a cassette loading operation having a long stroke can be performed.

With this type of automatic cassette changer, however, a cassette is transferred from or to the recording and reproducing apparatus by successive transferring operations of the two loading mechanisms, i.e. both of the main cassette loading mechanism and the auxiliary cassette loading mechanism. Consequently, a cassette cannot-be transferred from or to the recording and reproducing apparatus by operation only of the pair of upper ad lower cassette holding pawls constituting the main cassette loading mechanism.

Further, when a cassette is to be, for example, inserted into the recording and reproducing apparatus, it is impossible to push the cassette to a deep position at which a cassette insertion detecting switch provided at an interior position in the recording and reproducing apparatus is switched on, because the cassette is held in its thicknesswise direction between the upper and lower cassette holding pawls and there is a limit to the depth to which the cassette holding pawls can insert the cassette.

Particularly when the recording and reproducing apparatus is constructed so as to accept cassettes of the large and small sizes, in order to assure that a cassette of the large size is held securely by the cassette holding pawls, the cassette holding pawls must necessarily have a considerable length, but if the cassette holding pawls are too long, then the depth to which they can insert a cassette into the recording and reproducing apparatus is further restricted. Consequently, it is impossible to push a cassette of the small size in to an interior position in the recording and reproducing apparatus so that the front end face of the small size cassette may be positioned in registration with the position for a front end face of a cassette of the large size.

SUMMARY OF THE INVENTION

It is an object of the present invention to provide an automatic cassette changer wherein a plurality of types of cassettes having different recording formats can be used.

It is another object of the present invention to provide an automatic cassette changer wherein a transport mechanism is moved in only one direction but the position at which a cassette is transferred can be freely selected in a direction perpendicular to the direction in which the cassette is to be inserted into or removed from the transport mechanism.

It is further object of the present invention to provide an automatic cassette changer wherein, even if a transport mechanism is displaced by a small amount in a vertical direction from a cassette storage rack and a recording and reproducing apparatus, insertion or removal of a cassette into or from the cassette storage rack or the recording and reproducing apparatus can still be performed smoothly.

It is still further object of the present invention to provide an automatic cassette changer wherein, when a cassette discharged in an unstable posture and position from a recording and reproducing apparatus or some other apparatus is to be held in its thicknesswise direction by a holding mechanism and taken into a transport mechanism, an inclined position of the cassette can be corrected and a displacement between the cassette and the transport mechanism can be compensated for.

It is yet a further object of the present invention to provide an automatic cassette changer wherein cassettes having different thicknesses can be reliably and securely held and transported.

It is yet a further object of the present invention to provide an automatic cassette changer wherein a plurality of types of cassettes having different recording formats can be used and erroneous insertion of a cassette into an incorrect one of a plurality of cassette storage racks can be prevented.

It is yet a further object of the present invention to provide an automatic cassette changer in which the space occupied by travel guides for a transport mechanism is minimized while providing for stability of the transport mechanism during movement.

It is yet a further object of the present invention to provide an automatic cassette changer wherein a large and relatively heavy cassette can be transferred securely to and from a transport mechanism and the position at which a small cassette is transferred can be selected freely in a direction perpendicular to the direction in which the cassette is inserted into or removed from the transport mechanism.

It is an additional object of the present invention to provide an automatic cassette changer wherein a cassette can be pushed in positively and forcibly to a deep position within a recording and reproducing apparatus, while using only a pair of cassette holding members between which the cassette is held in its thicknesswise direction.

In order to attain these objects, according to one aspect of the present invention, there is provided an automatic cassette changer, which comprises a plurality of types of cassettes in which are accommodated different types of record media having different recording formats, a cassette storage rack having a plurality of bins for accommodating the cassettes therein, a plurality of recording and/or reproducing apparatus each provided for selectively recording and/or reproducing a format signal in accordance with a selected one of the recording formats of the plurality of types of cassettes, and a transport mechanism for selectively transporting the cassettes between the bins and the recording and/or reproducing apparatus.

In this automatic cassette changer, since the plurality of types of cassettes for which the recording formats are different from each other are stored in bins of the storage rack and the plurality of recording and/or reproducing apparatus each for selectively recording and/or reproducing a format signal in accordance with a selected one of the recording formats of the plurality of types of cassettes are accommodated in the automatic cassette changer so that the plurality of types of cassettes having different recording formats can be continuously recorded and/or reproduced successively with a single automatic cassette changer, continuous video signal reproduction, recording or editing over a long period of time can be performed with a single automatic cassette changer while using a plurality of types of cassettes having different recording formats.

The automatic cassette changer can be constructed as an apparatus for exclusive use by a particular user by employing a plurality of desired types of cassettes having different recording formats and a plurality of recording and/reproducing apparatus for the plurality of types of cassettes as desired by the user.

Preferably, the plurality of types of cassettes are stored in a plurality of storage units in each of which a plurality of cassettes of the same type are stored, and the storage units and the recording and/or recording apparatus are individually exchangeable with another unit or apparatus. With this automatic cassette changer, since the plurality of types of cassettes are stored in the plurality of storage units in each of which a plurality of cassettes of the same type are stored and the storage units and the recording and/or recording apparatus can be changed as desired, a plurality of types of cassettes which are different from each other of for which the recording formats are different can be selectively used as desired by the user. Preferably, each of the storage units has a first type detecting section representative of the type of the storage unit and each of the recording and/or reproducing apparatus has a second type detecting section representative of the type of the recording and/or reproducing apparatus while the transport mechanism has a type detecting sensor for reading the first or second type detecting portion to control operation of the transport mechanism. With the automatic cassette changer, since any of the first and second type detecting sensors provided for the storage units and the recording and/or reproducing apparatus is read by the type detecting sensor provided on the transport mechanism to determine the type of the storage unit or the recording and/or reproducing apparatus and control operation of the transport mechanism, the arrangement of the storage units and the recording and/or reproducing apparatus can be changed freely as desired by the user, and even if any one of the storage units and the recording and/or reproducing apparatus is exchanged for another unit or apparatus, automatic cassette changing operations can still be properly performed.

According to another aspect of the present invention, there is provided an automatic cassette changer, which comprises a plurality of cassettes in which record media are individually accommodated, a storage rack having a plurality of bins for storing cassettes therein, a plurality of recording and/or reproducing apparatus for selectively recording and/or reproducing the cassettes, and a transport mechanism for selectively transporting the cassettes between the bins and the recording and/or reproducing apparatus, the transport mechanism having the same hand block for holding a selected one of the cassettes and inserting or removing the selected cassette into or from a selected one of the bins and the recording and/or reproducing apparatus, the hand block being movable in a first direction in which the hand block inserts or removes the selected cassette into or from the selected one of the bins and the recording and/or reproducing apparatus and in a second direction perpendicular to the first direction.

In this automatic cassette changer, the hand block for holding a selected one of the cassettes and inserting or removing the selected cassette into or from a selected one of the bins and the recording and/or reproducing apparatus is provided on the transport mechanism and is disposed for movement in the first direction and the second direction perpendicular to the first direction, and the position at which the selected cassette is to be transferred can be freely selected in the second direction with respect to the transport mechanism while the transport mechanism is moved only in one direction such as in a vertical direction. Accordingly, any of the bins and cassette insertion openings of the recording and/or reproducing apparatus can be set freely in the second direction, and transfer of the selected cassette to any of them can be performed freely by means of the hand block alone without moving the transport mechanism in the second direction. Consequently, an automatic cassette changer which comprises a plurality of types of cassettes having different recording formats and a plurality of recording and/or reproducing apparatus for the plurality of types of cassettes can be satisfactorily designed.

Preferably, the transport mechanism includes a slider disposed for linear movement in the second direction and a pivotal arm mounted at an end thereof for pivotal motion on the slider and having the hand block mounted at the other end thereof, the pivotal arm being pivoted in the first direction with respect to the slider. In the automatic cassette changer, the hand block can be moved by the slider disposed for linear movement in the second direction and the pivotal arm mounted for pivotal motion in the first direction with respect to the slider. Consequently, the hand block can be moved linearly within a small space but with a long stroke in the first or cassette or removing direction. Further, the locus of the linear movement of the hand block can be selected freely in the second direction, that is, in the direction perpendicular to the first or cassette inserting or removing direction. Consequently, automatic exchanging of the cassettes of the different types, which may be different in size, can be achieved while employing a compact transport mechanism. The pivotal arm may include turning motion controlling means for controlling the hand block to turn in the direction opposite to the direction of pivotal motion of the pivotal arm in synchronism with pivotal motion of the pivotal arm to move the hand block in parallel direction. Thus, the hand block is controlled to be turned, using a turning motion controlling means such as a belt, in the direction opposite to the direction of pivotal motion of the pivotal arm in synchronism with pivotal motion of the pivotal arm so that it makes parallel movement. Consequently, the hand block is moved linear in the first direction while maintaining the hand block parallel to the storage rack and the recording and/or reproducing apparatus. Accordingly, while the hand block can be moved within a small space using the pivotal arm, transfer of the selected cassette by the hand block can be performed consistently smoothly by highly reliable linear movement of the hand block.

According to a further aspect of the present invention, there is provided an automatic cassette changer, which comprises a plurality of cassettes in which a record media are individually accommodated, a storage rack having a plurality of bins for storing the cassettes therein, a plurality of recording and/or reproducing apparatus for selectively recording and/or reproducing the cassettes, and a transport mechanism for selectively transporting the cassettes between the bins and the recording and/or apparatus, the transport mechanism including a hand block for holding a selected one of the cassettes in a thicknesswise direction of the selected cassette and driving means for driving the hand block to move in a direction in which the selected cassette is inserted into or removed from a selected one of the bins and the recording and/or reproducing apparatus, the hand block being supported for movement in the thicknesswise direction of the selected cassette with respect to the driving means.

In this automatic cassette changer, even if the transport mechanism is displaced vertically by a small distance from the storage rack and the recording and/or reproducing apparatus, when the selected cassette is to be inserted into or removed from a selected one of the bins of the storage rack and the recording and/or reproducing apparatus, the entire hand block is automatically moved in the thicknesswise direction of the selected cassette in accordance with the vertical position of the selected cassette, thereby providing an automatic centering function. Consequently, jamming of the selected cassette in the selected bin or in the recording and/or reproducing apparatus during insertion or removal can be prevented. Accordingly, even if the transport mechanism is displaced by a small distance in the vertical direction from the storage rack and the recording and/or reproducing apparatus, insertion or removal of the selected cassette into or from a selected one the bins of the storage rack and the recording and/or reproducing apparatus can always be performed smoothly, and consequently, the reliability of the entire system is greatly enhanced. Further, since a sufficient margin can be provided for the vertical displacement of the transport mechanism with respect to the storage rack and the recording and/or reproducing apparatus, tolerances can be relaxed for the components of the system and the accuracy in assembly of the components as well as the accuracy of the stopping position of the transport mechanism with respect to each of the bins of the cassette storage rack and the recording and/or reproducing apparatus, and consequently, reduction of the overall cost of the apparatus can be achieved. Further, a special servo circuit or the like for stopping the transport mechanism at a precise position with respect to a selected one of the bins of the storage rack and the recording and/or reproducing apparatus can be eliminated, and a further reduction of the overall cost of the apparatus can be achieved. Besides, there is no need to provide a special vertical displacement compensation mechanism to compensate for vertical displacement of the transport mechanism with respect to the storage rack and the recording and/or reproducing apparatus, and, in particular, a commercially available recording and-/or reproducing apparatus can be employed without modification, instead of using a specially designed recording and/or reproducing apparatus.

According to still a further aspect of the present invention, there is provided an automatic cassette changer, which comprises a plurality of cassettes in which record media are individually accommodated, a storage rack having a plurality of bins for accommodating the cassettes therein, a plurality of recording and/or reproducing apparatus for selectively recording and/or reproducing the cassettes, and a transport mechanism for selectively transporting the cassettes between the bins and the recording and/or reproducing apparatus, the transport mechanism including a hand block for holding a selected one of the cassettes in a thicknesswise direction of the selected cassette to insert or remove the selected cassette into or from a selected one of the bins and the recording and/or reproducing apparatus, the hand block including a pair of upper and lower cassette holding elements for holding the selected cassette therebetween and an opening and closing mechanism for opening and closing the cassette holding elements while keeping the cassette holding elements in parallel to each other. Preferably, one of the cassette holding elements of the hand block is fixed while the other cassette holding element is mounted for parallel movement with respect to the fixed cassette holding element.

In this automatic cassette changer, since the pair of cassette holding elements for holding a cassette in its thicknesswise direction are opened or closed while maintaining parallel positions to each other so that a cassette having one of several thicknesses can always be held with stability by and between the cassette holding elements, continuous video signal reproduction, recording or editing over a long period of time can be performed with the automatic cassette changer while using a plurality of types of cassettes having different recording formats. Also, the selected cassette can be transported reliably and it can be assured that the cassette being transported is not released from the hand block.

According to yet a further aspect of the present invention, there is provided an automatic cassette changer, which comprises a plurality of cassettes in which record media are individually accommodated, a storage rack having a plurality of bins for storing the cassettes therein, a plurality of recording and/or reproducing apparatus for selectively recording and/or reproducing the cassettes, and a transport mechanism for selectively transporting the cassettes between the bins and the recording and/or reproducing apparatus, the transport mechanism including a hand block for holding a selected one of the cassettes in a thicknesswise direction of the selected cassette to insert or remove the selected cassette into or from a selected one of the bins and the recording and/or reproducing apparatus, the hand block including a pair of upper and lower holding elements disposed in the thicknesswise direction of the selected cassette for holding the selected cassette therebetween and a cassette inclination sensor for detecting an inclination of the selected cassette with respect to the hand block.

In this automatic cassette changer, when a cassette discharged in an unstable posture from one of the recording and/or recording apparatus, for example, is to be held in its thicknesswise direction by and between the cassette holding elements and taken into the transport mechanism, an inclination of the cassette with respect to the hand block can be detected by the cassette inclination sensor provided on the hand block of the transporting machine and can be automatically corrected, and also the displacement between the cassette and the transport mechanism can be automatically compensated for by the inclination correction operation for the cassette. Consequently, the cassette discharged in an unstable posture from the recording and/or reproducing apparatus can always be held with a very high degree of stability and without any inclination with respect to the hand block, and it can be assured that the cassette is held at an accurate position by the cassette holding elements and the cassette can always be held securely by and between the cassette holding elements. Accordingly, when a cassette is to be removed from a recording and/or reproducing apparatus or the like by means of the hand block, the cassette will not be displaced inadvertently and can always be removed smoothly. Besides, when the cassette thus removed is to be transported by the transport mechanism, it can be assured that the cassette is not released inadvertently from the hand block because of vibration or the like, and consequently, the cassette can always be transported with safety and certainty.

According to yet a further aspect of the present invention, there is provided an automatic cassette changer, which comprises a plurality of cassettes in which record media are individually accommodated, a storage rack having a plurality of bins for storing the cassettes therein, a plurality of recording and/or reporting apparatus for selectively recording and/or reproducing the cassettes, and a transport mechanism for selectively transporting the cassettes between the bins and the recording and/or reproducing apparatus, the transport mechanism including a hand block for holding a selected one of the cassettes in a thicknesswise direction of the selected cassette to insert or remove the selected cassette into or from a selected one of the bins and the recording and/or reproducing apparatus, the hand block including a pair of upper and lower holding elements disposed in the thicknesswise direction of the selected cassette for holding the selected cassette therebetween, a feed screw for controlling the opening and closing movement of the cassette holding elements, and a torque limiter for controlling the force by which the selected cassette is to be held between the cassette holding elements.

In this automatic cassette changer, since the opening and closing control of the pair of cassette holding elements is performed by the feed screw so that a cassette which has one of different thicknesses can be held without difficulty by and between the cassette holding elements, the automatic cassette changer can use a plurality of cassettes which have the different thicknesses in accordance with the recording formats of the cassettes. Further, even if the power supply to the automatic cassette changer is interrupted inadvertently during transportation of a cassette or in a like case, release of the cassette is prevented. Further, since the holding force applied to a cassette by the cassette holding elements can be set to a fixed value by means of the torque limiter regardless of the cassette's thickness, the cassette can always be held and transported with stability irrespective of the thickness of the cassette, and the holding force applied to the cassette will not be so great due to the difference of the thickness of the cassette as to inadvertently damage the cassette. In addition, since the holding force applied to the cassette can be set to a fixed value by means of the torque limiter while the opening and closing control of the cassette holding elements is performed by the feed screw, it can be assured that a nut for cooperating with the feed screw will not bite into the feed screw so as to lock the feed screw while the cassette is held between the cassette holding elements.

According to yet a further aspect of the present invention, there is provided an automatic cassette changer, which comprises a plurality of cassettes in which record media are individually accommodated, a storage rack having a plurality of bins for accommodating the cassettes therein, a plurality of recording and/or reproducing apparatus for selectively recording and/or reproducing the cassettes, and a transport mechanism for selectively transporting the cassettes between the bins and the recording and/or reproducing apparatus, the transport mechanism including a hand block for holding a selected one of the cassettes in a thicknesswise direction of the selected cassette to insert or remove the selected cassette into or from a selected one of the bins and the recording and/or reproducing apparatus, the hand block including a pair of upper and lower holding elements disposed in the thicknesswise direction of the selected cassette for holding the selected cassette therebetween and opening distance controlling means for controlling the opening distance between the cassette holding elements in accordance with information regarding the thickness of the selected cassette.

In this automatic cassette changer, when a cassette having one of various thicknesses is to be held by and between the cassette holding elements, the opening distance between the cassette holding elements is controlled in accordance with information regarding the thickness of the cassette, and accordingly, the cassette having any thickness can be engaged very rapidly and transported by the cassette holding elements. Consequently, the time required for exchanging cassettes can be greatly reduced. Further, since the opening distance between the cassette holding elements can be controlled in accordance with a thickness of a cassette which has one of several thicknesses, when the cassette holding elements are to be inserted, for example, above and below a cassette in the storage rack to hold the cassette in its thicknesswise direction therebetween, the insertion and engagement of the cassette holding elements can be performed within a minimum space in the storage rack. Accordingly, the bins of the storage rack can be disposed at a minimum pitch to achieve a high efficiency in storing the cassettes in a small space. In addition, since the opening distance between the cassette holding elements is controlled in accordance with information regarding the thickness of the cassette by an opening distance controlling means such as an encoder, optimum opening distances for cassettes having several thicknesses can be set very easily, and also modification to or addition of an opening distance can be performed readily.

According to yet a further aspect of the present invention, there is provided an automatic cassette changer, which comprises a plurality of cassettes in which record media are individually accommodated, a storage rack having a plurality of bins for storing the cassettes therein, each of the bins including a cassette sensor provided on the front side in a direction in which a cassette is to be inserted into the bin for detecting a cut face at a front end face of the cassette to be inserted into the bin and a pair of left and right rack plates disposed in a spaced relationship by a distance corresponding to the size of the cassette for receiving the opposite left and right ends of the cassette inserted in the bin, a plurality of recording and/or reproducing apparatus for selectively recording and/or reproducing the cassettes, and a transport mechanism for selectively transporting the cassettes between the bins and the recording and/or reproducing apparatus.

In this automatic cassette changer, the thickness of a cassette inserted into one of the bins of the accommodating rack is detected by the cassette sensor provided on the front side of the bin in the cassette inserting direction for detecting the cut face at the front end face of the cassette, and the size of the cassette in the leftward and rightward directions is determined from the distance between the pair of left and right rack plates provided for each of the bins for receiving the opposite left and right ends of the cassette inserted in the bin. Consequently, insertion of the wrong type of cassette into any of the bins of the storage rack can be prevented based on the two parameters including the thickness and the dimension in the leftward and rightward directions of the cassette inserted into the bin. Accordingly, when the automatic cassette changer uses a plurality of types of cassettes which have different thicknesses and different lengths in accordance with recording formats therefor, insertion of the wrong type of cassette by the operator or transport device into any of the bins of the storage rack can be prevented, and consequently, automatic exchanging of a plurality of types of cassettes having different recording formats can be performed accurately.

According to yet a further aspect of the present invention, there is provided an automatic cassette changer, which comprises a plurality of cassettes in which record media are individually accommodated, a storage rack having a plurality of bins for storing the cassettes therein, a plurality of recording and/or reproducing apparatus for selectively recording and/or reproducing the cassettes, a transport mechanism for selectively transporting the cassettes between the bins and the recording and/or reproducing apparatus, the transport mechanism including driving means for causing the transport mechanism itself to travel, a slide rail constituting one of a pair of travel guides for the transport mechanism for restricting the movement of the transport mechanism in a first direction in which the transport mechanism inserts or removes a selected one of the cassettes into a selected one of the bins and the recording and/or reproducing apparatus and a second direction perpendicular to the first direction, and a fixed rail and a plurality of guide rollers constituting the other travel guide for the transport mechanism for restricting the movement of the transport mechanism in the first direction.

In this automatic cassette changer, the movement of the transport mechanism in the first or cassette inserting or removing direction and in the second direction perpendicular to the first direction is restricted by the slide rail constituting one of the pair of travel guides for the transport mechanism, and the movement of the transport mechanism in the first direction is restricted by the fixed rail and the guide rollers constituting the other travel guide for the transport mechanism. Consequently, the movement (play) of the transporting machine in both of the first and second directions can be restricted completely so that the transport mechanism can travel smoothly and with stability. Nevertheless, the slide rail constituting one of the travel guides can significantly reduce the space requirement in the first and second directions in comparison with an alternative arrangement which includes a combination of two fixed rails extending in two directions including the cassette inserting or removing direction and a perpendicular direction and a large number of guide rollers normally held in contact with the fixed rails in the two directions. Consequently, a considerable reduction in required space can be achieved and the overall size of the automatic cassette changer can be reduced. Besides, since the movement of the transport mechanism in both the first and second directions is restricted by one of the travel guides constituted from the slide rail while the other travel guide constituted from the fixed rail and the guide rollers does not restrict the movement of the transport mechanism in the second direction, that is, in the direction perpendicular to the cassette inserting or removing direction, deformation such as bending in the fixed rail or a frame for the fixed rail can be compensated for by both of the travel guides. Accordingly, the travelling performance of the transport mechanism is not influenced at all by bending in the fixed rail or the mounting frame for the fixed rail, and the transport mechanism can travel smoothly and with stability and transfer of a cassette to any of the bins of the storage rack and the recording and/or reproducing apparatus can be performed smoothly.

According to yet a further aspect of the present invention, there is provided an automatic cassette changer, which comprises a plurality of cassettes which have a plurality of different sizes and in which record media are individually accommodated, storage rack having a plurality of bins for storing the cassettes therein, a plurality of recording and/or reproducing apparatus for selectively recording and/or reproducing the cassettes, and a transport mechanism for selectively transporting the cassettes between the bins and the recording and/or reproducing apparatus, the transport mechanism including a hand block for holding a selected one of the cassettes to insert or remove the selected cassette into or from a selected one of the bins and the recording and/or reproducing apparatus and a pair of cassette slide guides disposed on the opposite sides of the range of movement of the hand block in a direction perpendicular to the direction in which the selected cassette is inserted or removed for supporting the opposite ends of the selected cassette when the selected cassette has a larger one of the different sizes.

In this automatic cassette changer, when a large a relatively heavy cassette is to be held by the hand block and transferred to or from any of the bins of the storage rack and the recording and/or reproducing apparatus, the opposite ends of the large cassette can be supported on the pair of cassette slide guides provided on the transport mechanism. Consequently, the large and heavy cassette can be transferred with safety. Accordingly, when a large cassette is to be transferred, the burden (load) applied to the hand block is reduced, and the large cassette can be transferred with a very high degree of safety. On the other hand, when a small cassette is to be held by the hand block and transferred to or from any of the bins of the storage rack and the recording and/or reproducing apparatus, it can be transferred while it is moved freely in the direction perpendicular to the cassette inserting or removing direction between the cassette slide guides of the transport mechanism. Consequently, the position at which a small cassette is to be transferred to or from any of the bins of the storage rack and the recording and/or reproducing apparatus can be selected freely in the direction perpendicular to the cassette inserting or removing direction with respect to the transport mechanism. Accordingly, the automatic cassette changer can use a plurality of types of cassettes which have different sizes in accordance with recording formats therefor and effect recording and/or reproduction in any of the different recording formats. Besides, in this instance, even if the transport mechanism is constructed for movement only in one direction such as a vertical direction, it is possible to dispose the bins of the storage racks for small cassettes in a plurality of lines (rows or columns) in a direction perpendicular to the cassette inserting or removing direction such as the leftward or rightward direction with respect to the transport mechanism or to include various recording and/or reproducing apparatus which have small cassette insertion openings the positions of which vary in the perpendicular direction, and consequently, various types of bins or recording and/or reproducing apparatus can be provided in the automatic cassette changer.

According to yet a further aspect of the present invention, there is provided an automatic cassette changer, which comprises a plurality of cassettes in which record media are individually accommodated, a storage rack having a plurality of bins for storing the cassettes therein, a plurality of recording and/or reproducing apparatus for selectively recording and/or reproducing the cassettes, and a transport mechanism for selectively transporting the cassettes between the bins and the recording and/or reproducing apparatus, the transport mechanism including a hand block for holding a selected one of the cassettes to insert or remove the selected cassette into or from a selected one of the bins and the recording and/or reproducing apparatus by means of a pair of cassette holding elements provided in a thicknesswise direction of the selected cassette on the hand block, an opening and closing mechanism for controlling the opening distance between the cassette holding elements to ranges of thickness greater and smaller than the thickness of the cassettes, and controlling means for controlling the hand block such that, when the selected cassette held between the cassette holding elements is to be inserted into a selected one of the recording and/or reproducing apparatus, the hand block first inserts the selected cassette held in its thicknesswise direction to a first position in the selected recording and/or reproducing apparatus, then reduces the opening distance between the cassette holding elements so as to be smaller than the thickness of the selected cassette and finally pushes in the selected cassette to a second position deeper than the first position in the selected recording and reproducing apparatus by means of the cassette holding elements.

In this automatic cassette changer, the opening distance between the cassette holding elements mounted on the hand block is controlled freely within ranges of thickness greater and smaller than the thickness of the cassettes, and when a cassette is to be inserted into one of the recording and/or reproducing apparatus, the hand block first inserts the cassette held in its thicknesswise direction to the first position in the recording and/or reproducing apparatus, and then the opening distance between the cassette holding elements is reduced so as to be smaller than the thickness of the selected cassette, and finally the cassette is pushed in to the second position deeper than the first position in the recording and reproducing apparatus by means of the cassette holding elements. Consequently, a cassette can be pushed in positively and securely to the second or deeper position in the recording and/or reproducing apparatus making use only of the cassette holding elements. Accordingly, reliable insertion to the second position can be assured with respect to a small cassette in a recording and/reproducing apparatus which uses both large and small cassettes an automatic cassette changer which can handle a plurality of types of cassettes having different sizes. In this instance, since the cassette holding elements push in the cassette with the opening distance between the elements that is smaller than the thickness of the small size cassette, there is no possibility that the cassette holding elements may interfere with a front panel or the like of the recording and/or reproducing apparatus to damage the same, and a very high degree of safety is provided. In addition, since a specific mechanism for mechanically loading a small cassette to a deep position in the recording and/or reproducing apparatus and a driving apparatus for the mechanism can be eliminated, the automatic changer is simplified in structure and can be produced at a significantly reduced cost.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 7 is a schematic plan view showing slide rails along which the video tape recorder is to be removed;

FIG. 30 is a horizontal sectional side elevational view showing the pivotal arm of the hand block;

FIGS. 34(A) and 34(B) are schematic views illustrating comparison between a spacing required for a linear movement of the hand block by the pivotal arm and another spacing required for a linear movement of the hand block by a feed screw or a like mechanism;

FIG. 40 is a sectional view taken along line D—D of FIG. 36;

FIG. 41 is a schematic sectional side elevational view showing an opening and closing mechanism for cassette holding pins of the hand block;

FIG. 44 is a plan view when a large cassette is taken in or out by the hand block under the guidance of cassette slide guides;

FIG. 45 is a front elevational view of the arrangement shown in FIG. 44;

FIG. 46 is a plan view when a small cassette is taken in or out by the hand block;

FIG. 47 is a front elevational view of the arrangement shown in FIG. 46;

FIGS. 57(A) to 57(F) are similar views but illustrating an automatic centering operation by the automatic centering mechanism when a cassette is inserted;

DETAILED DESCRIPTION OF THE PREFERRED EMBODIMENT

Overview of Automatic Cassette Changer

Figure 1:
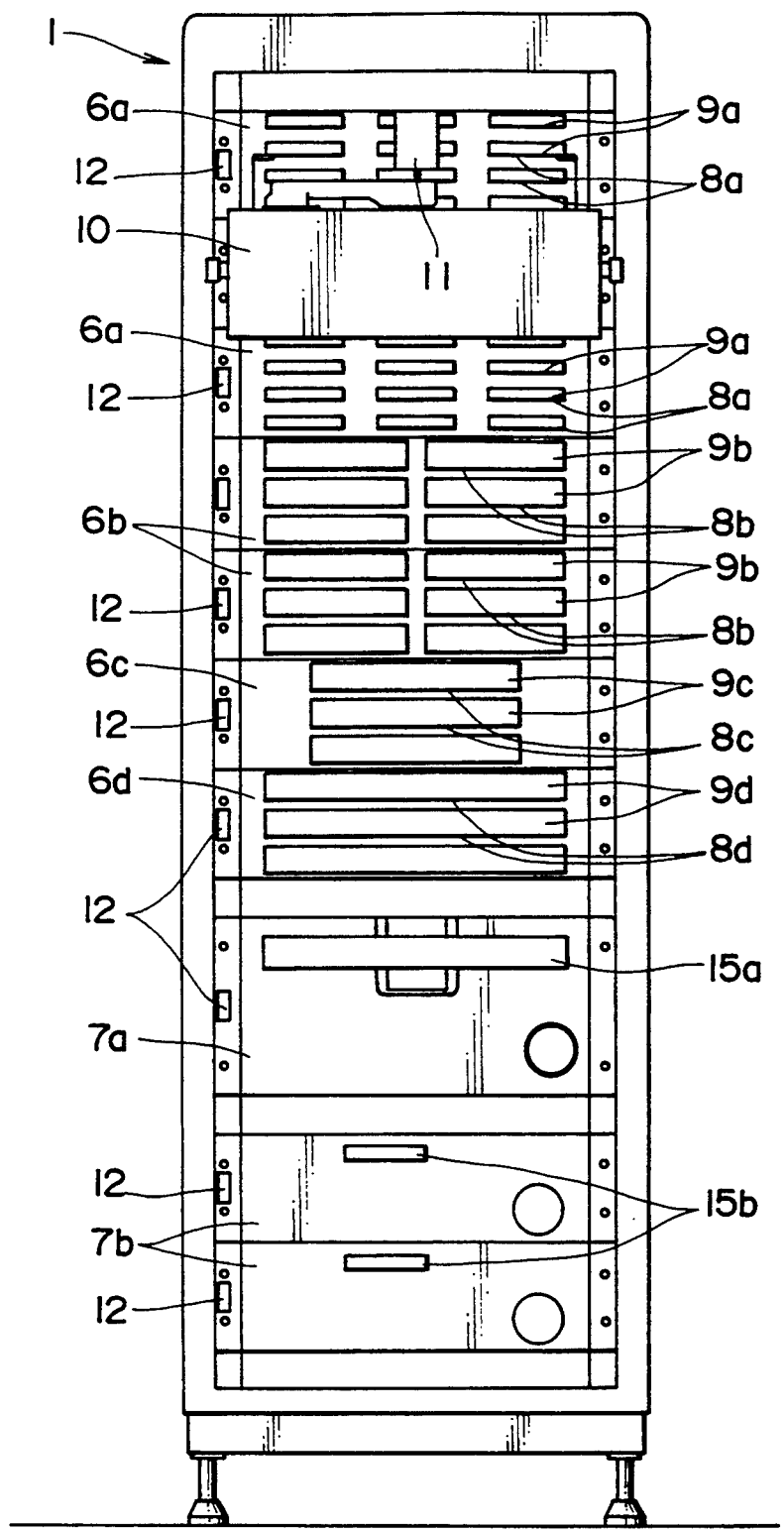
FIG. 1 is a front elevational view of an entire automatic cassette changer showing a preferred embodiment of the present invention.
Figure 2:
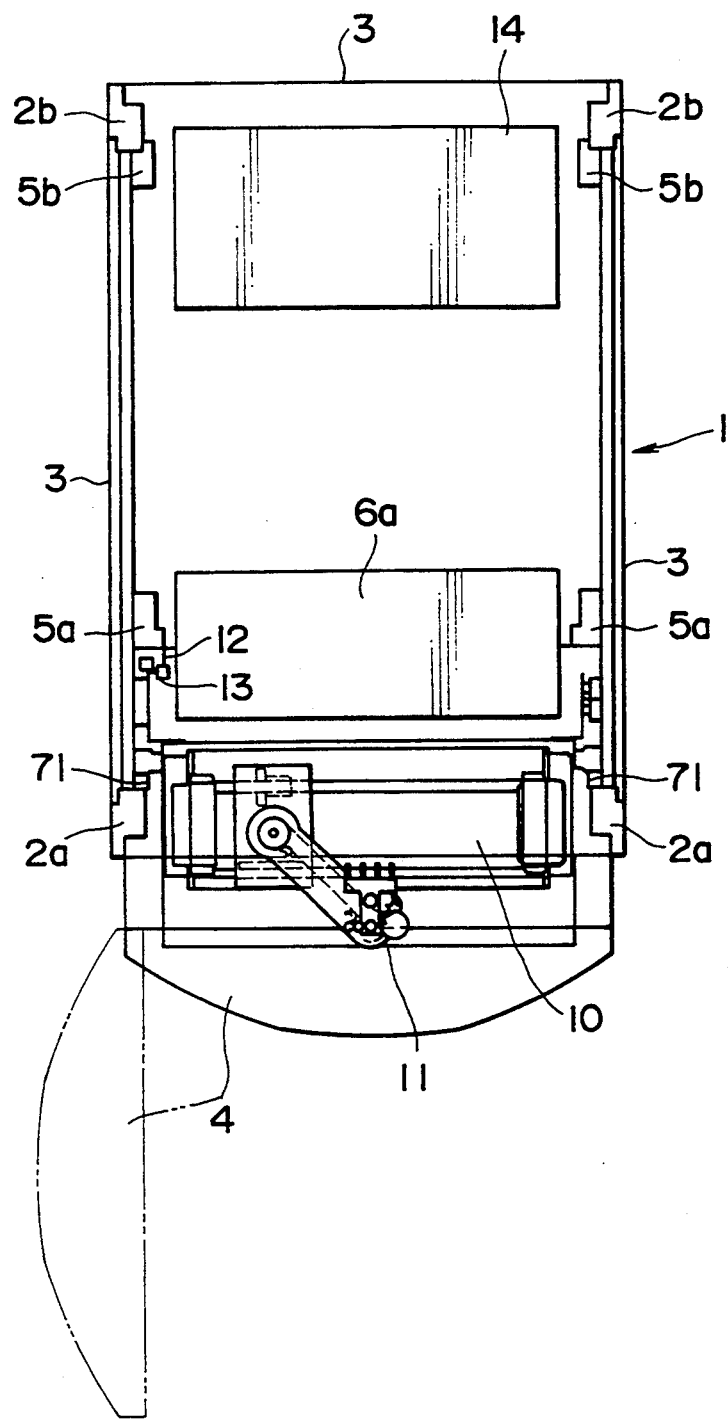
FIG. 2 is a schematic plan view of the entire automatic cassette changer.
Figure 3:
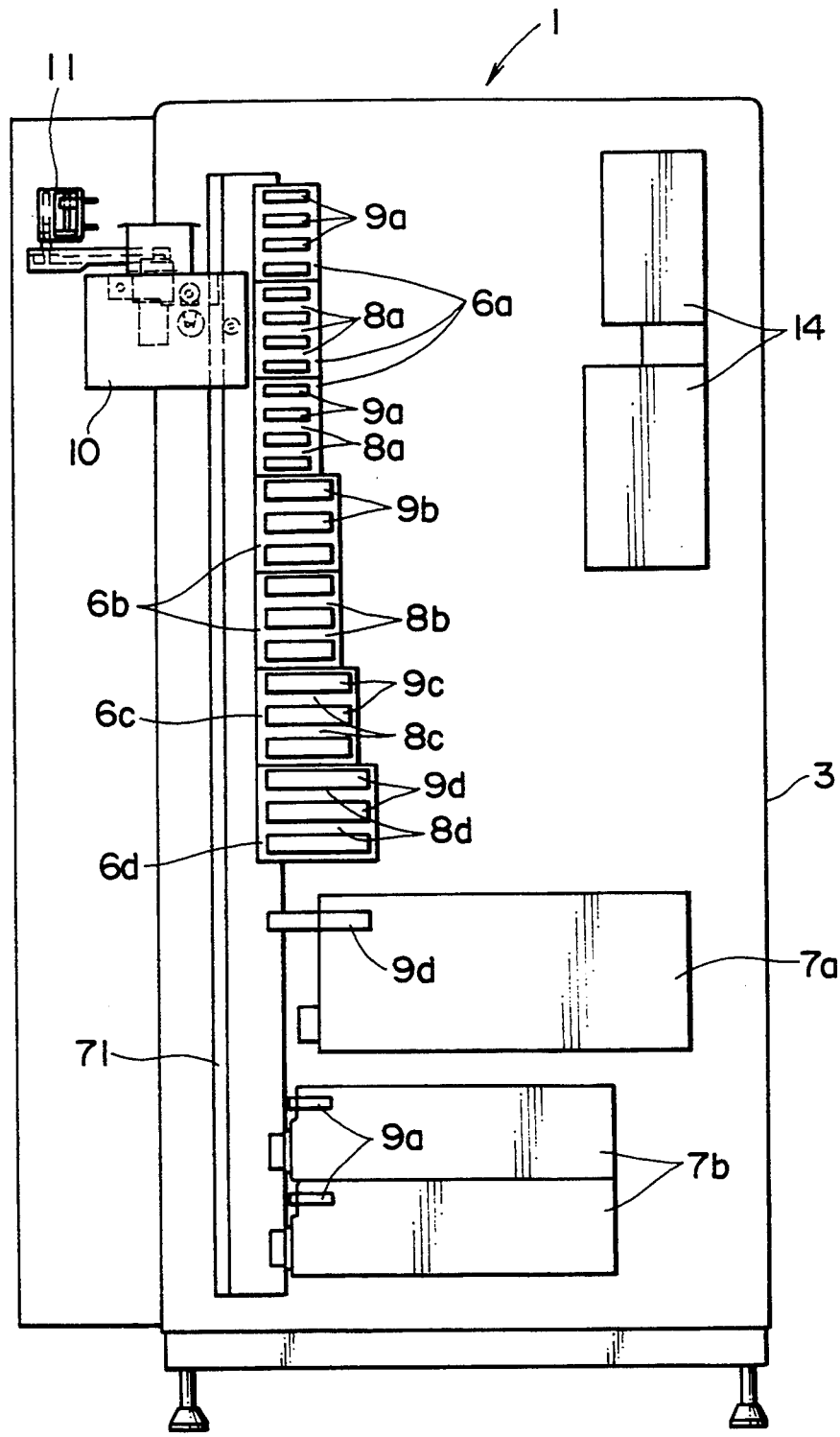
FIG. 3 is a schematic side elevational view of the entire automatic cassette changer.
Figure 4:
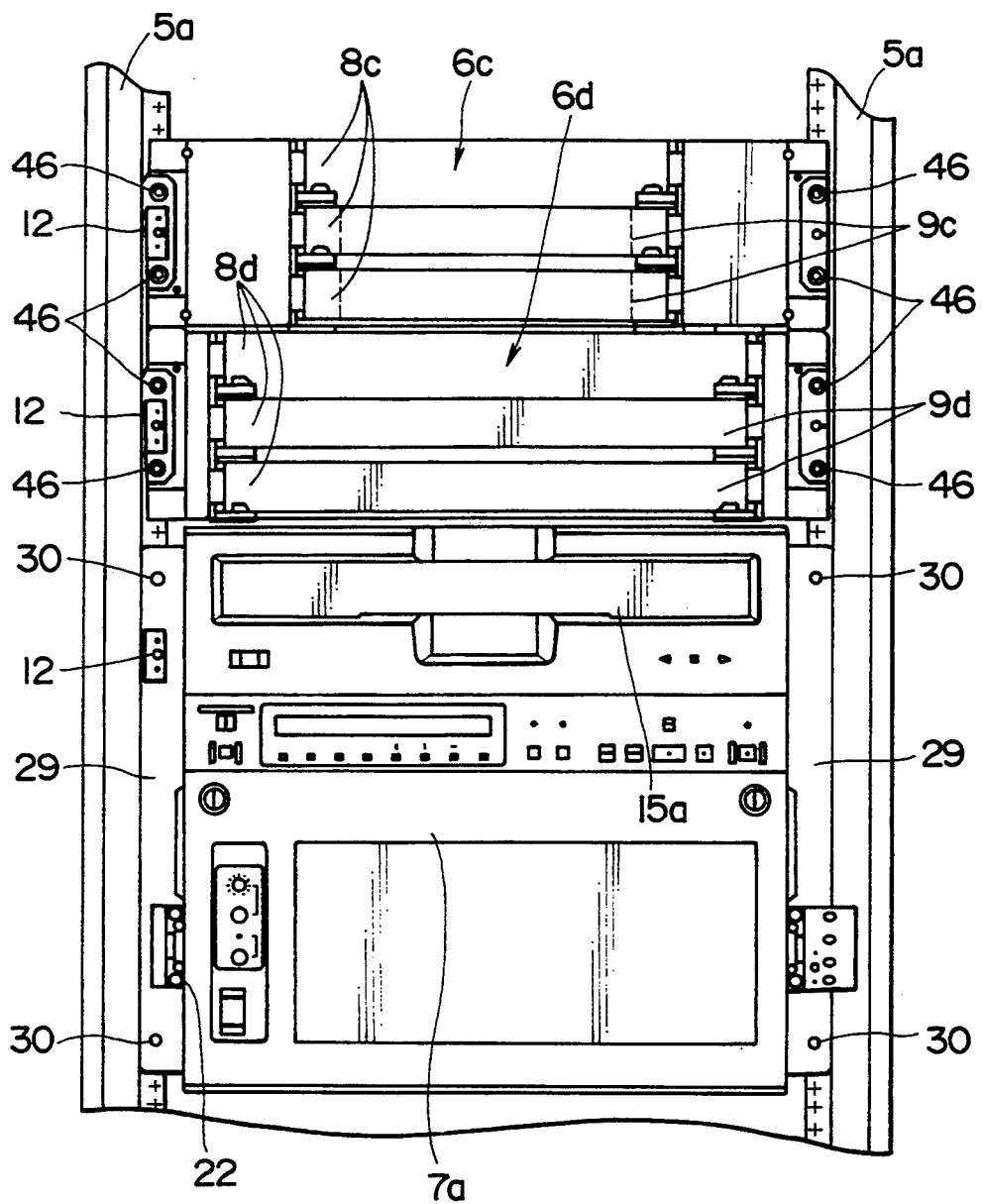
FIG. 4 is an enlarged front elevational view showing a cassette storage rack unit and a video tape recorder.
Figure 5:
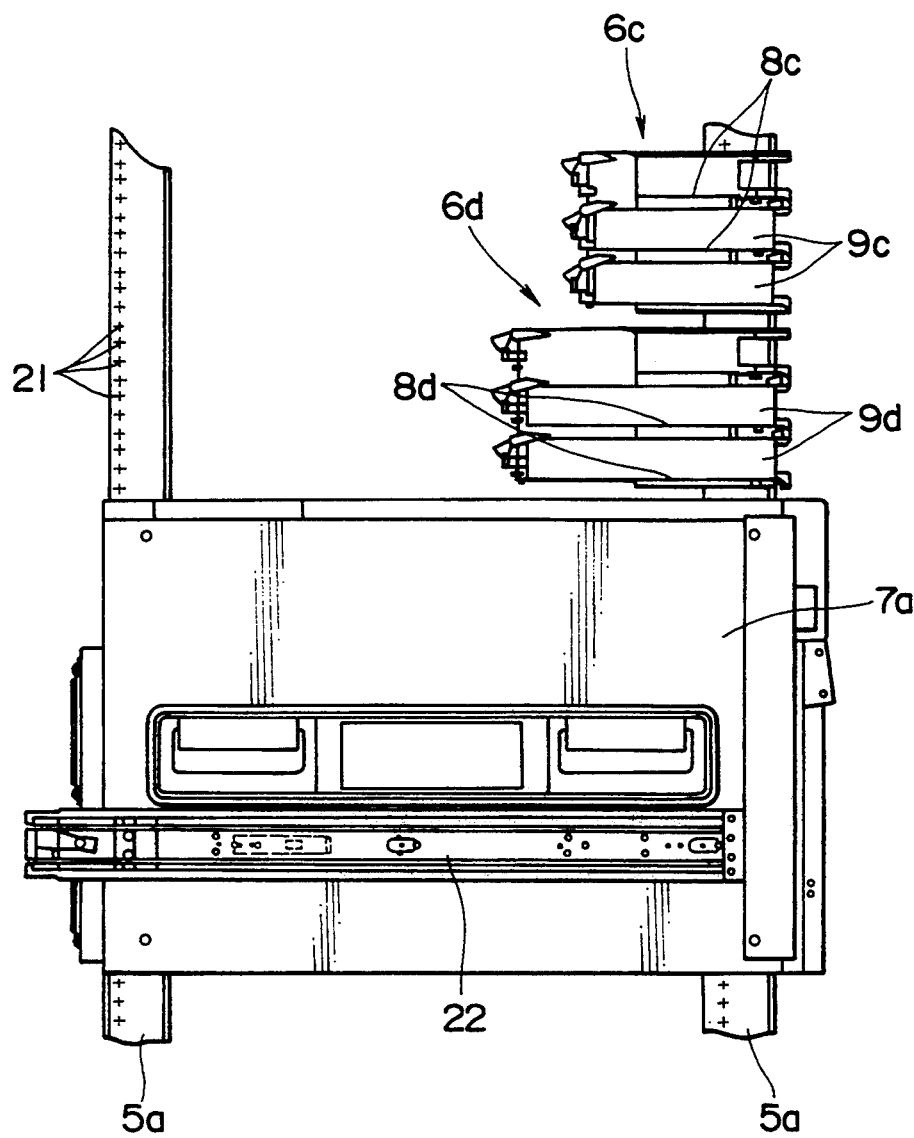
FIG. 5 is a side elevational view of the cassette storage rack unit and the video tape recorder shown in FIG. 4.

Referring first to FIGS. 1 to 3, there is shown an automatic cassette changer to which the present invention is applied. The automatic cassette changer is constructed for changing video cassettes at a television broadcasting station.

The automatic cassette changer includes an automatic cassette changer body 1 formed as a vertically elongated housing which includes two pairs of front and rear support posts 2a and 2b and an outer shell 3 covering the opposite left and right sides and the rear side of the housing and leaving the front side exposed. A door 4 is disposed at the front side of the housing of the changer body 1. Two pairs of mounting frames 5a and 5b are disposed vertically between the front and rear support posts 2a and 2b.

A plurality of, four in the arrangement shown, types of cassette storage rack units 6a to 6d are accommodated at vertically different stages at an upper location in the changer body 1, and a plurality of, two in the arrangement shown, types of video tape recorders 7a and 7b serving as recording and/or reproducing apparatus and so forth are accommodated at a lower location in the changer body 1. The cassette storage rack units provided in this arrangement include three cassette storage rack units 6a, two cassette storage rack units 6b, one cassette storage rack unit 6c and one cassette storage rack unit 6d. Meanwhile, the video tape recorders include one video tape recorder 7a and two video tape recorders 7b.

The cassette storage units 6a to 6d include a plurality of cassette storage racks 8a to 8d in which a plurality of video tape cassettes of different types having differing recording formats and tape sizes can be stored. In the automatic cassette changer shown, 8 mm tape cassettes 9a and three types of digital tape cassettes 9b, 9c and 9d of three different small (S), medium (M) and large (L) sizes, wherein the magnetic tapes serving as record media have differing recording formats are accommodated in units in the cassette storage racks 8a to 8d, respectively. It is to be noted that the 8 mm tape cassettes 9a are smaller both in outer diameter and in thickness comparing with the small size tape cassettes 9b. Meanwhile, the small, medium and large cassettes 9b, 9c and 9d are formed equal in thickness but are different in outer diameter from one another. On the other hand, the video tape recorder 7a is formed as a digital video tape recorder which can selectively record and/or reproduce the small, medium and large cassettes 9b, 9c and 9d while the video tape recorders 7b are formed as 8 mm video tape recorders which can record and/or reproduce the 8 mm tape cassettes 9a.

The cassette storage rack units 6a to 6d and the video tape recorders 7a and 7b are disposed in a vertical column in such a condition that the front faces thereof are directed forwardly of the changer body 1 (downwardly in FIG. 2) and held in registration with one another in a vertical plane. A self-propelled transport mechanism 10 is moved upwardly or downwardly along the front faces of the cassette storage rack units 6a to 6d and the video tape recorders 7a and 7b. The transport mechanism 10 includes a hand block 11 for transferring a tape cassette. A plurality of type detecting sections 12 indicative of the types of the cassette storage rack units 6a to 6d and the video tape recorders 7a and 7b are disposed in a vertical column on the left side of the front faces of the cassette storage rack units 6a to 6d and the video tape recorders 7a and 7b (on the left side in FIG. 1), and a type detecting sensor 13 which may be, for example, a photocoupler for reading the type detecting sections 12 is mounted on the transport mechanism 10. A control box 14 for controlling the video tape recorders 7a and 7b and the transport mechanism 10 is accommodated in the changer body 1.

In the automatic cassette changer, the designated tape cassettes 9a to 9d are manually inserted in advance in the cassette storage racks 8a to 8d of the cassette accommodating rack units 6a to 6d, respectively. The transport mechanism 10 is moved upwardly or downwardly while the type detecting sections 12 are scanned by the type detecting sensor 13 to detect the type of each of the cassette storage racks 8a to 8d and the video tape recorders 7a and 7b. Then, a designated one of the tape cassettes 9a to 9d is automatically extracted from a designated one of the cassette storage racks 8a to 8d by means of the hand block 11 of the transport mechanism 10. The hand block 11 of the transport mechanism 10 transports the thus extracted tape cassette 9a, 9b, 9c or 9d to a designated one of the video tape recorders 7a and 7b and automatically inserts it into a cassette insertion opening 15a or 15b of the video tape recorder 7a or 7b so as to thereafter perform recording and/or reproduction of the tape cassette 9a, 9b, 9c or 9d. The sequence of operations will be repeated so that continuous video signal reproduction, recording, editing or the like may be performed over a long period of time while using the tape cassettes 9a to 9d having different recording formats, sizes and so forth.

Video Tape Recorder Units

Figure 8:
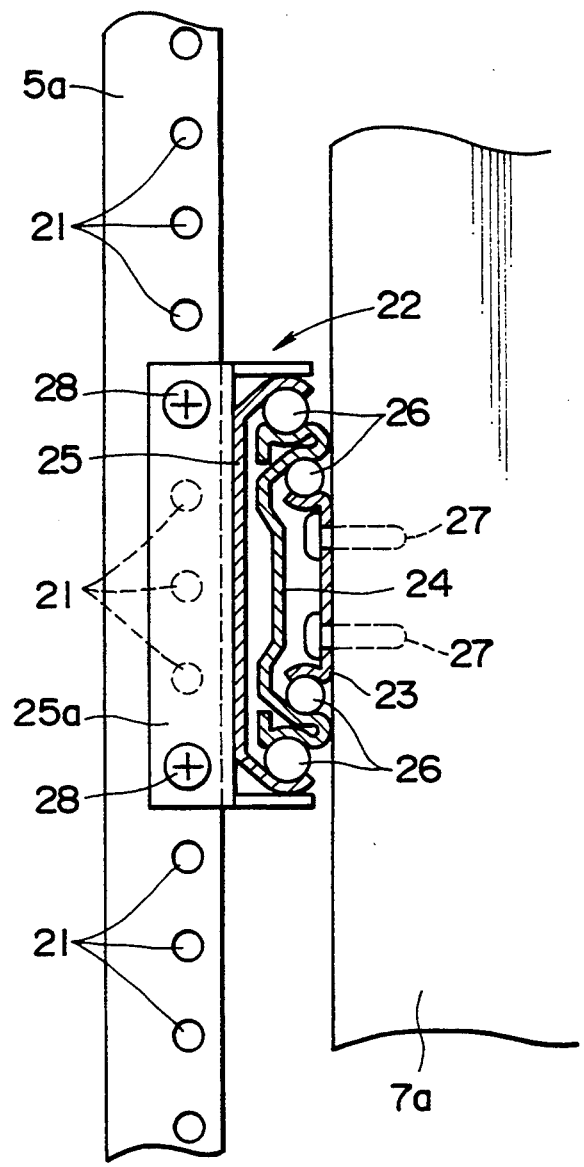
FIG. 8 is an enlarged sectional view of one of the slide rails shown in FIG. 7.
Figure 9:
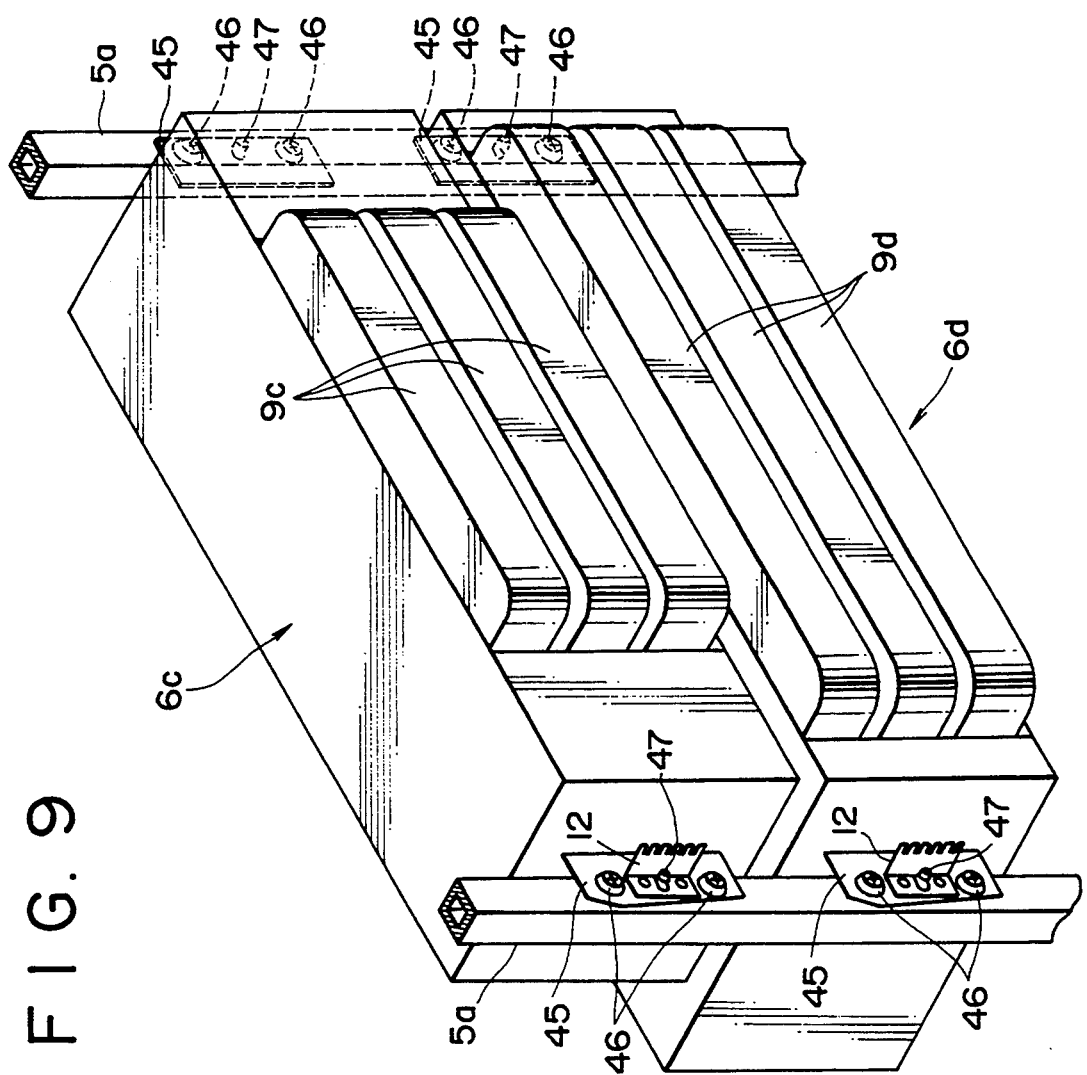
FIG. 9 is a perspective view showing details of the cassette storage rack unit shown in FIG. 4.

The video tape recorder units will now be described with reference to FIGS. 4 to 8. Each of the two pairs of front and rear vertical mounting frames 5a and 5b shown in FIG. 7 has a large number of threaded mounting holes 21 formed at a fixed pitch as shown in FIG. 8 on the front face and an inner side face thereof.

The large size video tape recorder 7a used all of with the small, medium and large tape cassettes 9b, 9c and 9d is formed as a unit and has a pair of left and right slide rails 22 mounted horizontally on the opposite left and right side faces of the video tape recorder 7a. Each of the slide rails 22 is formed from, as shown in FIG. 8, three rails including an inner rail 23, an intermediate rail 24 and an outer rail 25 and a large number of balls 26 interposed both between the rails 23 and 24 and between the rails 24 and 25. The inner rails 23 are secured horizontally to the opposite left and right sides of the video tape recorder 7a by means of a plurality of screws 27 while the outer rails 25 are removably secured to the mounting holes 21 of the front mounting frames 5a by means of a plurality of screws 28 with a pair of front and rear brackets 25a interposed therebetween.

A pair of left and right brackets 29 are securely mounted on the opposite left and right side portions of the front face side of the video tape recorder 7a and are removably secured to a plurality of mounting holes 21 on the front face side of the pair of left and right mounting frames 5a on the front face side by means of a plurality of screws 30 so as to exchangeably mount the video tape recorder 7a at a predetermined position in the changer body 1. It is to be noted that a type detecting section 12 is mounted on the front face of the left bracket 29 at a predetermined vertical position.

Figure 6:
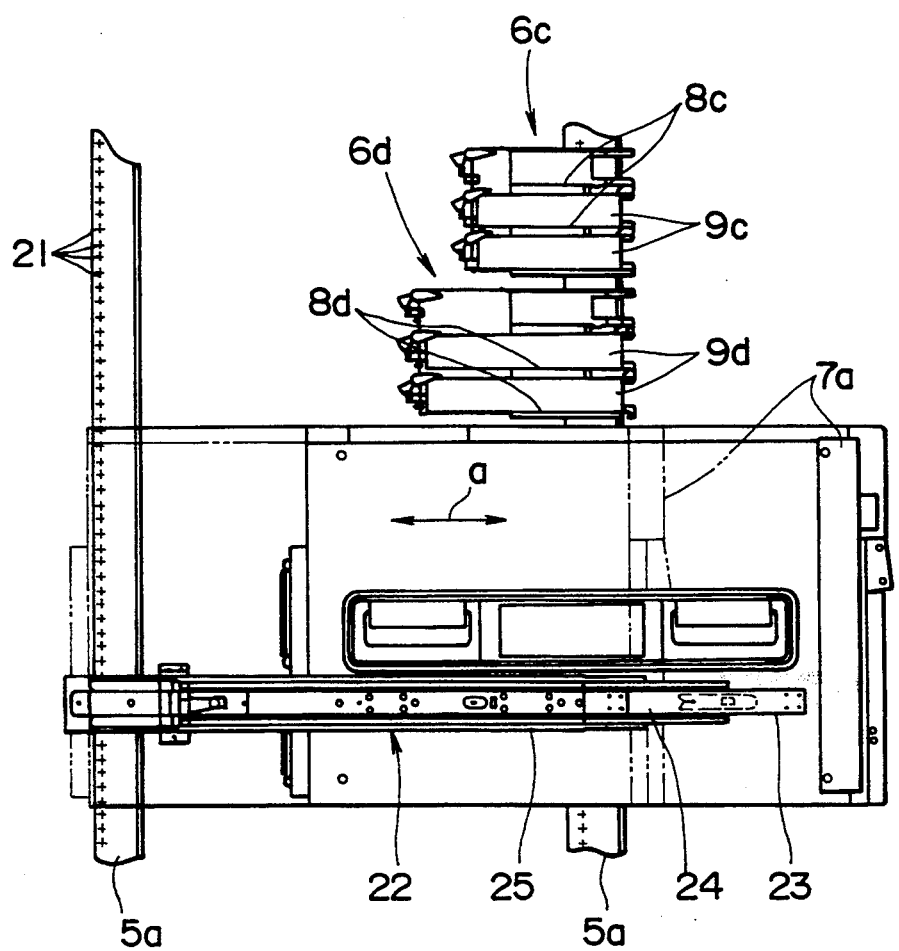
FIG. 6 is a side elevational view showing an operation in which the video tape recorder is removed from the changer.

Accordingly, the video tape recorder 7a can be exchanged freely for another video tape recorder of a different type by removing the screws 30 for the left and right brackets 29, slidably moving the intermediate rails 24 between the inner rails 23 and the outer rails 25 of the left and right slide rails 22 by way of the balls 26 and removing the video tape recorder 7a from the changer body 1 in one of the directions indicated by a double-sided arrow mark a as indicated by chain lines in FIGS. 6 and 7. In this instance, the quite heavy video tape recorder 7a can be slidably moved without much effort in the directions of the arrow mark a by means of the balls 26 of the slide rails 22.

Cassette Storage Rack Units

The cassette storage rack units 6a to 6d will now be described with reference to FIGS. 9 to 16.

Figure 10:
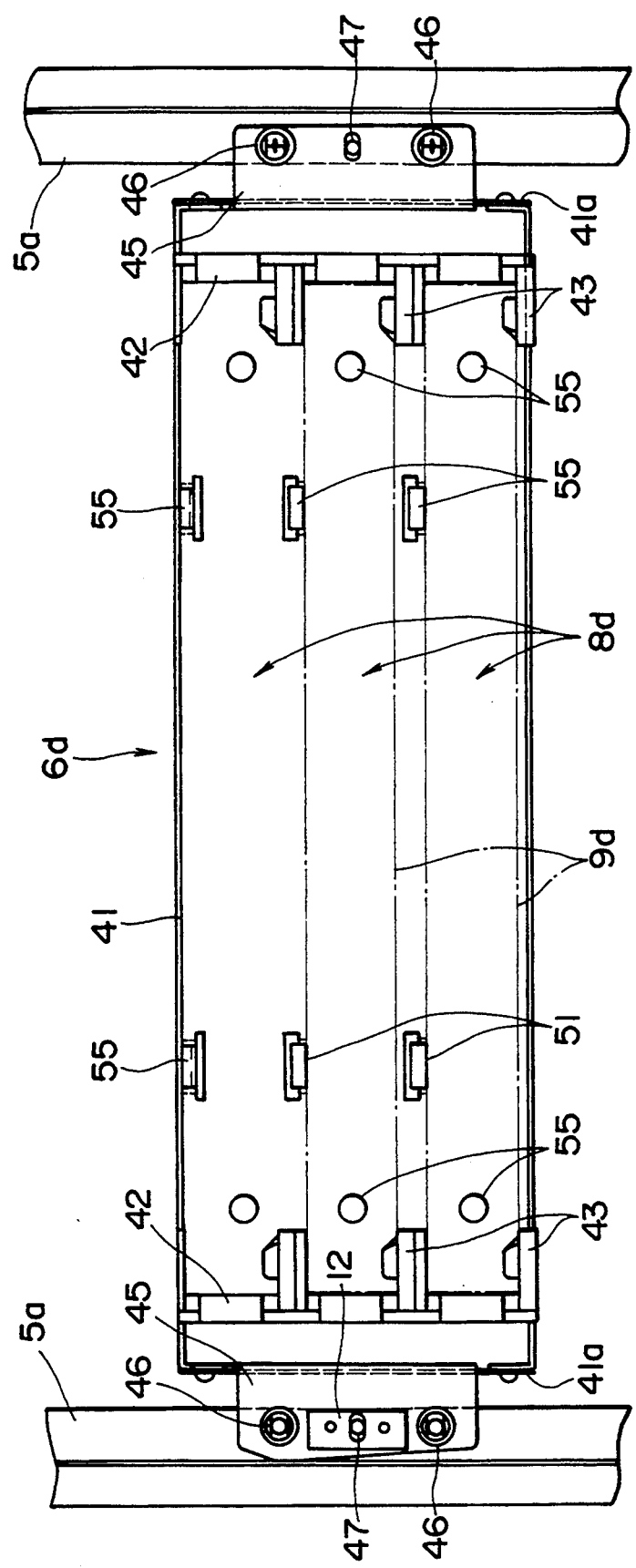
FIG. 10 is a front elevational view of a cassette storage rack unit for large cassettes.
Figure 11:
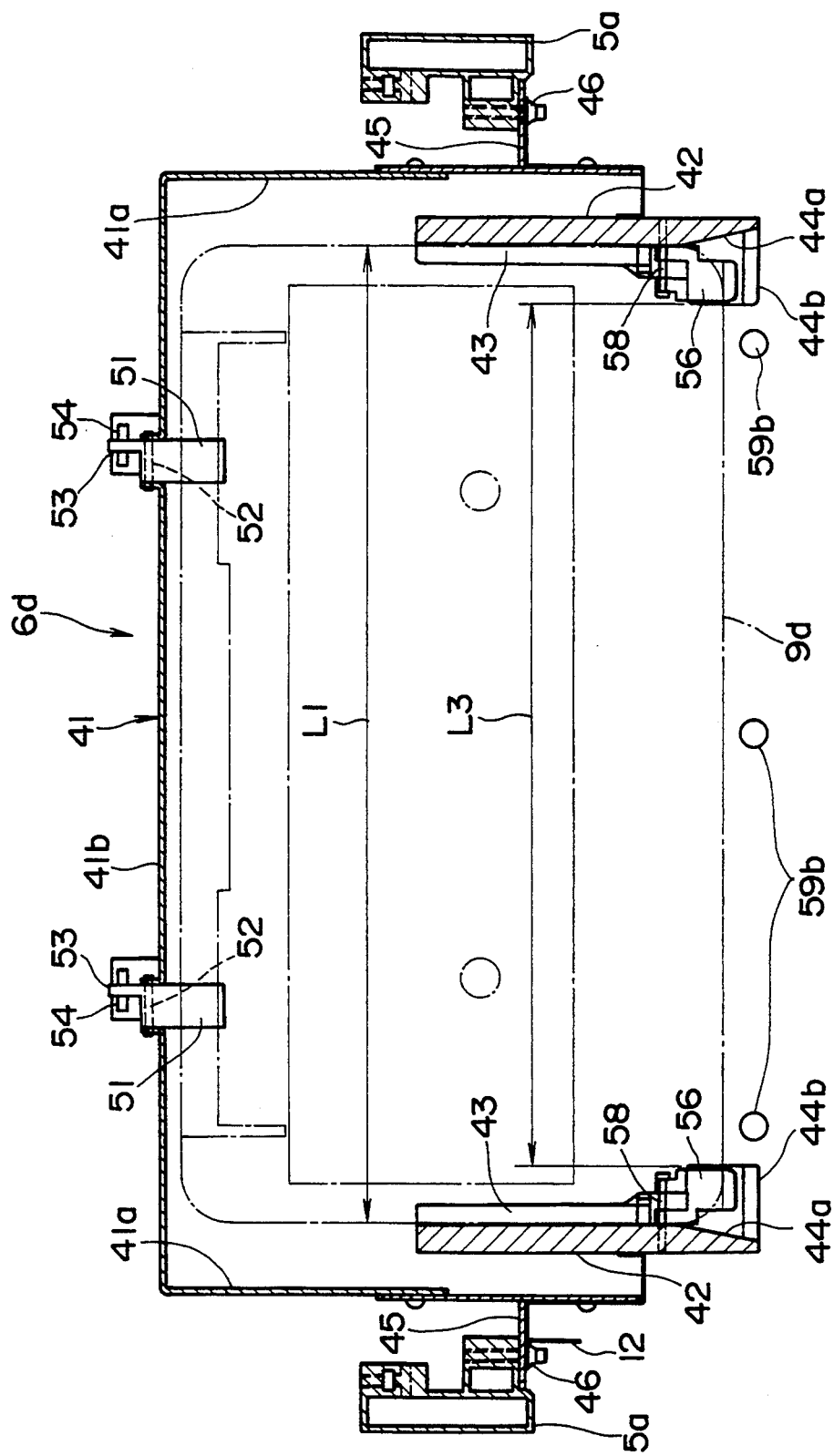
FIG. 11 is a horizontal sectional plan view of the cassette storage rack unit shown in FIG. 10.
Figure 12:
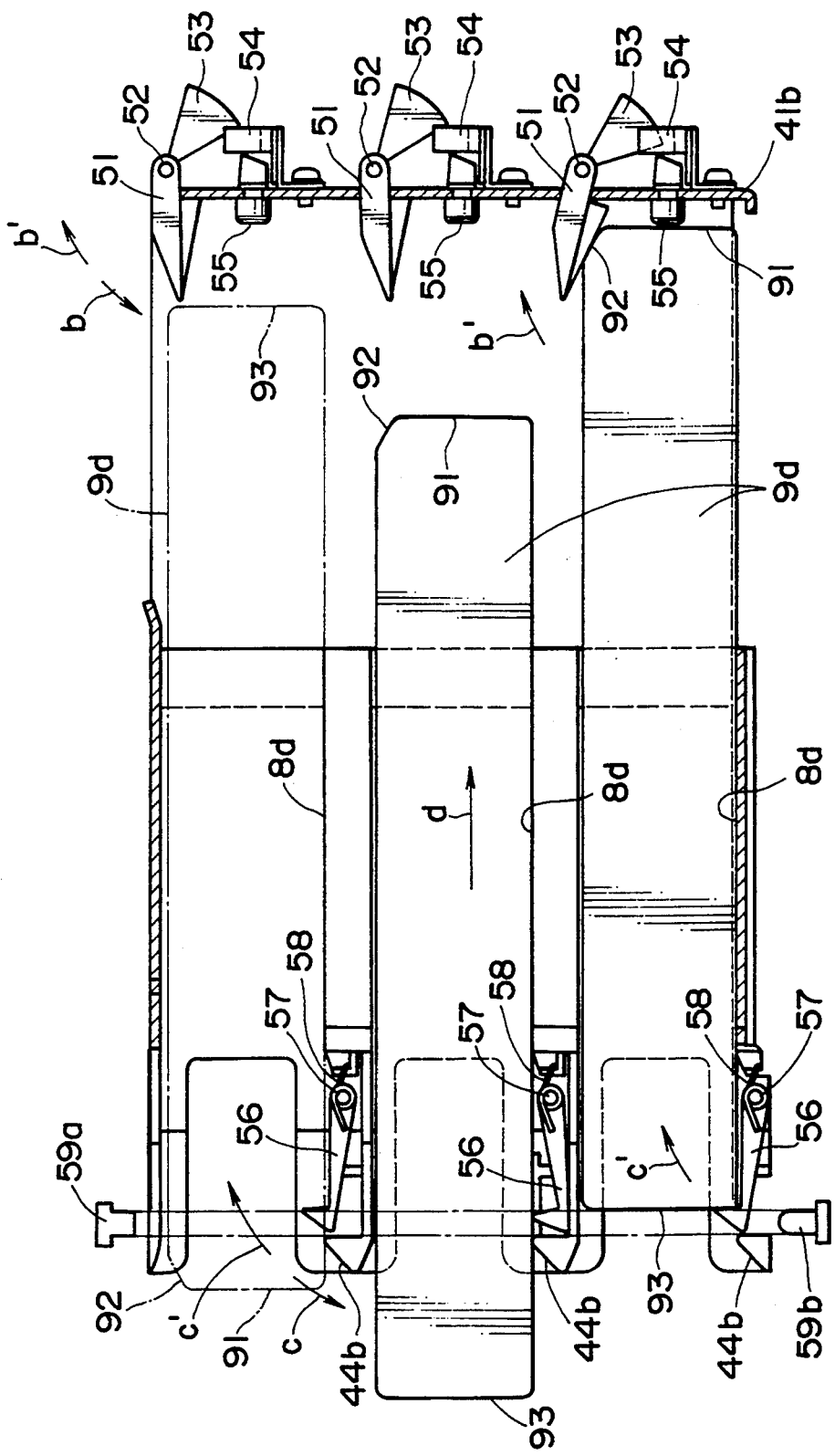
FIG. 12 is a vertical sectional side elevational view of the cassette storage rack unit shown in FIG. 10.

Referring first to FIGS. 10 to 12, the cassette storage rack unit 6d for storing the large cassettes 9d therein is shown. The cassette storage rack unit 6d includes a pair of left and right vertical rack frames 42 mounted on the opposite left and right inner sides of a unit body 41 in a spaced relationship from each other by a great distance equal to the widthwise dimension, that is, the dimension in the leftward and rightward direction, of the large tape cassettes 9d. The cassette storage rack unit 6d further includes three horizontal rack plates 43 formed in an opposing relationship to each other at three vertical stages on the opposing faces of the rack frames 42 thereby to form three cassette storage racks 8d disposed at three vertical stages. It is to be noted that each of the rack frames 42 and the rack plates 43 has a cassette guiding tapered face 44a or 44b formed at the front end, that is, at the opening end of each of the cassette storage racks 8d.

A pair of left and right brackets 45 are securely mounted on the opposite left and right side portions of the front face side of a pair of left and right side plates 41a of the unit body 41 and are removably secured to a plurality of screw holes 21 on the front face sides of the front side left and right mounting frames 5a each by means of a pair of upper and lower screws 46 so that the cassette storage rack unit 6d is exchangeable mounted at desired position in the vertical direction in the changer body 1. In this instance, the left and right brackets 45 are fitted on a pair of a plurality of left and right positioning pins 47 mounted at a pitch equal to that of the mounting holes 21 on the front face sides of the left and right mounting frames 9a to effect positioning of the cassette storage rack unit 6d in the vertical direction and the leftward and rightward directions. Further, a type detecting section 12 is mounted at a predetermined vertical position on the front face side of the left side bracket 45.

Figure 13:
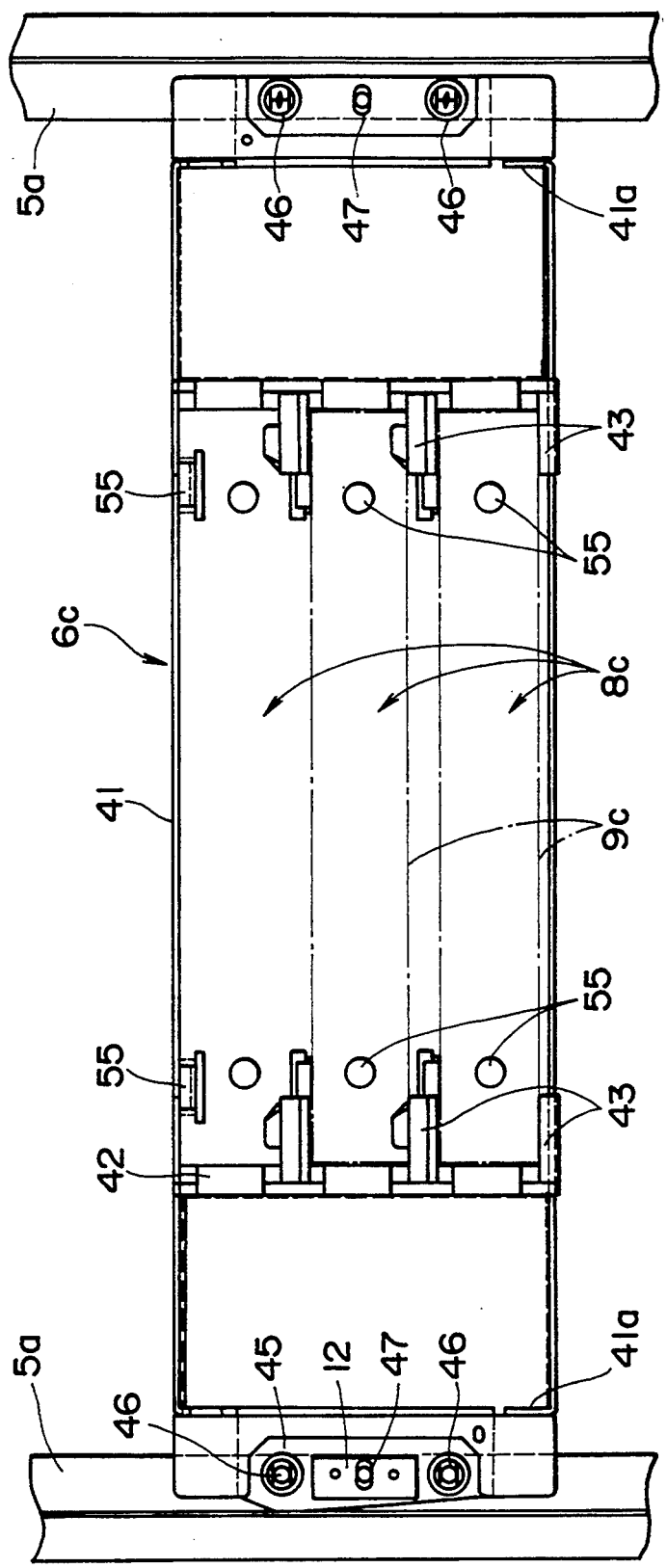
FIG. 13 is a front elevational view of another cassette storage rack unit for medium size cassettes.
Figure 14:
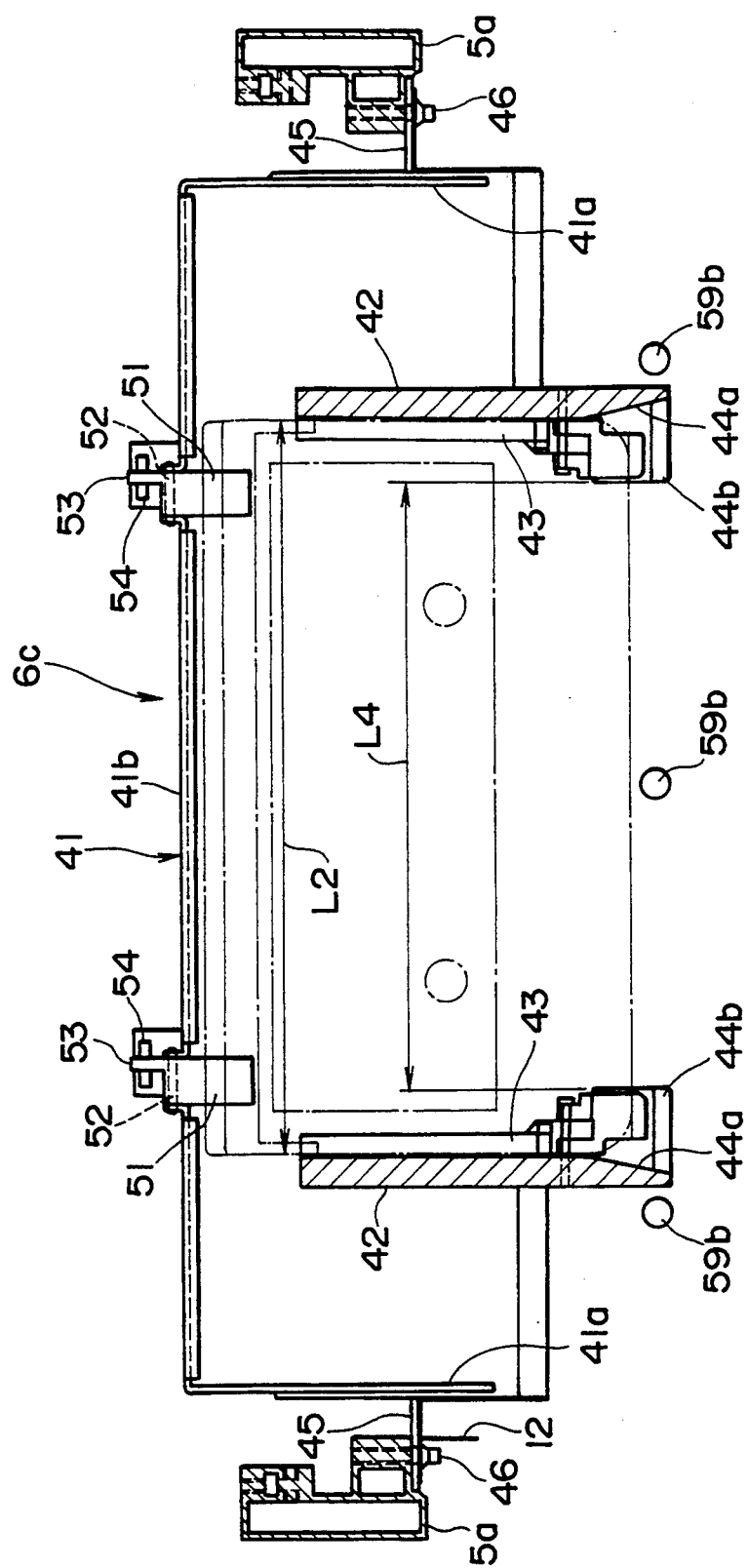
FIG. 14 is a horizontal sectional plan view of the cassette rack storage unit shown in FIG. 13.

FIGS. 13 and 14 show the cassette storage rack unit 6c for storing medium size tape cassettes 9c therein. The cassette storage rack unit 6c is constructed similarly to the cassette storage rack unit 6d except that it includes a unit body 41 having the same configuration as the cassette storage rack unit 6d and a pair of left and right rack frames 42 mounted in the unit body 41 in a spaced relationship at a medium distance equal to the length of the medium size tape cassettes 9c in the leftward and rightward directions.

Figure 15:
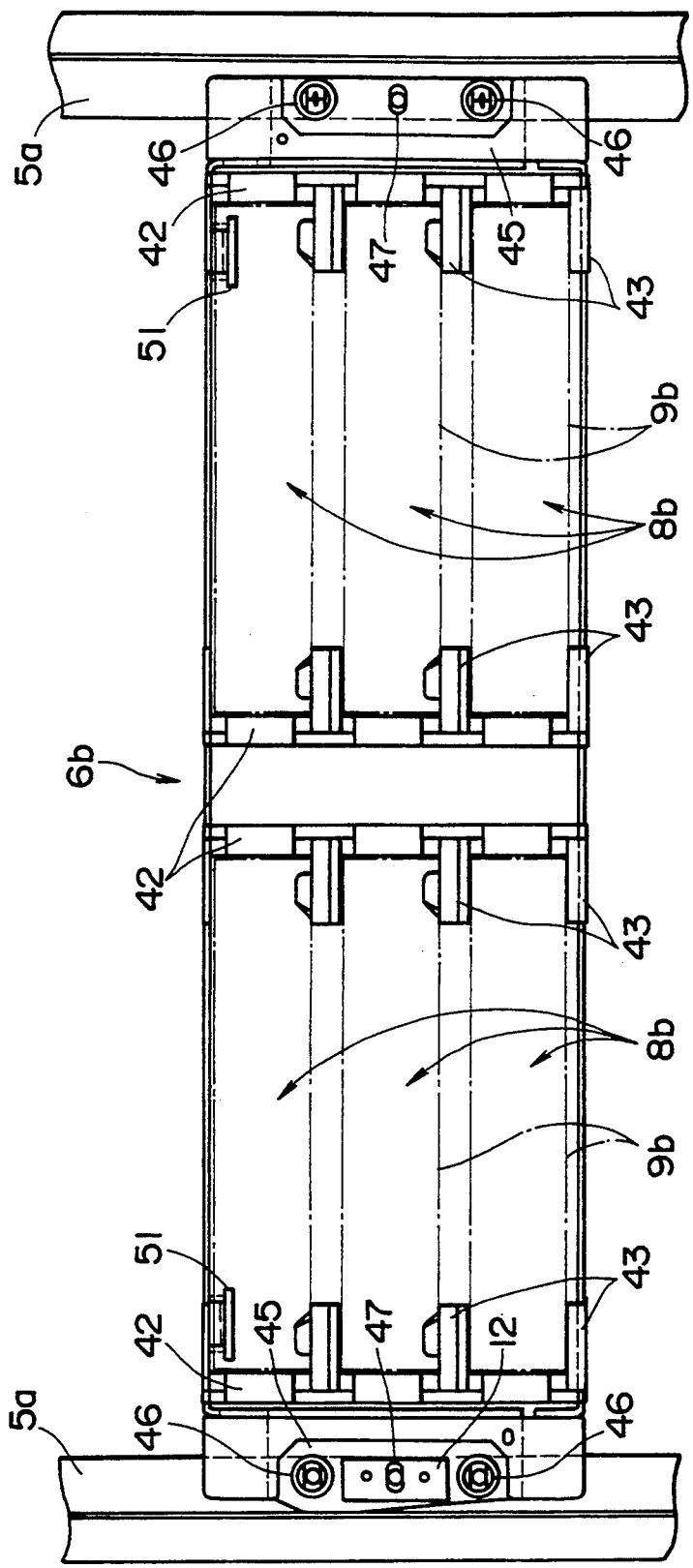
FIG. 15 is a front elevational view of a further cassette storage rack unit for small cassettes.
Figure 16:
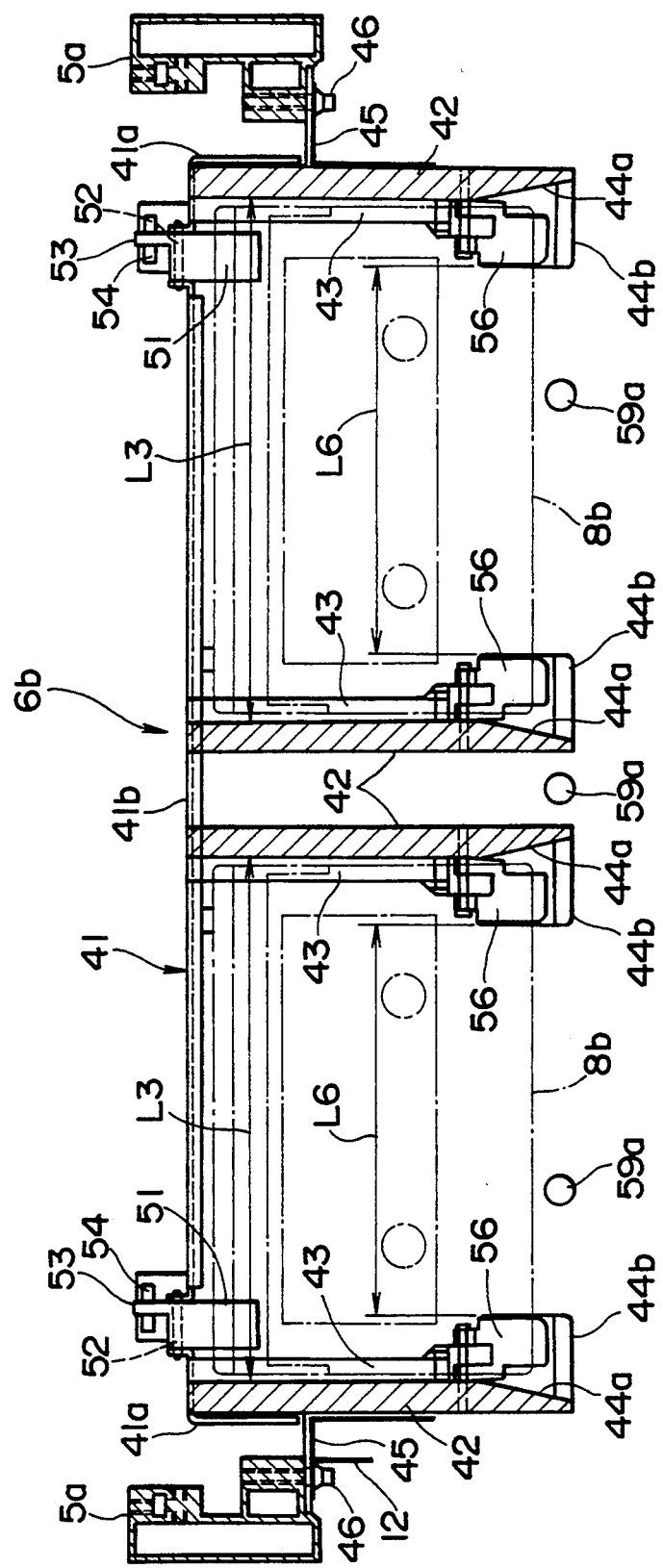
FIG. 16 is a horizontal sectional plan view of the cassette storage rack unit shown in FIG. 15.

FIGS. 15 and 16 show a cassette storage rack unit 6b for storing the small size cassettes 9b therein. The cassette storage rack unit 6b is constructed similarly to the cassette storage rack unit 6d except that it includes a unit body 41 having the same configuration as that of the cassette storage rack unit 6d and two pairs of left and right rack frames 42 mounted in the unit body 41 in a spaced relationship at a small distance equal to the length of the small tape cassettes 9b in the leftward and rightward directions thereby to form a total of six horizontal cassette storage racks 8b disposed in three stages in two vertical columns.

Accordingly, with the cassette storage rack units 6b to 6d, the unit bodies 41 have an equal size and are mounted in the same manner on the mounting frames 5a and 5b. Consequently, the cassette storage rack units 6b to 6d can be freely exchangeably mounted at desired positions within the changer body 1. The small, medium and large size cassettes 9b to 9d are accommodated in the cassette storage racks 8b to 8d of the cassette storage rack units 6b to 6d, respectively.

In this manner, according to the present automatic cassette changer, a plurality of types of tape cassettes 9a to 9d having different tape recording formats and sizes and a plurality of types of video tape recorders 7a and 7b for recording and/or reproducing the tape cassettes 9a to 9d can be set in position freely and very conveniently as desired by the user.

It is to be noted that, while a detailed description of the cassette storage units 6a for the 8 mm tape cassettes 9a is omitted herein, the cassette storage units 6a have the same size as the cassette storage rack units 6b to 6d and are exchangeably mounted on the mounting frames 5a in the same manner. However, as shown in FIG. 1, the cassette storage rack units 6a are each constructed such that a total of twelve 8 mm tape cassettes 9a having a comparatively small thickness can be accommodated, for example, in four rows and in three columns therein. Also the video tape recorders 7b are exchangeably mounted on the mounting frames 5a by the same mounting method as that for the cassette storage rack units 6a to 6d. A type detecting section 12 is mounted on the front face of the left bracket 45 of each of the cassette storage rack units 6a to 6d at a predetermined vertical position.

Erroneous Cassette Insertion Detection Mechanism for Cassette Storage Rack

A mechanism for detecting erroneous insertion of an inappropriate type of cassette into each cassette storage rack 8a to 8d will be described subsequently with reference to FIGS. 9 to 16.

The distances L1, L2, L3, L4 and L5, L6 in the leftward and rightward directions between the rack frames 42 and the rack plates 43 constituting the cassette storage racks 8b to 8d of the cassette storage rack units 6b to 6d are set to three sizes in accordance with the lengths of the small, medium and large cassettes 9b, 9c and 9d in the leftward and rightward direction, respectively. A pair of left and right erroneous insertion preventing levers 51 are mounted on a rear face plate 41b of the unit body 41 of each of the cassette storage rack units 6b to 6d within the same height as the cassette storage rack 8b, 8c or 9d. It is to be noted that the erroneous insertion preventing levers 51 are mounted on the rear face plate 41b for pivotal motion in the upward and downward directions indicated by arrow marks b and b' (FIG. 12) each by means of a horizontal fulcrum pin 52, and a shutter 53 is formed integrally at a rear end of each of the erroneous insertion preventing lever 51. Each of the erroneous insertion preventing levers 51 is pivoted in the direction of the arrow mark b by its own weight until it stops in a horizontal position. A pair of cassette sensors 54 each in the form of, for example, a photocoupler are mounted on the rear face plate 41b and is each switched on or off by the shutter 53 of the corresponding erroneous insertion preventing lever 51. It is to be noted that a pair of rubber cushions 55 are mounted on the inner side face of the rear face plate 41b within the same height as the cassette storage rack 8b, 8c or 9d, and a cassette stopper 56 is mounted at a front end of each of the rack plates 43 for pivotal motion in the upward and downward directions indicated by arrow marks c and c' each by means of a horizontal fulcrum pin 57 and is normally urged to pivot in the direction of the arrow mark c' by a torsion spring 58. Three sets of cassette protrusion sensors 59a and 59b common to all of the cassette storage rack units 6a to 6d are disposed in a vertically opposed relationship to each other at a central portion and the opposite left and right portions of the front face sides of the cassette storage rack units 6a to 6d. Each of the cassette protrusion sensors 59a and 59b is constituted from a photo-sensor consisting of a light emitting element and a light receiving element.

Correct insertion of a large tape cassette 9d into the cassette storage rack 8d will be described subsequently with reference to FIGS. 10 to 12.

A cut face 92 is formed at an upper portion of the front end face 91 of the tape cassette 9d. Thus, the cassette 9d is inserted correctly horizontally in the direction indicated by an arrow mark d onto the left and right rack plates 43 of the cassette storage rack 8d with the cut face 92d thereof directed forwardly as seen at the medium stage of FIG. 12.

Thereupon, the left and right erroneous insertion preventing levers 51 ride on the cut face 92 of the tape cassette 9d as seen at the lower stage of FIG. 12 so that they are pushed up by the latter in the direction of the arrow mark b', whereupon the shutters 53 thereof turn off the left and right cassette sensors 54 at the same time. Consequently, it is detected by the left and right cassette sensors 54 that the tape cassette 9d has been inserted correctly onto the cassette storage rack 8d. In particular, the left and right cassette sensors 54 detect the cut face 92 of the tape cassette 9d. It is to be noted that, when the tape cassette 9d is inserted fully into the cassette storage rack 8d, simultaneously when the front end face 9a of the tape cassette 9d is abutted with the left and right rubber cushions 55, the left and right cassette stoppers 56 are pivoted in the direction of the arrow mark c' by the torsion springs 58 until the rear end face 93 of the tape cassette 9d is positioned by the cassette stoppers 56, whereupon the three sets of cassette protrusion sensors 59a and 59b are turned on, thereby detecting that tape cassette 9d has been inserted correctly and fully into the cassette storage rack 8d.

Erroneous insertion of a tape cassette 9d onto the cassette storage rack 8d will now be described.

When the tape cassette 9d is inserted incorrectly such as when it is inserted in a backward orientation as indicated by chain lines at the upper stage in FIG. 12 or when it is inserted upside down with the cut face 92 is directed downwardly, the left and right error insertion preventing levers 51 cannot ride on the cut face 92 of the tape cassette 9d, and consequently, the left and right cassette sensors 54 maintain their on state, thereby detecting incorrect insertion of the tape cassette 9d. It is to be noted that, in this instance, the three sets of cassette protrusion sensors 59a and 59b also maintain their off state, thereby detecting protrusion of the tape cassette 9d.

Incidentally, the distance L2 between the rack frames 42 of the cassette storage rack 8b in the leftward and rightward directions is smaller than the sizes of the medium and large size tape cassettes 9c.

However, erroneous insertion of a medium size tape cassette 9c into a cassette storage rack 8d and erroneous insertion of a small size tape cassette 9b into a cassette storage rack 8c are possible. Nevertheless, since a tape cassette 9c or 9b erroneously inserted into a cassette storage rack 8d or 8c in error in this manner cannot be carried between the left and right rack plates 43 of the cassette storage rack 8d or 8c, the left and right cassette sensors 54 for the cassette storage rack 8d or 8c cannot be turned off at the same time, so that insertion of the wrong type of tape cassette is detected.

On the other hand, a cassette for the ½ inch tape, which has the same leftward and rightward size as the ¾ inch digital tape cassettes 9b, 9c and 9d, could be erroneously inserted onto the pair of left and right rack plates 43 of any of the cassette storage racks 8b to 8d. However, since the ½ inch tape cassette has a smaller thickness than the ¾ inch tape digital cassettes 9b, 9c and 9d, it cannot push up the left and right erroneous insertion preventing levers 51 in the direction of the arrow mark b' to turn off both of the left and right cassette sensors 54 at the same time. Consequently, insertion of the wrong type of tape cassette can still be detected.

As described so far, with the present automatic cassette changer, the tape cassettes 9a to 9d having different tape recording formats, sizes and so forth are accommodated and selectively recorded and/or reproduced by means of the video tape recorders 7a and 7b which are not operable with all of the four types of cassette. Although means are provided to prevent erroneous insertion of the wrong type of tape cassette into the different types of storage racks 8a–8d, another possible problem that is also to be prevented is insertion of the wrong type of cassette into any of the video tape recorders 7a or 7b the transport mechanism 10.

Type Detecting Section

Figure 17:
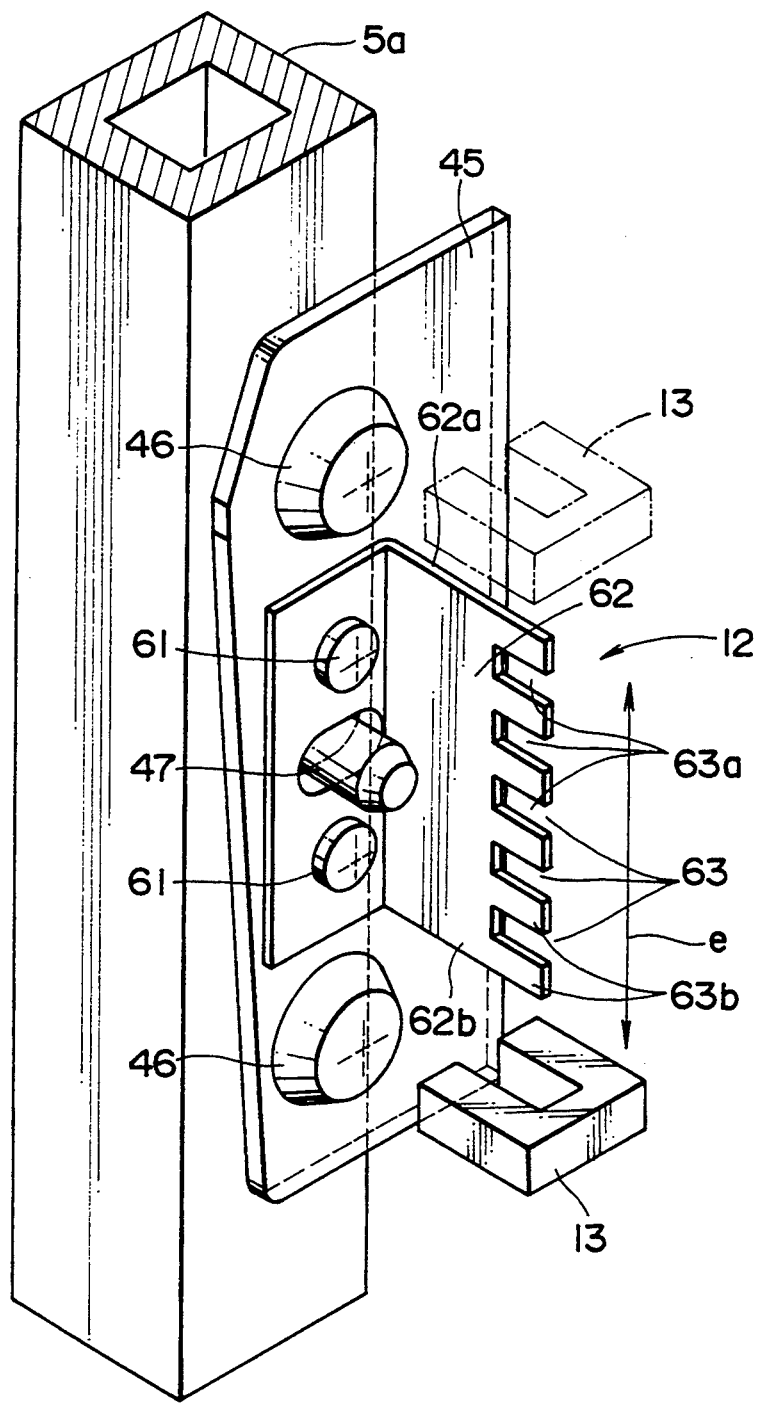
FIG. 17 is a perspective view showing a cassette type detecting section and a cassette type detecting sensor.
Figure 18:
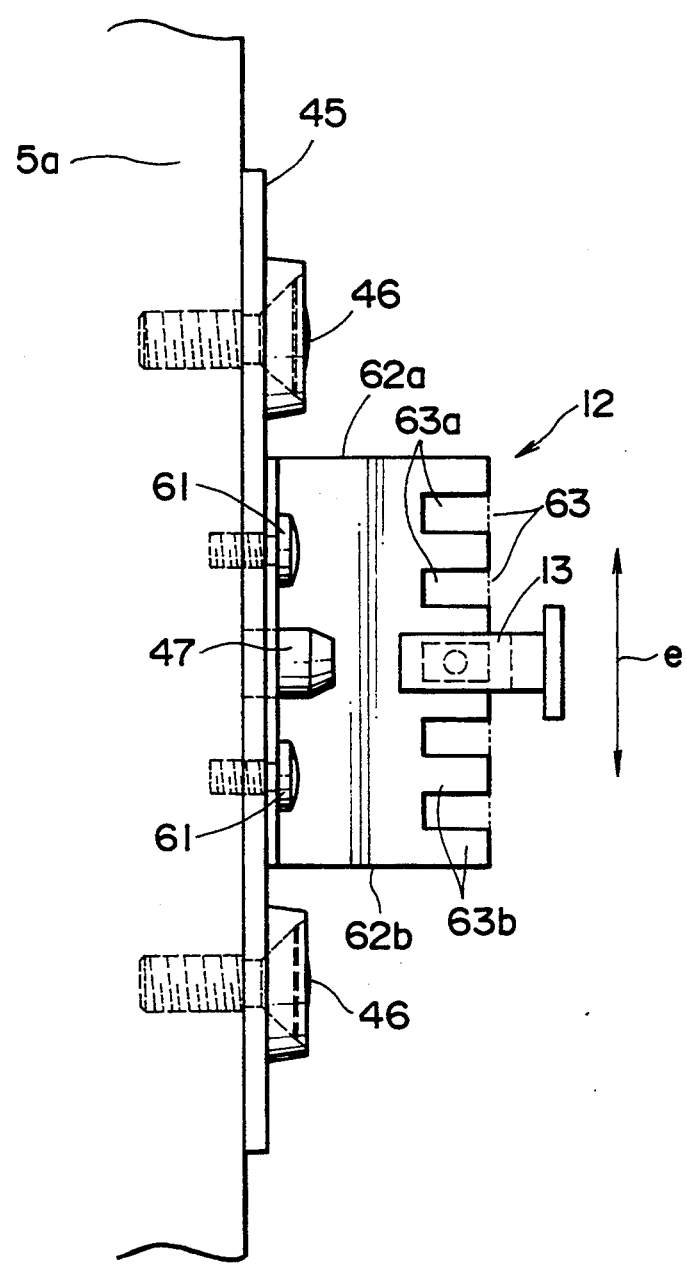
FIG. 18 is a side elevational view of the cassette type detecting section and the cassette type detecting sensor shown in FIG. 17.
Figure 19:
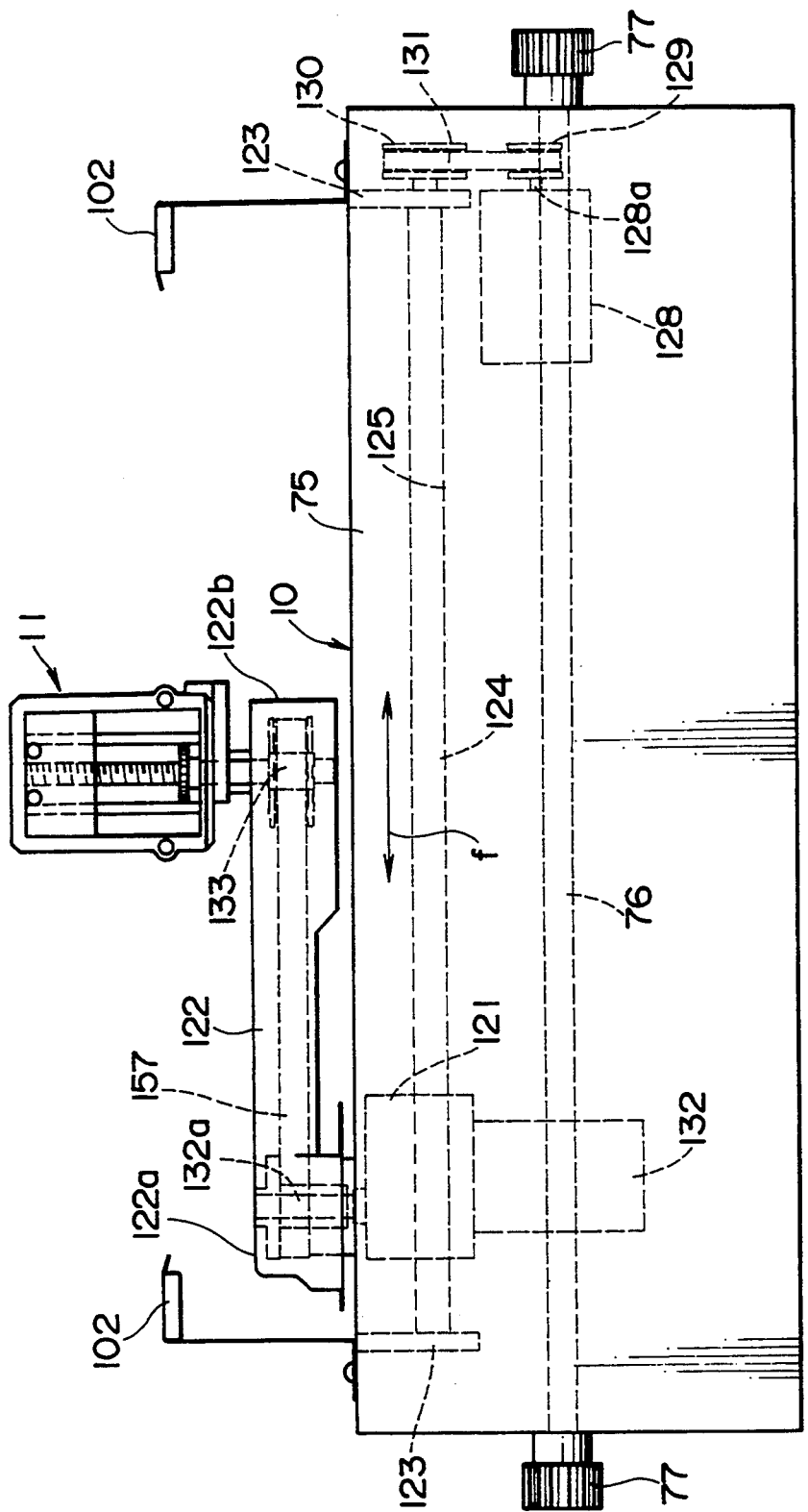
FIG. 19 is a front elevational view of a transport mechanism of the automatic cassette changer shown in FIG. 1.
Figure 20:
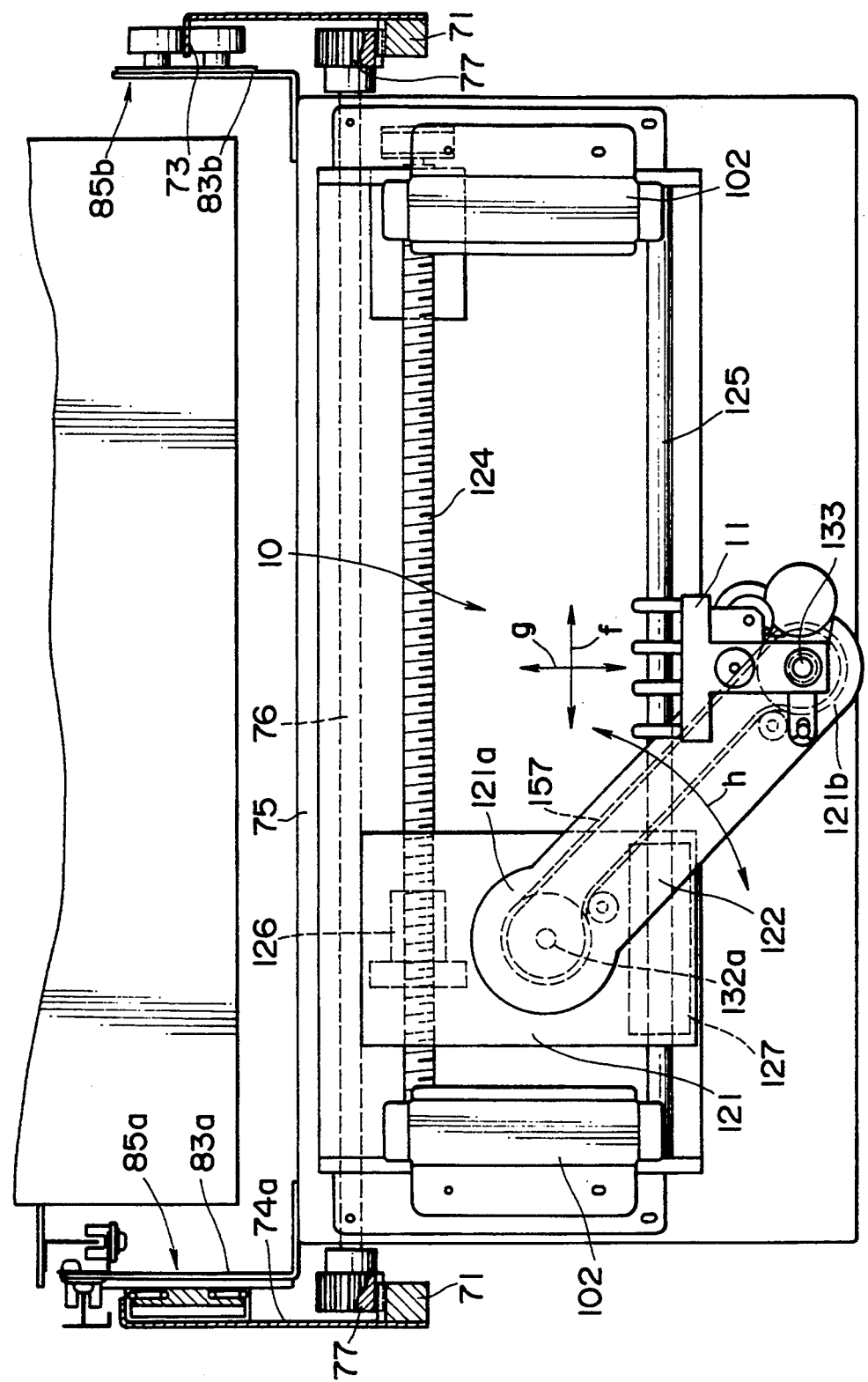
FIG. 20 is a plan view of the transport mechanism.
Figure 21:
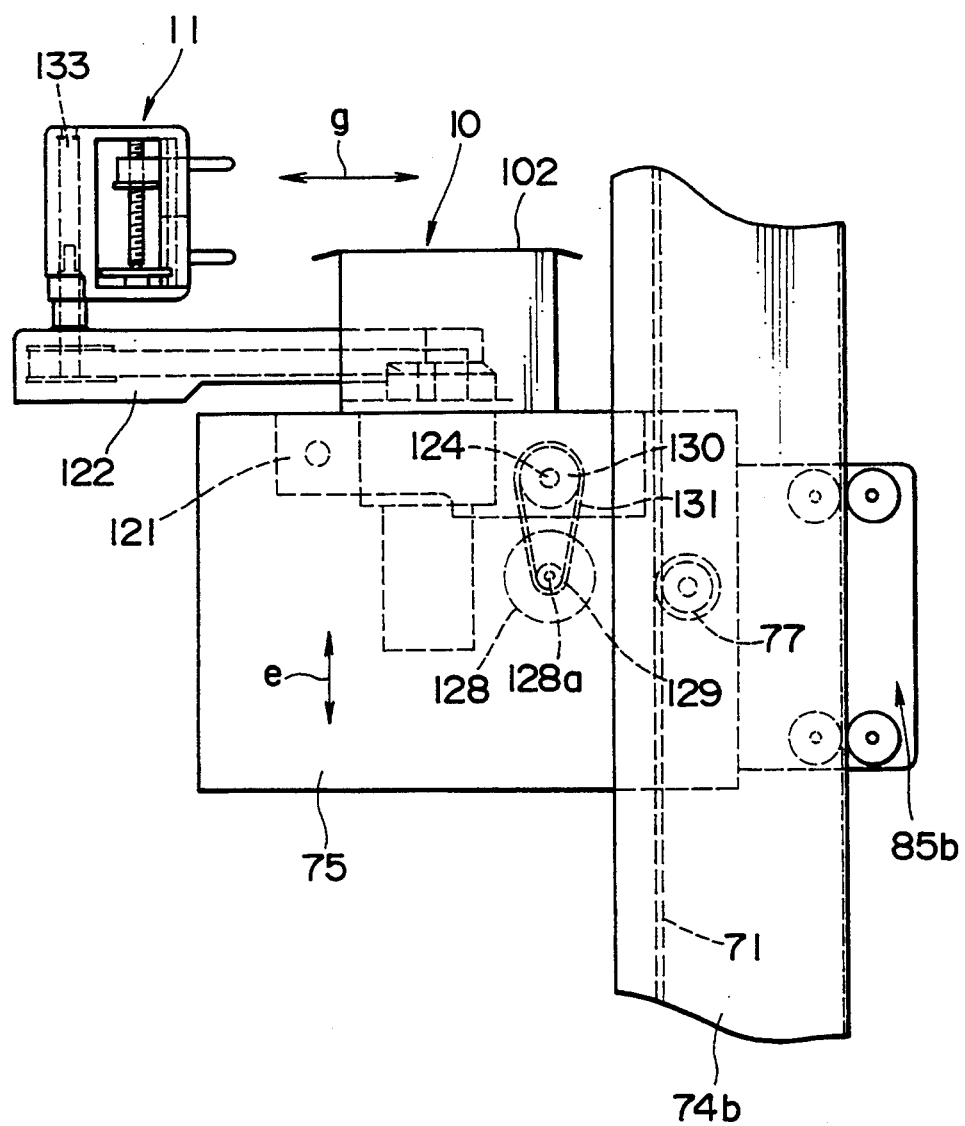
FIG. 21 is a side elevational view of the transport mechanism.
Figure 22:
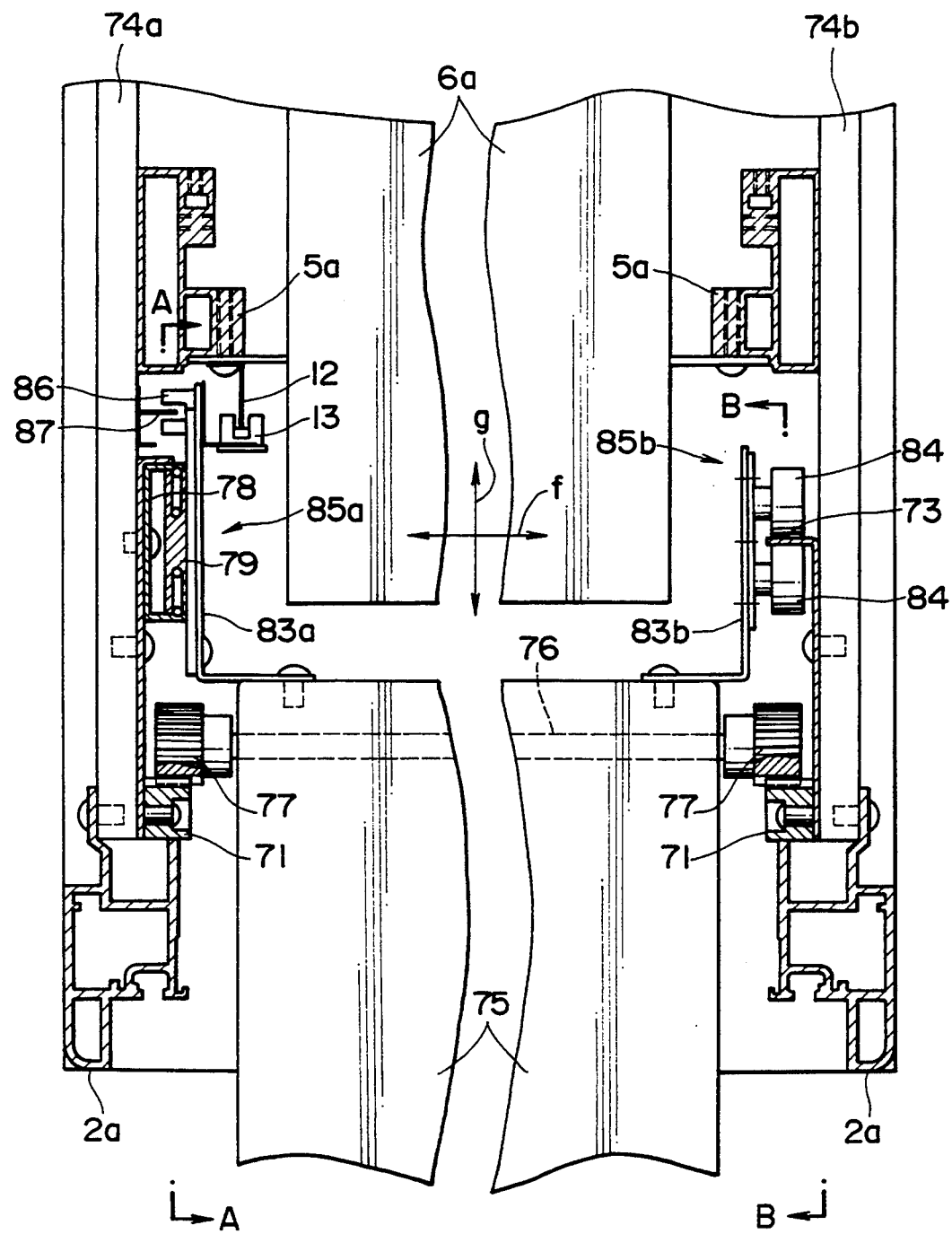
FIG. 22 is a plan view showing travel guides for the transport mechanism.
Figure 23:
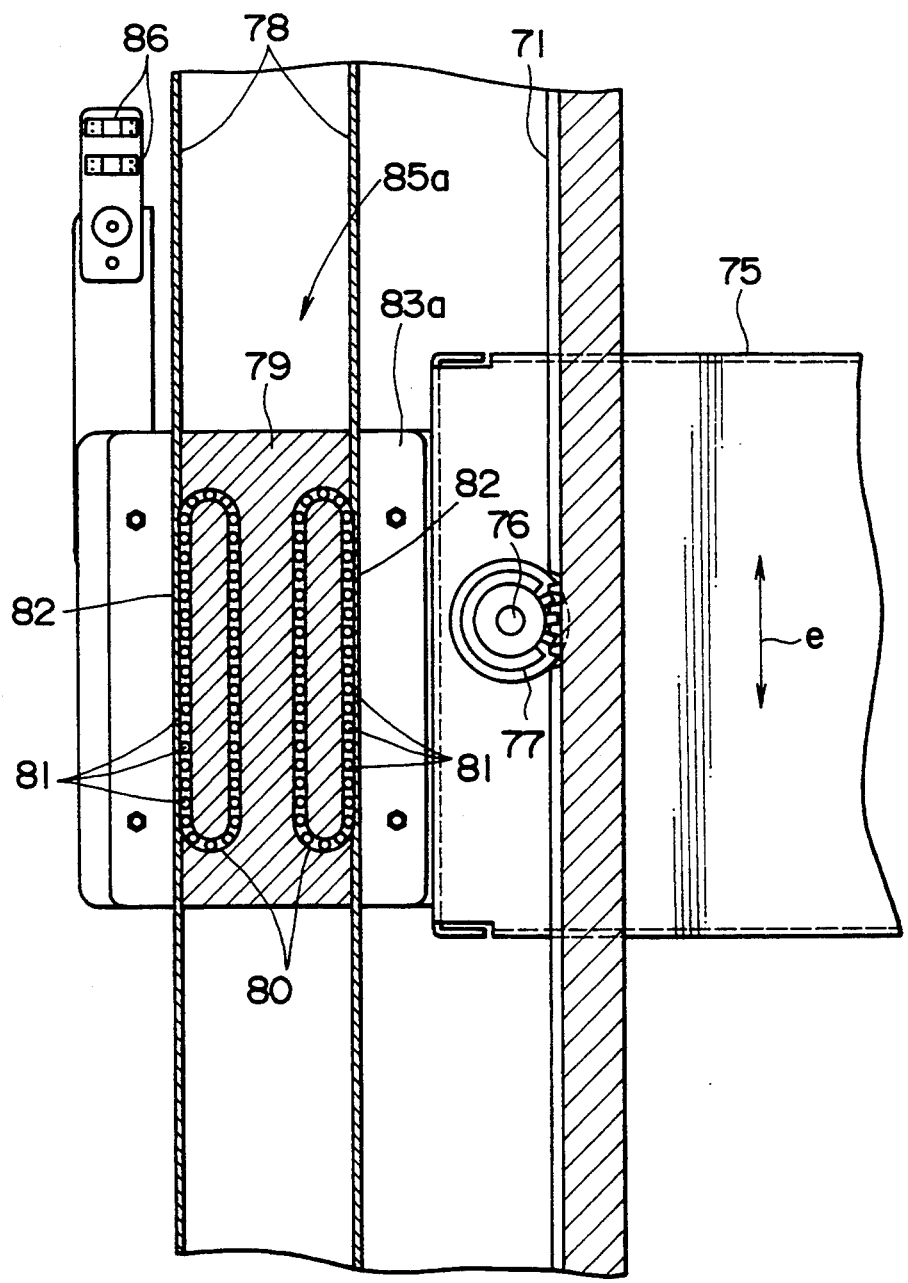
FIG. 23 is a sectional view taken along line A—A in FIG. 22.
Figure 24:
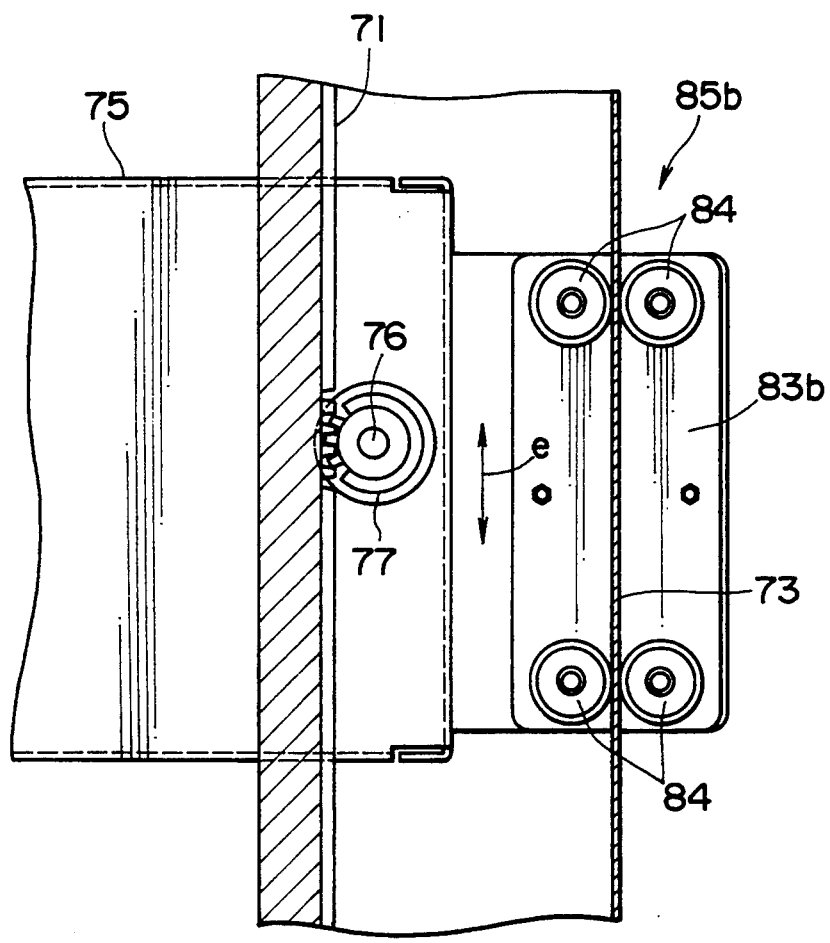
FIG. 24 is a sectional view taken along line B—B in FIG. 22.

A type detecting section 12 and a type detecting sensor 13 will now be described with reference to FIGS. 17 and 18.

As described hereinabove, the type detecting sections 12 are disposed in a vertical column on the left side of the front faces of the cassette storage rack units 6a to 6d and the video tape recorders 7a and 7b. Each of the type detecting sections 12 includes a vertical plate 62 securely mounted on the front face of a bracket 29 or 45 at a predetermined vertical position by means of a pair of upper and lower fastening screws 61. A plurality of signal elements 63 are formed in a vertical column along an end of the vertical plate 62 and indicate the type of the corresponding cassette storage rack unit 6a, 6b, 6c or 6d or video tape recorder 7a or 7b. The signal elements 63 are formed from recesses 63a and projections or tabs 63b and indicate 5 bits of data representative of one of 32 different types of items which may be the types of the cassette storage rack units 6a to 6d and the video tape recorders 7a and 7b.

Figure 25:
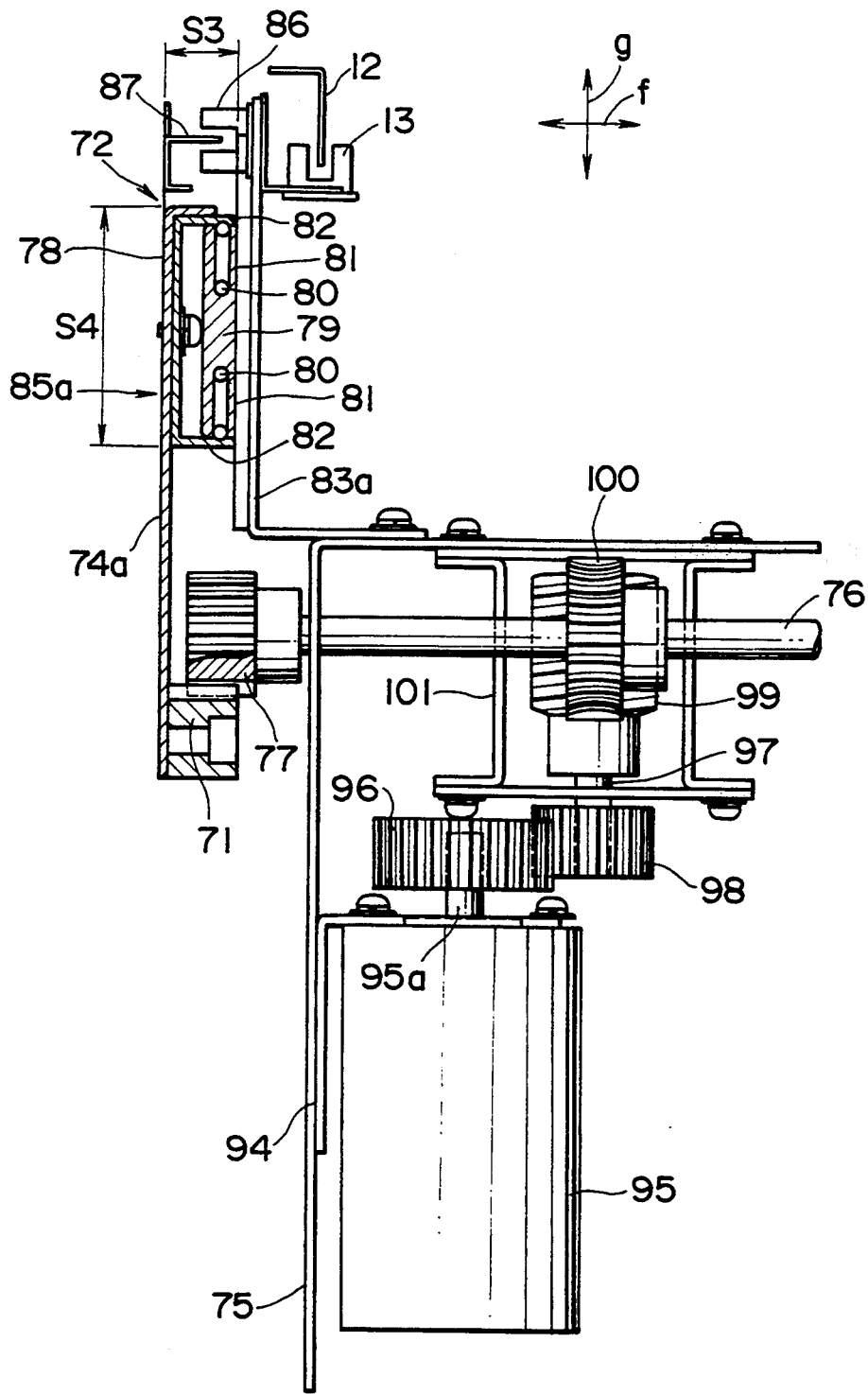
FIG. 25 is a side elevational view showing a slide rail and a pinion driving section of the transport mechanism.

The type detecting sensor 13 in the form of a photocoupler mounted on the transport mechanism 10 scans the signal elements 63 of the vertical plate 62 in the upward and downward directions indicated by a double-sided arrow mark e to read a "1" signal at each recess 63a and a "0" signal at each projection 63b of the signal elements 63 to detect the type represented in the form of 5 bits of data by the signal elements 63 of the vertical plate 62. It is to be noted that, in this instance, the vertical position of the cassette storage rack unit 6a, 6b, 6c or 6d or video tape recorder 7a or 7b is detected by an upper edge 62a (or alternatively a lower edge 62b) of the vertical plate 62, and a designated cassette storage rack 8a, 8b, 8c or 8d in the cassette storage rack unit 6a, 6b, 6c or 6d or the position of the cassette insertion opening 15a or 15b of the video tape recorder 7a or 7b is retrieved by counting the signal elements 63 of the vertical plate 62 downwardly (or upwardly) from the vertical position thus detected. It is to be noted that, as shown in FIG. 25, an origin sensor 86 is mounted on one of a pair of brackets 83a of the transport mechanism 10, and a pair of detecting sections 87 indicative of an origin and upper and lower limits of the transport mechanism 10 are mounted at the opposite upper and lower ends of one of the mounting frames 5. Thus, when power is turned on for the automatic cassette changer, an initializing operation is performed wherein the transport mechanism 10 is moved upwardly and downwardly once until the origin sensor 87 detects the origin detecting section 87, whereupon the transport mechanism 10 is stopped. Thereafter, the position of any of the cassette storage racks 8a to 8d and the video tape recorders 7a and 7b will be retrieved.

In this manner, with the present automatic cassette changer, since the type of any of the cassette storage rack units 6a to 6d and the video tape recorders 7a and 7b is detected by reading the detecting section 12 of the cassette storage rack unit 6a, 6b, 6c or 6d or video tape recorder 7a or 7b by means of the type sensor 13 of the transport mechanism 10 and the cassette transporting operation of the transport mechanism 10 can be controlled in accordance with the detected types, even if any of the cassette storage rack units 6a to 6d and the video tape recorders 7a and 7b is exchanged for some other type of cassette storage rack unit or video tape recorder, the transport mechanism 10 can automatically detect the type of the newly installed equipment. Accordingly, even if any of the cassette storage rack units 6a to 6d and the video tape recorders 7a and 7b is exchanged in accordance with the desire of the user, automatic exchanging of the plural types of tape cassettes having various tape recording formats, sizes and so forth can always be performed with a high degree of accuracy.

Self-Propelled Transport Mechanism and Travel Guides Therefor

The transport mechanism 10 of the self-propelled type and travel guides for the transport mechanism 10 will now be described with reference to FIGS. 19 to 26.

First, referring back to FIGS. 2 and 3, a pair of left and right racks 71 are disposed vertically over the entire range spacing of movement of the transport mechanism 10 in the vertical direction. A pair of slide rails 72 and a pair of fixed rails 73 are mounted vertically on a pair of left and right mounting frames 74a and 74b rearwardly of the left and right racks 71, respectively.

Referring now to FIGS. 19 to 26, a pinion shaft 76 is mounted horizontally at a rear portion of a transport mechanism body 75 and extends leftwardly and rightwardly through the transport mechanism body 75. A pair of left and right pinions 77 are securely mounted at the opposite left and right ends of the pinion shaft 76 and held in meshing engagement with the left and right racks 71, respectively.

Referring now to FIGS. 22 to 25, each of the slide rails 72 includes a vertical slider guide 78 securely mounted on one of the mounting frames 74a and having a substantially channel-shaped cross section, and a slider 79 mounted for sliding movement in the vertical direction in the slider guide 78. A large number of balls 81 are loosely fitted in a pair of vertically elongated front and rear circular slots 80 formed in the slider 79 and are also loosely fitted in a pair of guide grooves 82 formed on a pair of opposing faces of the slider guide 78 in the forward and backward directions. Accordingly, a movement (i.e., a play) of the slider 79 in the slider guide 78 in the leftward or rightward direction (the direction indicated by a double-sided arrow mark f) and the forward or backward direction (the direction indicated by a double-sided arrow mark g) is restricted by the guide grooves 82 so that the slider 78 can be slidably moved smoothly only in the upward and downward directions of the arrow mark e within the slider guide 79. A pair of left and right brackets 83a and 83b are securely mounted at the opposite left and right end portions of a rear portion of the transmitting apparatus body 75, and the slider 79 is securely mounted on the outer side of the bracket 83a. A total of four guide rollers 84 are mounted in upper and lower pairs and in front and rear pairs on the outer side of the other bracket 83b and held in contact with the opposite front and rear faces of the vertical fixed guide rail 73 securely mounted on the other mounting frame 74b. Thus, each of the left and right travel guides 85a and 85b is constituted from the slide rail 72, the fixed guide rail 73 and the guide rollers 84.

Figure 26:
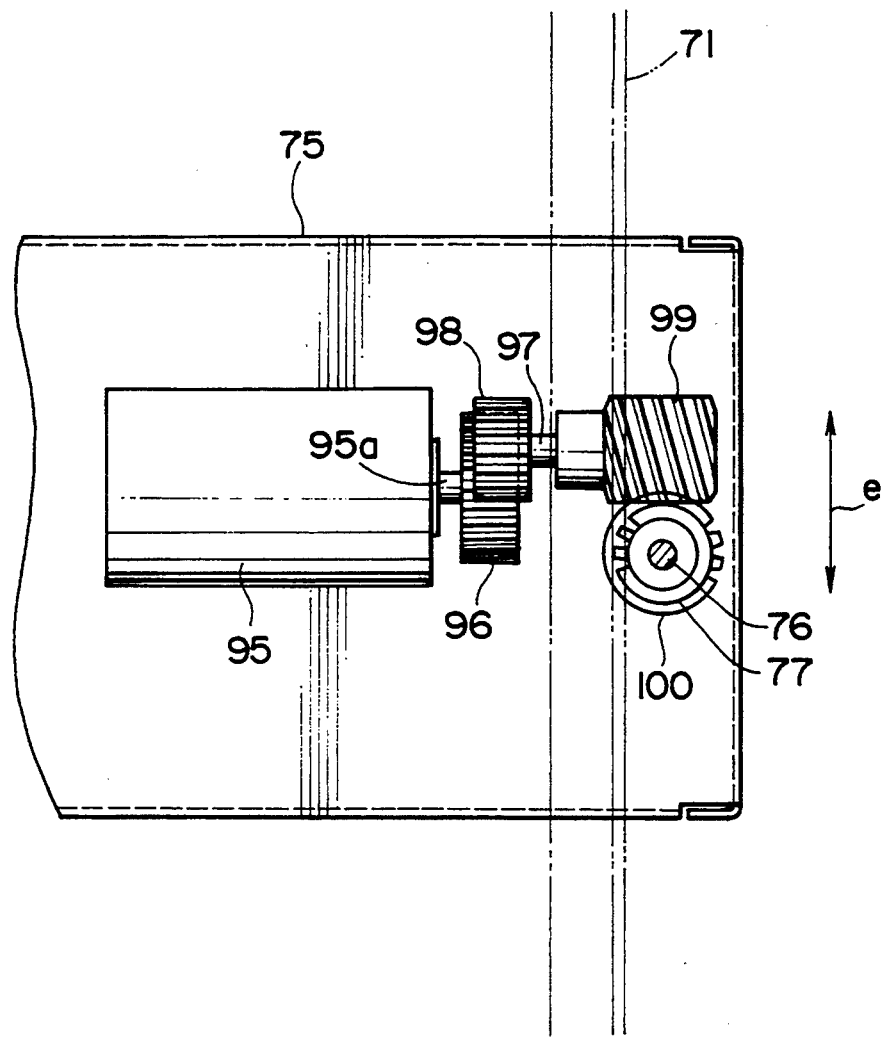
FIG. 26 is a side elevational view of the pinion driving section shown in FIG. 25.

Referring now to FIGS. 25 and 26, a motor 95 serving as driving means is mounted in the transport mechanism body 75 by way of a bracket 94, and a gear 96 is securely mounted on a shaft 95a of the motor 95 and held in meshing engagement with another gear 98 securely mounted on an intermediate shaft 97. The intermediate shaft 97 extends perpendicularly to the pinion shaft 87, and a worm 99 is securely mounted on the intermediate shaft 97 and held in meshing engagement with a worm wheel 100 securely mounted on the pinion shaft 76. It is to be noted that the intermediate shaft 97 is supported on a substantially channel-shaped mounting frame 101 mounted on the inner side of the transport mechanism body 75. A pair of left and right cassette slide guides 102 are mounted horizontally at upper portions of the opposite left and right ends of the transport mechanism body 75.

In the transport mechanism 10 constructed in such a manner as described above, the left and right pinions 77 are driven to rotate by the motor 95 by way of the gears 96 and 98, intermediate shaft 97, worm 99, worm wheel 100 and pinion shaft 76, whereupon the pinions 77 are rolled in the vertical direction indicated by the arrow mark e along the left and right racks 71 to cause the transport mechanism 10 to travel smoothly at a high speed in the vertical direction indicated by the arrow mark e under the guidance of the left and right travel guides 85a and 85b.

One of the left and right travel guides 85a and 85b of the transport mechanism 10 is constituted by the slide rail 72 while the other is constituted by the fixed guide rail 73 and the guide rollers 84, and the movement (play) of the transport mechanism 10 in the leftward and rightward directions (the directions of the arrow mark f) and the forward and backward directions (the directions of the arrow mark g) are restricted by the slide rail 72. Meanwhile, deformation in the form of bending in the left or right mounting frame 74a or 74b is compensated for by slippage of the guide rollers 84 in the directions of the arrow mark f with respect to the fixed rail 73 of the other travel guide 85b. Accordingly, even if either of the left and right mounting frames 74a and 74b has some bending or the like, the transport mechanism 10 can travel and be guided smoothly, and a saving of space can also be achieved.

Figure 27:
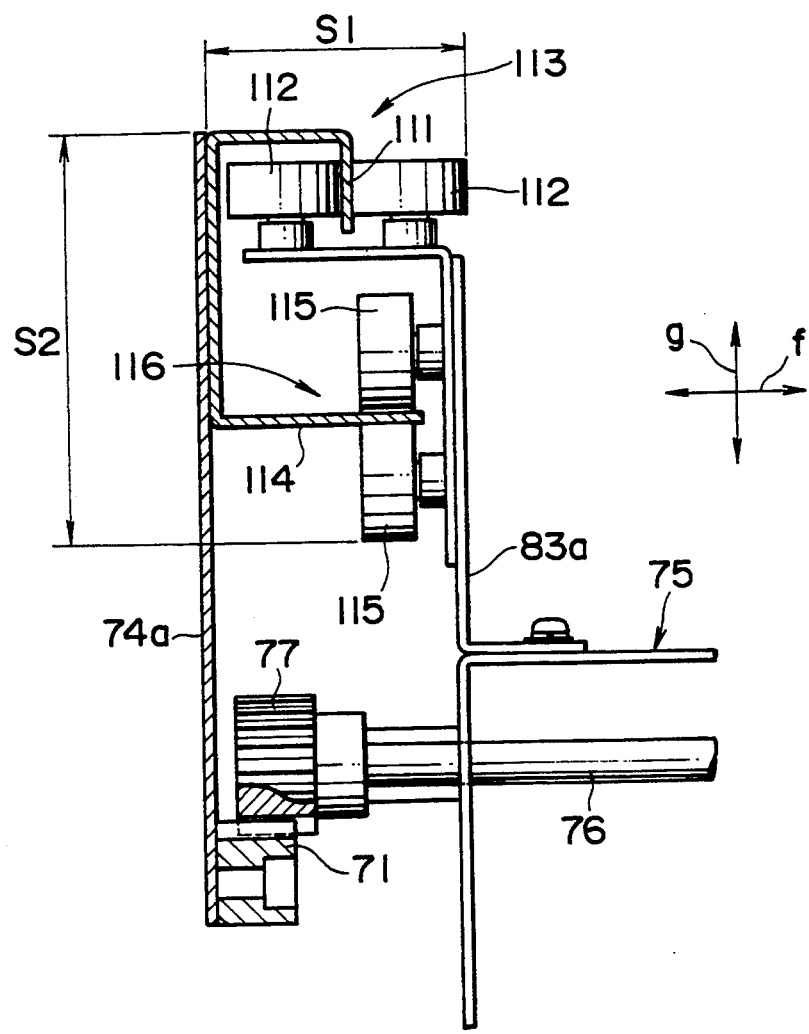
FIG. 27 is a plan view showing an alternative travel guide for the transport mechanism.
Figure 28:
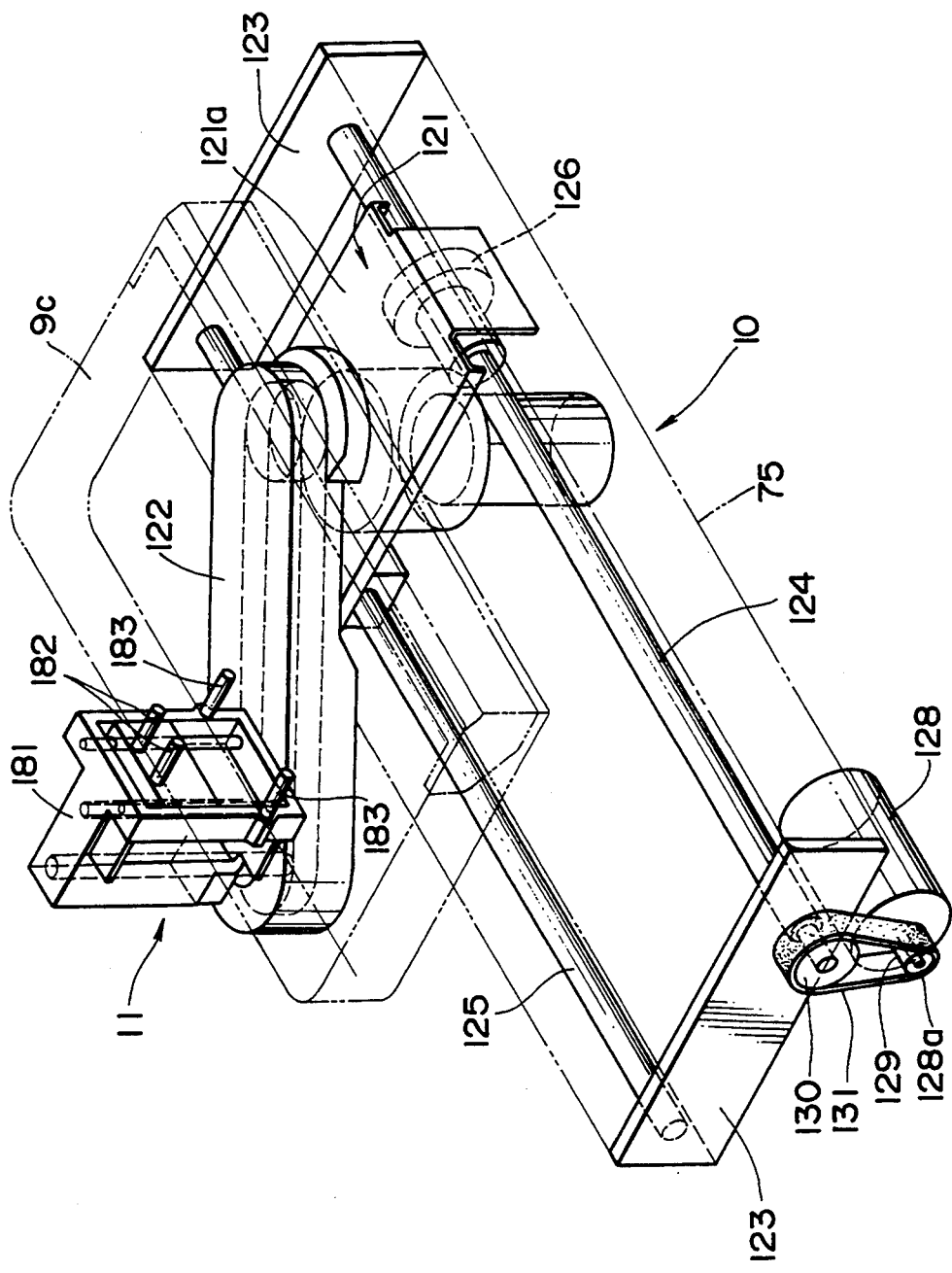
FIG. 28 is a perspective view showing a driving mechanism for a hand block of the transport mechanism.
Figure 29:
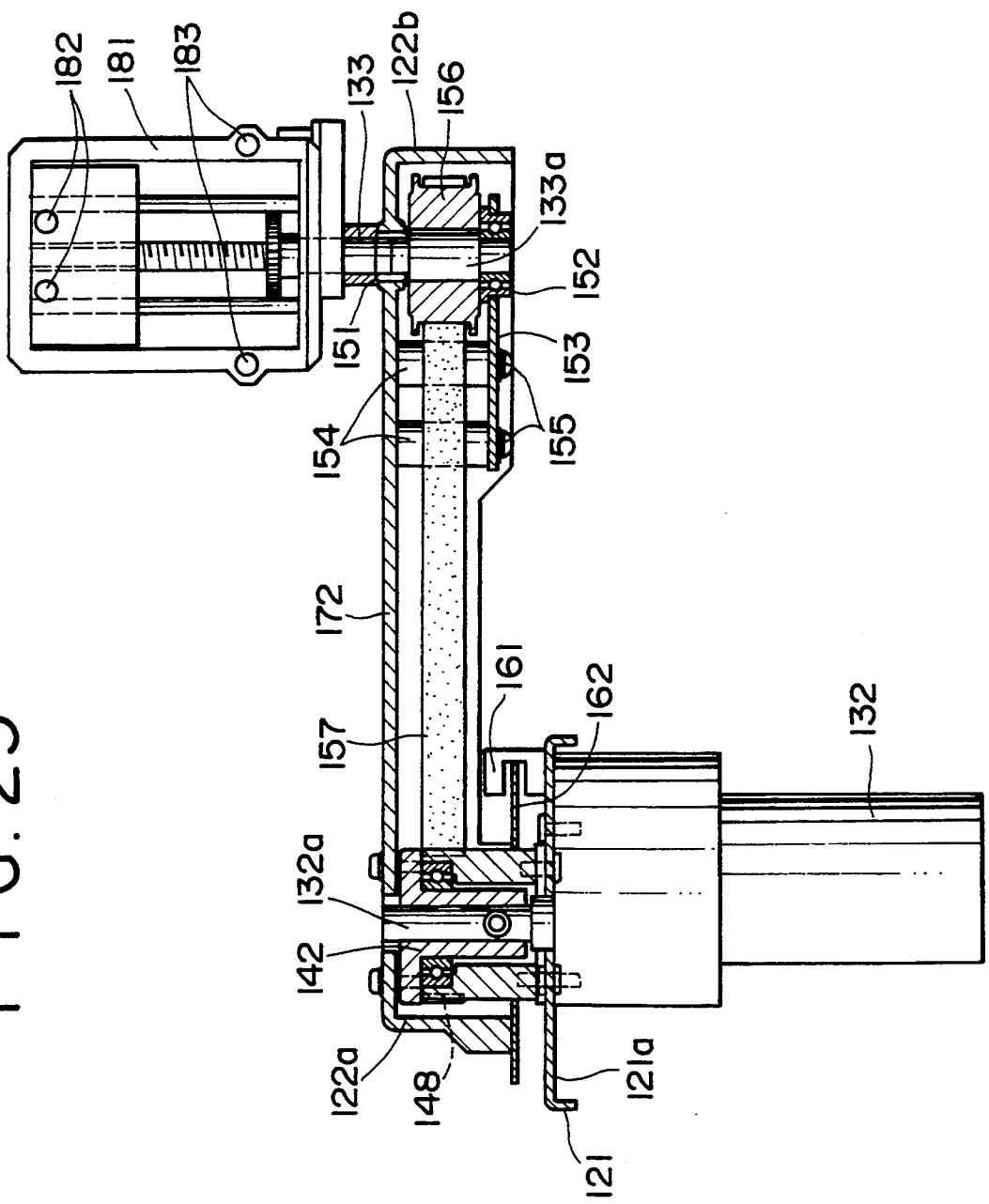
FIG. 29 is a vertical sectional side elevational view showing a pivotal arm of the hand block.
Figure 31:
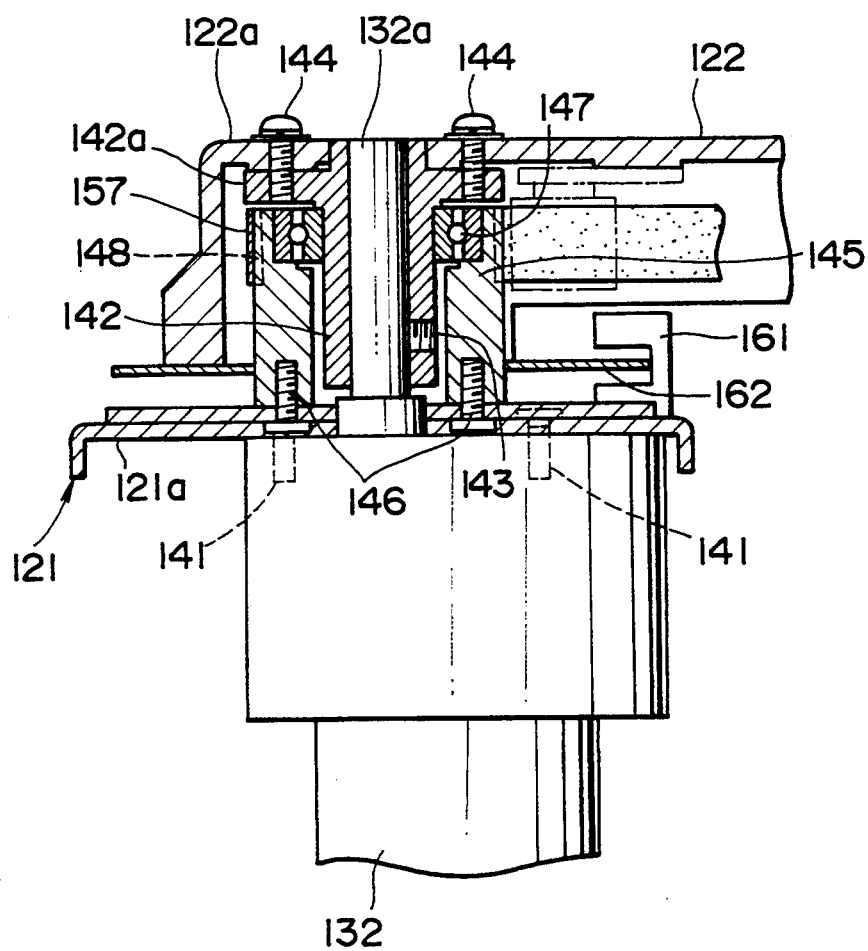
FIG. 31 is a vertical sectional side elevational view showing a pivotally supporting base portion of the pivotal arm.
Figure 32:
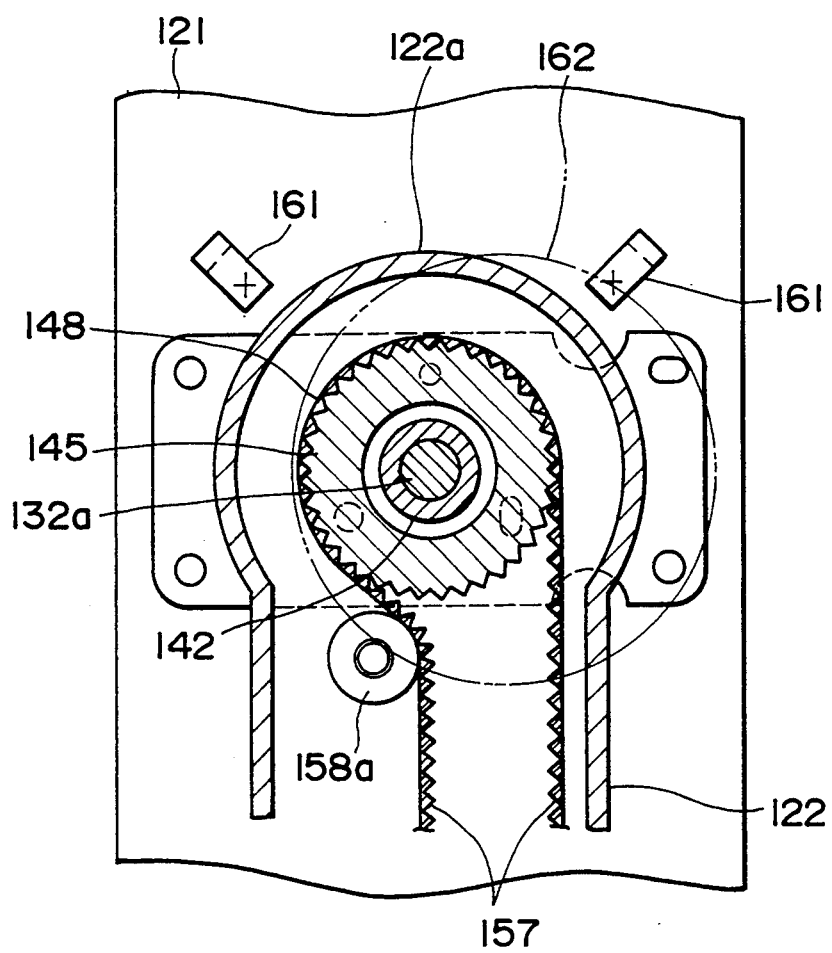
FIG. 32 is a horizontal sectional plan view of the pivotally supporting base portion of the pivotal arm shown in FIG. 31.

In particular, if it is attempted to restrict the movement of the transport mechanism 10 in the leftward and rightward directions (the directions of the arrow mark f) and the forward and backward directions (the directions of the arrow mark g) all by means of the fixed rail and the guide rollers as seen in FIG. 27, then two sets of mechanisms are necessary including a widthwise restricting mechanism 113 including a fixed rail 111 extending in parallel to the directions of the arrow mark g and a total of four guide rollers 112 disposed in left and right pairs and in upper and lower pairs and adapted to be contacted with the opposite left and right side faces of the fixed rail 111 and a depthwise restricting mechanism 114 including a fixed rail 114 extending in parallel to the directions of the arrow mark f and a total of four guide rollers 115 disposed in left and right pairs and in upper and lower pairs and adapted to be contacted with the opposite front and rear faces of the fixed rail 114. As a result, the separate fixed rails 111 and 114 and the respective sets of guide rollers 112 and 115 make the structure of the entire arrangement complicated and make the cost of the arrangement high. Besides, a large space S1 in the widthwise or leftward and rightward directions and a large space S2 in the thicknesswise or forward and backward directions are required.

On the other hand, the travel guide 85a which employs the guide rail 72 as shown in FIG. 25 allows the widthwise space S3 and the thicknesswise space S4 to be very small in comparison with the widthwise space S1 and the thicknesswise space S2 shown in FIG. 27, respectively. Further, since the movement of the transport mechanism 10 in the widthwise direction (the directions indicated by the arrow mark f) and the thicknesswise direction (the directions indicated by the arrow mark g) can be easily restricted by the slide rail 72 of the travel guide 85a, the other travel guide 85b is required only to restrict the movement of the transport mechanism 10 in the thicknesswise direction (the directions indicated by the arrow mark g), and consequently, the fixed rail 111 and the four guide rollers 112 shown in FIG. 27 can be omitted.

Overview of Driving Mechanism for Hand Block

An overview of a driving mechanism for the hand block 11 will now be provided with reference to FIGS. 19 to 21 and 28.

The hand block 11 mounted at an upper portion of the transport mechanism body 75 is mounted for movement in two planes, including a plane indicated by the directions of the arrow mark g which is the direction in which a tape cassette is to be inserted into or removed from any of the cassette according racks 8a to 8d and the video tape recorders 7a and 7b and another plane indicated by the directions of the arrow mark f which is a direction perpendicular to the cassette inserting or removing direction, by means of a slider 121 serving as a driving member and a pivotal arm 122.

In particular, a feed screw 124 and a guide rod 125 are mounted horizontally in parallel to the directions of the arrow mark f on and between a pair of left and right mounting plates 123 securely mounted in the transport machine body 75, and a nut 126 and a thrust bearing 127 are mounted horizontally on the slider 121 and held fitted on the feed screw 124 and the guide rod 125, respectively. A timing pulley 129 is securely mounted on a shaft 128a of a motor 128 mounted in the transport machine mechanism body 75 while another timing pulley 130 is securely mounted at an end portion of the feed screw 124, and a timing belt 131 extends between and around outer peripheries of the timing pulleys 129 and 130. The feed screw 124 is thus driven to rotate by the motor 128 by way of the timing belt 131 to feed the nut 126 to slidably move the slider 121 linearly in either of the directions of the arrow mark f along the guide rod 125.

A motor 132 with a speed reducer is mounted in upward orientation at a lower portion of the slider 121, and the horizontal pivotal arm 122 is securely mounted at an end 122a thereof on an output shaft 132a extending vertically upwardly from an upper end of the motor 132. The hand block 11 is mounted at an upper portion of the other end 122b of the pivotal arm 122 by way of a vertical mounting shaft 133. The pivotal arm 122 is thus driven to pivot in either of the directions indicated by a double-sided arrow mark h integrally with the output shaft 132a of the motor 132. The hand block 11 is thus moved linearly in either of the directions of the arrow mark f by means of the slider 122, and the hand block 11 is moved linearly in either of the directions of the arrow mark g by a composite movement of the pivotal motion of the pivotal arm 122 in either of the directions of the arrow mark h and the linear movement of the slider 121 in either of the directions of the arrow mark f.

Details of Driving Mechanism for Hand Block

The driving mechanism for the hand block 11 will be described more in detail below with reference to FIGS. 28 to 34, 36 and 53.

Referring first to FIGS. 28 to 34, the motor 132 with a speed reducer is mounted vertically in upward orientation at a lower portion of the slider base 121a of the slider 121 by means of a plurality of screws 141, and the output shaft 132a of the motor 132 extends vertically upwardly above the slider base 121a. A flanged sleeve 142 is securely mounted at an outer periphery of the output shaft 132a of the motor 132 by means of a plurality of screws 143, and the horizontal pivotal arm 122 is securely mounted at the end 122a thereof on the flange 142a of the sleeve 142 by means of a plurality of screws 144. A cylindrical shaft 145 is fitted coaxially in a spaced relationship on an outer periphery of the sleeve 142 and is securely mounted on the slider base 121a by means of a plurality of screws 146, and the outer periphery of the sleeve 142 is supported on an inner periphery of the upper end of the cylindrical shaft 145 by way of a bearing 147. A fixed timing pulley 148 is formed on the outer periphery of the top end of the cylindrical shaft 145.

A lower end 133a of the vertical mounting shaft 133 is fitted from above with the other end of the pivotal arm 122 and is supported for rotation at two vertically spaced portions thereof by an upper oil-impregnated bearing 151 and a lower bearing 152. A mounting plate 153 for the lower bearing 152 is mounted on a pair of mounting bases 154 of the pivotal arm 122 by means of a plurality of screws 155. A rotary timing pulley 156 having the same diameter as the fixed timing pulley 148 is securely fixed, for example, by force fitting to an outer periphery of a portion of the lower end 133a of the mounting shaft 133 between the oil-impregnated bearing 151 and the bearing 152, and a timing belt 157 serving as rotation controlling means extends between and around the outer peripheries of the fixed timing pulley 148 and the rotary timing pulley 156. The timing belt 157 is held in a taut condition by means of a pair of tension pulleys 158a and 158b mounted on the pivotal arm 122. It is to be noted that the pivotal arm 122 is formed as a cover which covers over the outer peripheries of the fixed timing pulley 148, the rotary timing pulley 156 and the timing belt 157. An encoder for detecting an angular position of the pivotal arm 122 is constituted from a plurality of sensors 161 in the form of photo-couplers or the like mounted on the slider base 121a on the outer periphery of the cylindrical shaft 145 and a rotary plate 162 mounted for rotation together with the pivotal arm 122.

Figure 36:
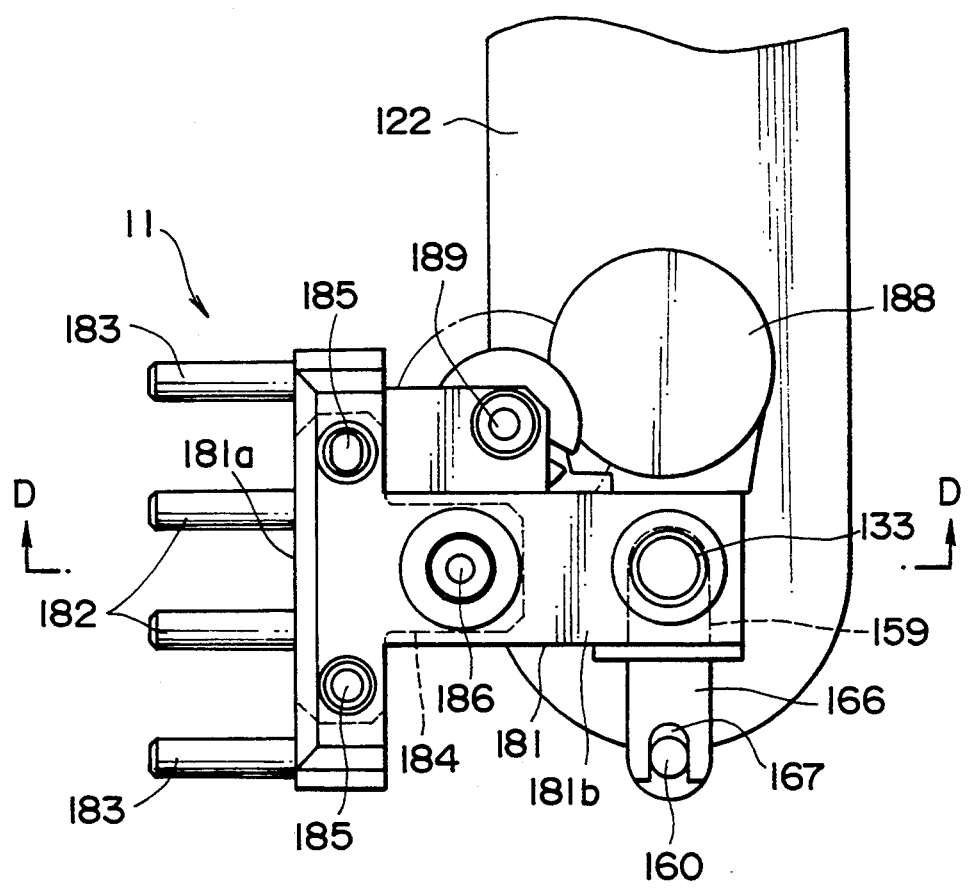
FIG. 36 is a plan view of the hand block.
Figure 53:
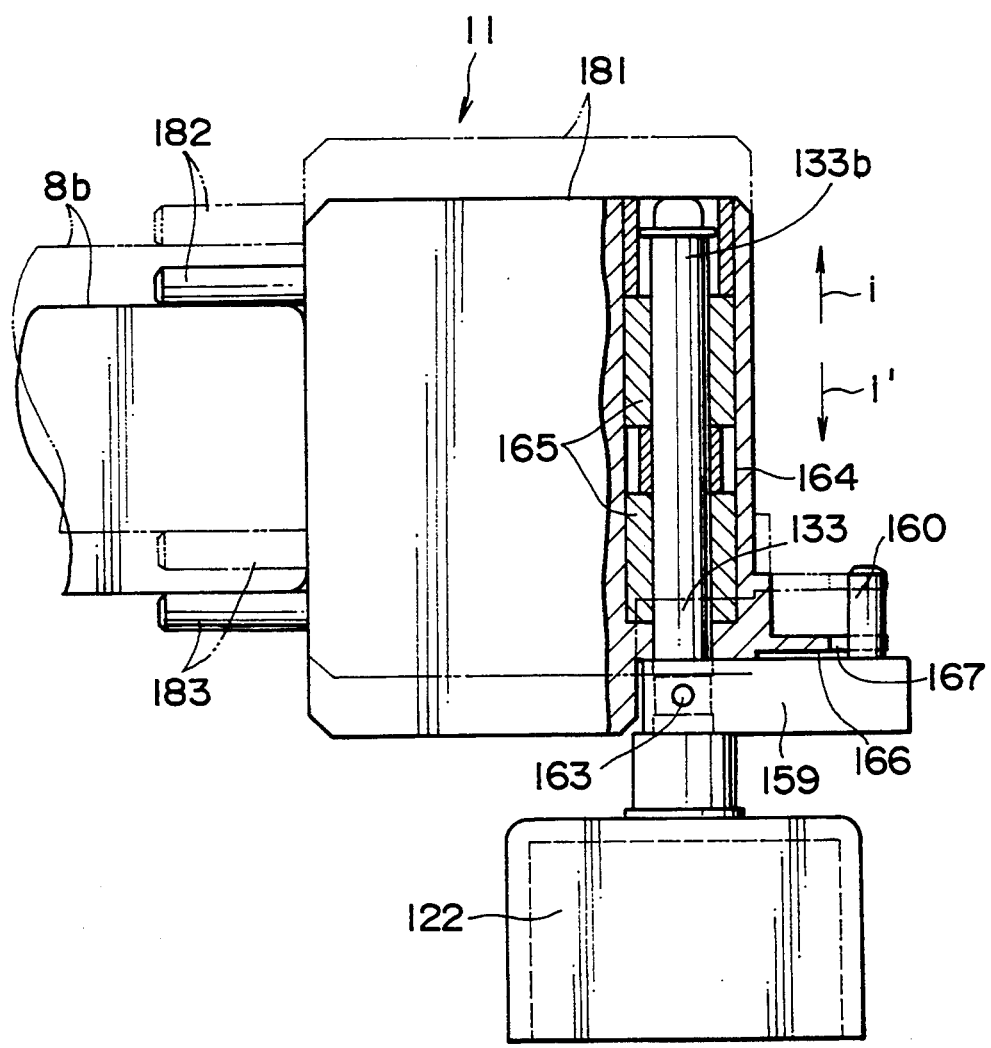
FIG. 53 is a side elevational view, partly in section, showing an automatic centering mechanism of the hand block.

Referring now to FIGS. 36 and 53, a mounting arm 159 is securely mounted horizontally on the mounting shaft 133 by means of a screw 163, and a turning motion preventing pin 160 is mounted vertically at an upper portion of an end of the arm 159. A vertical mounting hole 164 is formed in the hand block 11, and a pair of upper and lower sleeves 165 are mounted in the mounting hole 164. A groove 167 is formed at an end of a projection 166 extending horizontally from a portion of the hand block 11 in the proximity of the mounting hole 164. The hand block 11 is fitted from above on the outer periphery of the mounting shaft 133 adjacent the upper end 133b with the sleeves 165 interposed therebetween until it is abutted with the arm 159, and the turning motion preventing pin 160 is fitted in the groove 167 of the projection 166. Accordingly, the hand block 11 is turned integrally with the mounting shaft 133 by way of the turning motion preventing pin 160. It is to be noted that the entire hand block 11 is mounted for upward and downward movement in the directions indicated by arrow marks i and i' with respect to the mounting shaft 133 and the turning portion preventing pin 160.

With the driving mechanism for the hand block 11 having such a construction as described above, if the output shaft 132a of the motor 132 is driven to rotate forwardly or in reverse in the directions indicated by the arrow mark i or i' as shown in FIG. 30, then the pivotal arm 122 is driven to pivot forwardly or in reverse, in the directions of the arrow mark h or h' integrally with the output shaft 132a. In this instance, since the pivotal arm 122 is pivoted on the outer periphery of the fixed timing pulley 148 securely mounted on the slider base 121a, the phase of the timing belt 157 on the outer periphery of the fixed timing pulley 148 is varied in accordance with the pivotal motion of the pivotal arm 122. Consequently, the timing belt 157 drives the mounting shaft 133 by way of the rotary timing pulley 156 to rotate by the same angle as the output shaft 132a in the direction indicated by an arrow mark k or k' which is the opposite direction to the direction of rotation of the output shaft 132a. Then, the mounting shaft 133 in turn drives the hand block 11 to turn in the direction of the arrow mark k or k' by way of the turning motion preventing pin 160.

As a result, the amount of rotation of the output shaft 132a of the motor 132 is canceled by an equal amount of rotation in the opposite direction by the mounting shaft 133, and the hand block 11 is moved in parallel to of the arrow mark h or h' while keeping its posture parallel to the direction of the arrow mark f.

Figures 33A, 33B, 33C:
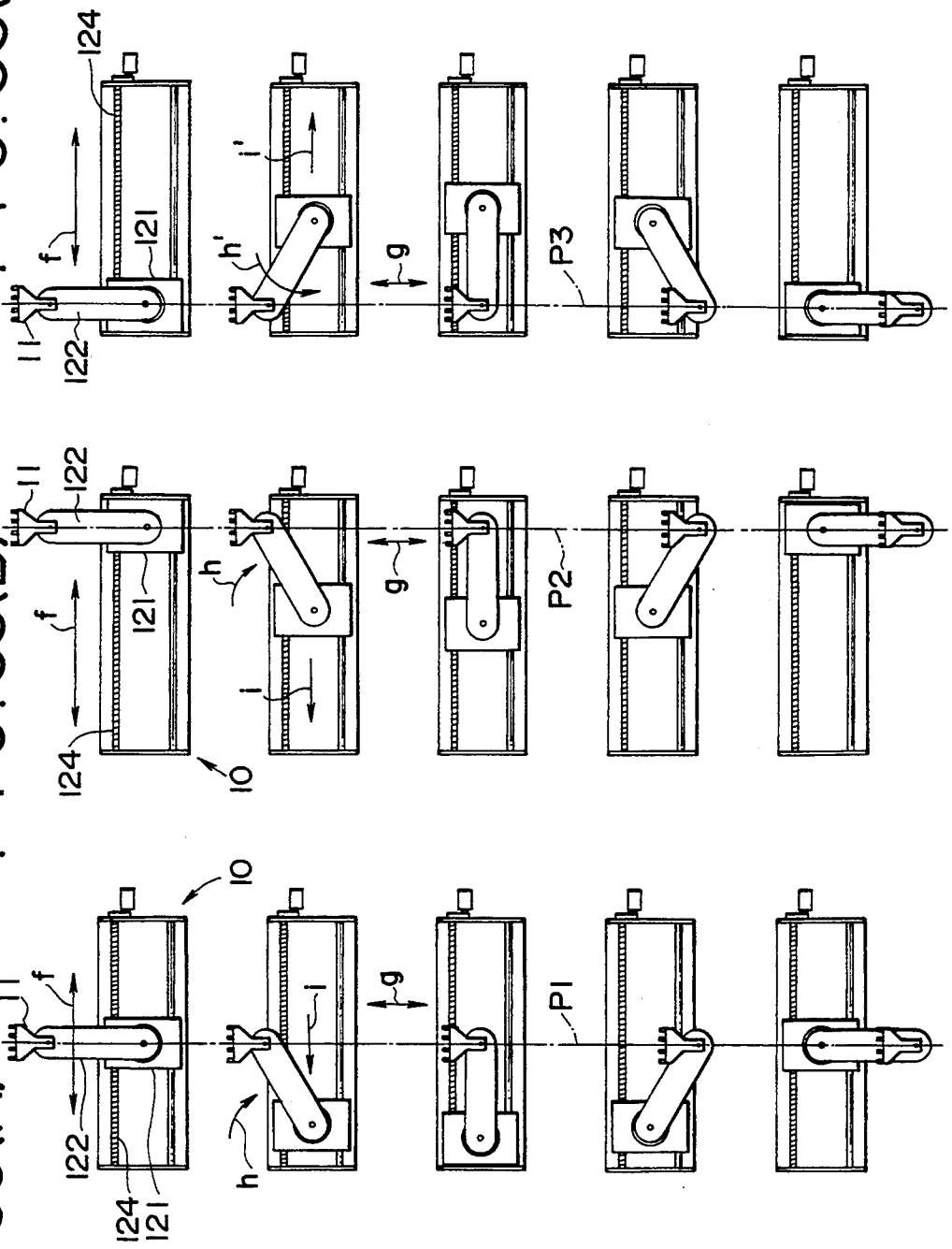
FIGS. 33(A) to 33(C) are schematic views illustrating linear movements of the hand block by the pivotal arm.
Figure 35:
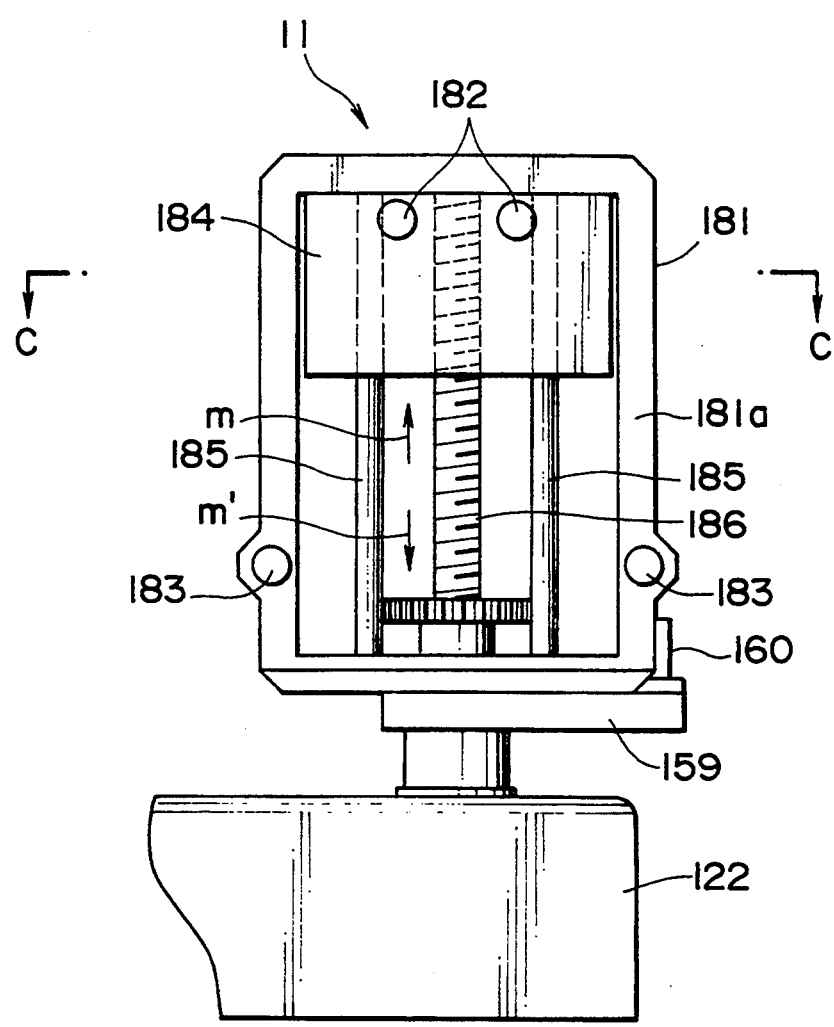
FIG. 35 is a front elevational view of the hand block.

Accordingly, with the present the automatic cassette changer, by synchronizing the pivotal motion of the pivotal arm 122 in the direction of the arrow mark h or h' and the linear movement of the slider 121 in either of the directions of the arrow mark f as seen from FIGS. 33(A) to 33(C), the hand block 11 can be moved linearly in parallel to the directions of the arrow mark g which is the cassette inserting or removing direction while keeping the posture parallel to the directions of the arrow mark f (in the posture wherein the hand block 11 is always kept directed in parallel to the cassette accommodating racks 8a to 8d and the video recorders 7a and 7b) due to a combination of the pivotal motion and the linear movement. It is to be noted that FIG. 33(A) shows different successive stages of a series of movements of the hand block 11 when it linearly moves in parallel to the directions of the arrow mark g on the center line P1 of the transport mechanism 10; FIG.

33(B) shows different successive stages of a series of movements of the hand block 11 when it linearly moves in either of the directions of the arrow mark g on a right side line P2 of the transport mechanism 10; FIG. 33(C) shows different successive stages of a series of movements of the hand block 11 when it linearly moves in parallel to either of the directions of the arrow mark g on a left side line P3 of the transporting machine 10. Then, since the hand block 11 can be moved linearly in parallel to the directions of the arrow mark g at any position between the left and right side lines P3 and P2, the position at which a tape cassette 9a, 9b, 9c or 9d is to be transferred to or from any of the cassette accommodating racks 8a to 8d and the video tape recorders 7a and 7b can be selected freely in the directions of the arrow mark f between the left and right side lines P3 and P2.

Then, by pivoting the pivotal arm 122 by 180 degrees in either of the directions of the arrow mark g with respect to the slider 121 as shown at the uppermost and lowermost stages of FIGS. 33(A) to 33(C), the hand block 11 can be linearly moved with a long stroke in the directions of the arrow mark g while keeping the posture wherein it is directed in parallel to the cassette accommodating racks 8a to 8d and the video tape recorders 7a and 7b. However, during the linear motion of the hand block 11, the pivotal arm 122 is only pivoted within a small space in the direction of the arrow mark h or h' around the slider 121.

It is to be noted that the left and right columns of representations of FIG. 34 (A) respectively illustrate the space required for movements of the pivotal arm 122 when a small or 8 mm tape cassette 8a and a large tape cassette 8d are inserted or removed in either of the directions of the arrow mark g by the hand block 11 of the automatic cassette changer. Meanwhile, the left and right columns of representations of FIG. 34 (B) respectively illustrate required spacings occupied by a second feeding mechanism 72 when a small tape cassette 8a and a large tape cassette 8d are inserted or removed in either of the directions of the arrow mark g by the hand block 11 where the feeding mechanism for the hand block 11 is divided into a first feeding mechanism 71 in the form of a feed screw and so forth for feeding the hand block 11 in the directions of the arrow mark g and the second feeding mechanism 72 in the form of a feed screw and so forth for feeding the hand block 11 in the directions of the arrow mark g. If the two cases are compared with each other, then it is apparent that the space required for movement of the pivotal arm 22 is less by an amount corresponding to the distance S5 in the directions of the arrow mark g in comparison with the space required for the second feeding mechanism 72.

It is to be noted that, while the timing belt 57 is employed as rotation controlling means for the mounting shaft 133 in the arrangement described above, the fixed timing pulley 148 and the rotary timing pulleys 156 may be replaced by gears which are interconnected by a gear train.

Hand Block

Details of the hand block 11 will now be described with reference to FIGS. 35 to 42(B).

The hand block 11 includes a hand block body 181 which has a substantially T shape in plan and has a vertically elongated rectangular shape in front elevation. Two pairs of left and right horizontal cassette holding pins 182 and 183 are mounted horizontally on the front face 181 of the hand block 181 in a spaced relationship in the vertical direction which is a cassette thicknesswise direction. The upper left and right cassette holding pins 182 are spaced by a smaller distance in the leftward and rightward directions in FIG. 35 and are securely mounted perpendicularly on the front face of a vertical slider 184 so that they can be moved upward and downwardly in the directions indicated by arrow marks m and m' together with the slider 184. Meanwhile, the lower left and right cassette holding pins 183 are spaced by a greater distance in the leftward and rightward directions and are securely mounted perpendicularly at the opposite left and right side positions of the front face 181a of the hand block body 181.

A pair of left and right guide shafts 185 and a feed screw 186 are mounted vertically in a triangular arrangement in plan between a pair of upper and lower walls 181b and 181c in the hand block body 181. The slider 184 is fitted for upward and downward movement on the left and right guide shafts 185 with thrust bearings 184a interposed therebetween, and a nut 187 is secured to the slider 184 and held in threaded engagement with the feed screw 186. A motor 188 and a vertical intermediate shaft 189 are mounted in the hand block body 181, and a gear 190 is securely mounted on a shaft 188a of the motor 188 and held in meshing engagement with a torque limiter gear 191 loosely fitted on the intermediate shaft 189. A torque limiter 192 is interposed between the torque limiter gear 191 and the intermediate shaft 189, and a gear 193 is securely mounted on the intermediate shaft 189 and is held in meshing engagement with another gear 194 securely mounted on the feed screw 186. Further, an encoder 197 serving as opening distance controlling means is constituted by a shutter disk 195 securely mounted on the intermediate shaft 189 and a sensor 196 in the form of a photo-coupler or the like mounted in the hand block body 181. An upper limit sensor 199 and a lower limit sensor 200 are mounted in the hand block body 181 such that they are turned on or off by a shutter plate 198 mounted on the slider 184 to detect an upper limit position and a lower limit position of the cassette holding pins 182, respectively.

Figure 42A:
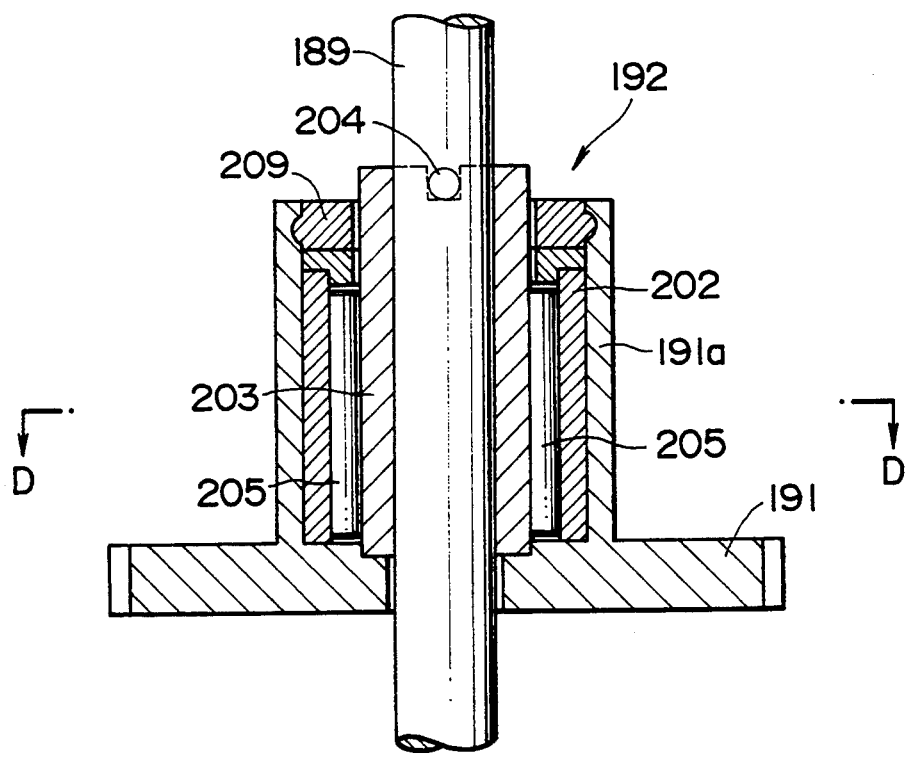
FIG. 42(A) is a vertical sectional side elevational view of a torque limiter of the cassette holding pin opening and closing mechanism shown in FIG. 41.
Figure 42B:
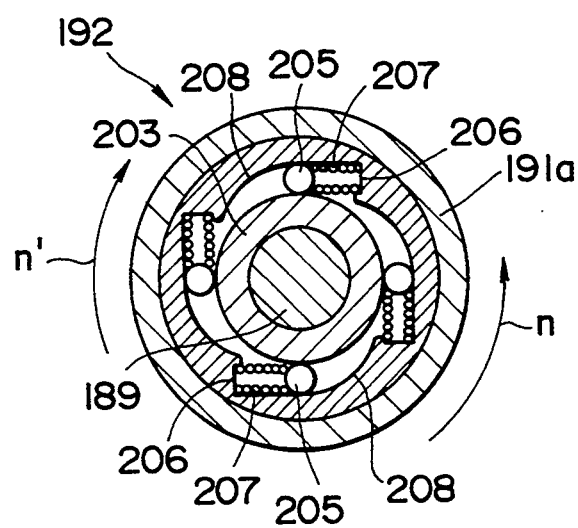
FIG. 42(B) is a sectional view taken along line E—E of FIG. 42(A)

An exemplary form of the torque limiter 192 is shown in FIGS. 42(A) and 42(B). Referring to FIGS. 42(A) and 42(B), the torque limiter 192 shown is formed as a roller type torque limiter wherein a cylindrical outer ring 202 is securely mounted by force filling or like means in a cylindrical portion 191a formed integrally on the torque limiter gear 191, and a cylindrical inner ring 203 is fitted on an outer periphery of the intermediate shaft 189 and is securely mounted on the intermediate shaft 189 by means of a pin 204. Further, a plurality of, for example, four, rollers 205 are inserted in parallel to the intermediate shaft 189 between the outer and inner rings 202 and 203 and are normally biased such that they are resiliently pressed between the outer peripheral face of the inner ring 203 and four wedge-shaped friction faces 208 formed on the inner circumferential face of the outer ring 202 by four compression coil springs 207 accommodated in four recesses 206 of the outer ring 202. It is to be noted that a closing member 209 is mounted at the open end of the cylindrical portion 191a of the torque limiter gear 191.

The torque limiter 192 transmits rotational torque to the intermediate shaft 189 by way of the rollers 205, when the torque limiter gear 191 on the input side is driven to rotate in the direction indicated by an arrow mark n. However, when the load to the intermediate shaft 189 is lower than a predetermined torque value, the intermediate shaft 189 is rotated integrally with the torque limiter gear 191, but is rotated integrally with the torque limiter gear 191, but when the load to the intermediate shaft 189 is equal to or higher than the predetermined torque value, a rotational slip of the intermediate shaft 189 with respect to the torque limiter gear 191 is produced by a slip of the rollers 205 with respect to the friction face 208. It is to be noted that, when the torque limiter gear 191 is rotated reversely in the direction indicated by an arrow mark n', such rotational slip as described above is not produced at all and a non-slipping condition is established so that the intermediate shaft 189 is rotated integrally with the torque limiter gear 191 irrespective of the magnitude of the load to the intermediate shaft 189.

Operation of Hand Block

Various operations of the hand block 11 will now be described with reference to FIG. 41.

Origin Locating Operation

When the power is turned of for the automatic cassette changer, the motor 188 is energized to rotate forwardly so that the feed screw 186 is driven to rotate forwardly by way of the gears 190 and 191, torque limiter 192, intermediate shaft 189 and gears 193 and 194. Consequently, the slider 184 is moved downwardly in the direction indicated by an arrow mark m' under the guidance of the left and right guide shafts 185 by screw feeding of the nut 187 by the feed screw 186, and thereupon, the cassette holding pins 182 are moved downwardly in parallel to the direction of the arrow mark m' integrally with the slider 184. Then, the position at which the lower limit sensor 200 detects the shutter plate 198 is the origin corresponding to the lower limit position of the cassette holding pins 182, and when the left and right cassette holding pins 182 come to the origin, the motor 188 is stopped.

Cassette Holding Operation

When a cassette holding instruction is received, the motor 188 is rotated in reverse so that the feed screw 186 is driven to rotate in reverse. Consequently, the slider 184 is moved upwardly in the direction indicated by an arrow mark m under the guidance of the left and right guide shafts 185 by screw feeding of the nut 187 by the feed screw 186, and the cassette holding pins 182 are moved upwardly in parallel to the direction of the arrow mark m integrally with the slider 184 so that the pins 182 are opened upwardly with respect to the cassette holding pins 183. The direction of rotation of the torque limiter 192 then is the direction indicated by the arrow mark n' shown in FIG. 42(B) so that the intermediate shaft 189 is rotated in a non-slipping condition. During the rotation of the intermediate shaft 189, the opening distance H1 of the cassette holding pins 182 with respect to the cassette holding pins 183 is measured accurately by means of the encoder 197.

Since information concerning the thickness of the designated tape cassette to be held by the hand block 11 is available at the point in time when the cassette holding instruction was issued, the opening distance H1 of the cassette holding 182 with respect to the cassette holding pins 183 is adjusted, depending upon the count value of the encoder 197, to a predetermined value in accordance with the thickness information concerning the tape cassette, whereupon the motor 188 is stopped. It is to be noted that runaway by the slider 184 in the direction of the arrow mark m, which would otherwise be possible, is prevented by the upper limit sensor 199.

Figure 37:
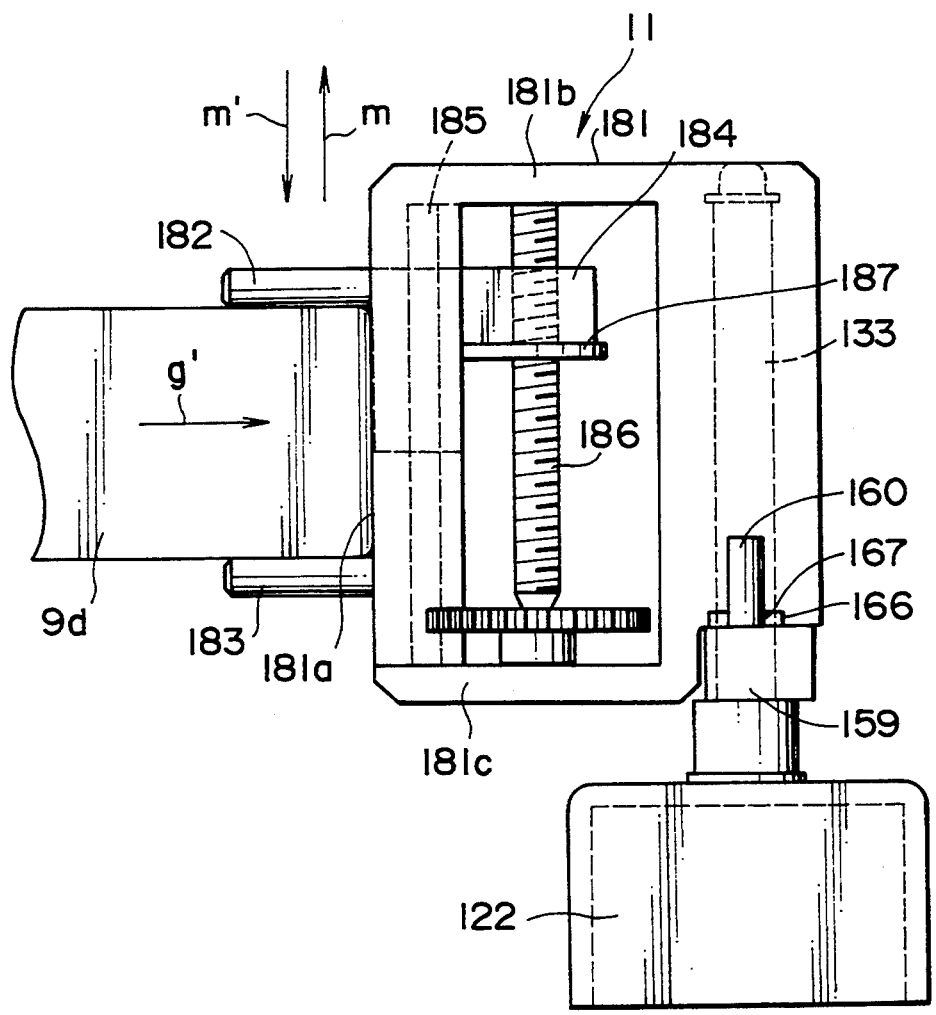
FIG. 37 is a side elevational view of the hand block when a large cassette is held thereon.
Figure 38:
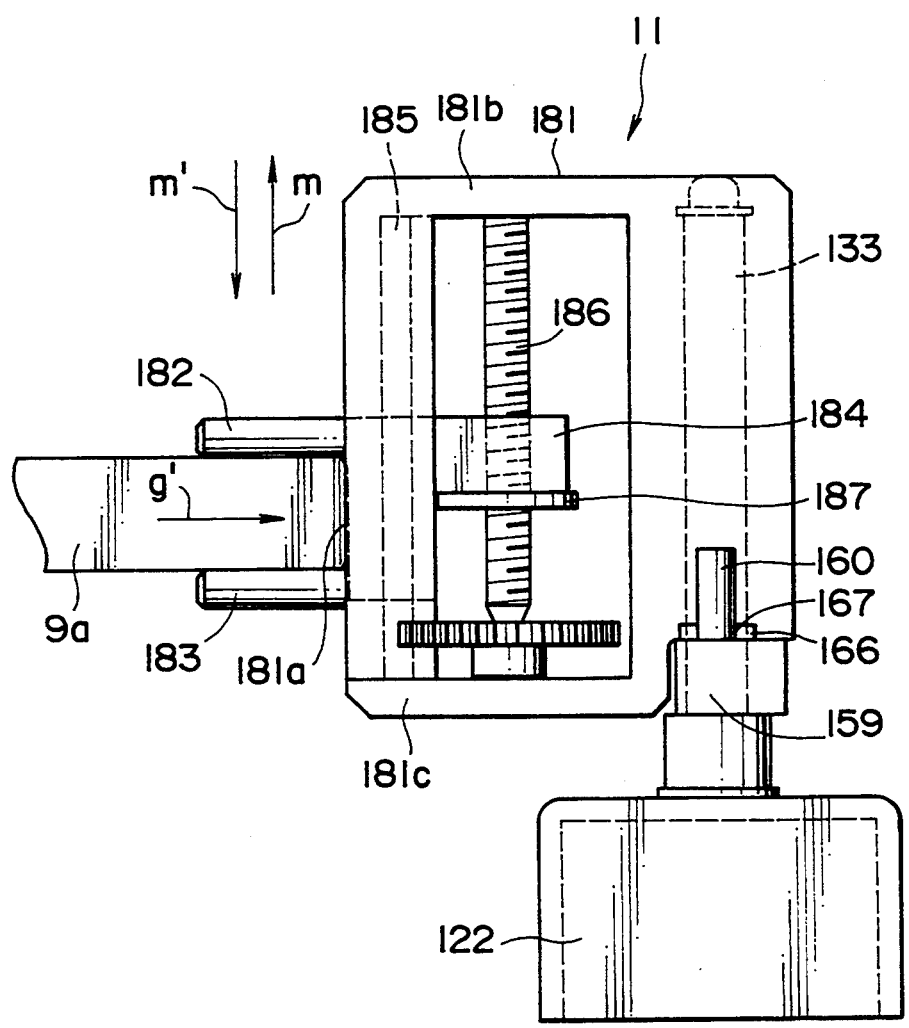
FIG. 38 is a side elevational view of the hand block when a small cassette is held thereon.
Figure 39:
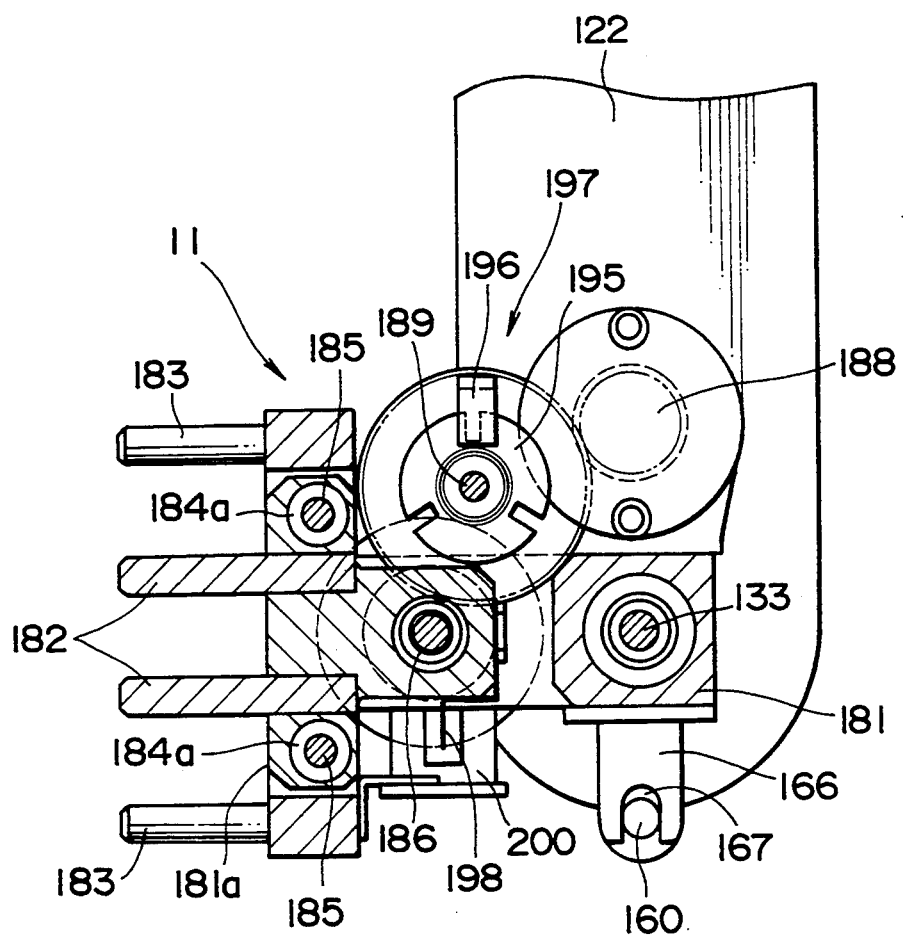
FIG. 39 is a sectional view taken along line C—C of FIG. 35.

When it is detected by a cassette inclination sensor 237 or 238, which will be hereinafter described, that a tape cassette 9a, 9d or the like which has one of the predetermined different thickness dimensions has been detected horizontally in the direction indicated by an arrow mark g' between the cassette holding pins 182 and 183 as shown in FIG. 37 or 38, the motor 188 is rotated forwardly again so that the cassette holding pins 182 are moved downwardly in parallel in the direction of the arrow mark m' again integrally with the slider 184 by the forward driving rotation of the feed screw 186. Consequently, whichever thickness the cassette 9a, 9d or the like has, it is finally held in the most stable posture by and between the parallel cassette holding pins 182 and 183 in such a manner that it is pressed in a parallel manner in the direction of the arrow mark m' in accordance with the thickness thereof against the lower left and right cassette holding pins 183 by the upper left and right cassette holding pins 182.

In this instance, when the cassette holding instruction was issued, the opening distance H1 between the cassette holding pins 182 and the cassette holding pins 183 was adjusted to an optimum value in accordance with the thickness of the designated tape cassette to be held, and consequently, the cassette holding pins 182 only need to be moved downwardly in the direction of the arrow mark m' by a very small distance after the designated tape cassette has been inserted horizontally between the cassette holding pins 182 and 183, and for a very short time in order to hold the tape cassette between the cassette holding pins 182 and 183, irrespective of the thickness of the tape cassette. Accordingly, even if the thickness of a cassette to be held varies every time, a tape cassette engagement operation for a tape cassette having any of the several thicknesses can always be performed rapidly.

When the cassette holding pins 182 are moved downwardly in the direction of the arrow mark m' in FIG. 41 so that a tape cassette 9a, 9d or the like is held between the cassette holding pins 182 and 183 as shown in FIG. 37 or 38, the torque limiter 192 is rotated in the direction of the arrow mark n shown in FIG. 42(B) in which a rotational slip can be produced. When the cassette holding pins 182 hold the tape cassette 9a, 9d or the like in the direction of the arrow mark m' on the cassette holding pins 183 as shown in FIG. 37 or 38, a repulsive force, that is, a load, acts in the direction of the arrow mark m upon the cassette holding pins 182. At a point in time when the load exceeds the predetermined torque value, a rotational slip is produced at the intermediate shaft 189 which is the output side of the torque limiter 192 so that the downward movement of the cassette holding pins 182 in the direction of the arrow mark m' is automatically stopped. Then, as it is detected by the encoder 197 that the intermediate shaft 189 has been stopped due to a rotational slip, complete engagement of the tape cassette 9a, 9d or the like by and between the cassette holding pins 182 and 183 is detected and the motor 188 is stopped.

Accordingly, with the present automatic cassette changer, a tape cassette having any thickness can always be held with stability by an engaging force having a fixed magnitude, and it can be assured that the engaging force applied to a tape cassette is not so great as to inadvertently damage the tape cassette regardless of the thickness of the cassette.

Further, with the present automatic cassette changer, since a feed screw 186 having high friction is employed at the last stage of the driving system for driving the cassette holding pins 182 linearly in the direction of the arrow mark m or m', even if the power supply to the automatic cassette changer is interrupted while a tape cassette is held between the cassette holding pins 182 and 183, the cassette holding pins 182 and 183 will not inadvertently open so as to release the tape cassette, as might otherwise occur because of the weight of the cassette itself pushing the holding pins 182 upwardly in the direction of the arrow mark m.

Further, since the force by which a tape cassette is held can always be kept at a fixed value by the torque limiter 192 while the cassette holding force is applied in the direction of the arrow mark m' to the cassette holding pins 182 by the feed screw 186, it can be assured that the nut 187 of the slider 184 will not bite into the feed screw 186 so as to lock the feed screw 186.

Figure 43A:
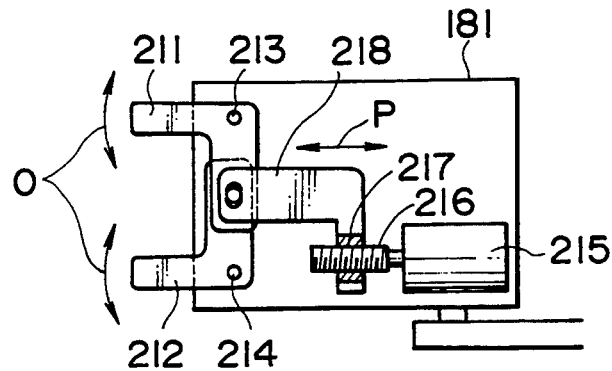
FIGS. 43(A) to 43(D) are schematic side elevational views illustrating holding operations of the pivotal cassette holding pins for cassettes of the large, medium and small sizes.

It is to be noted that FIG. 43(A) shows an arrangement wherein two pairs of upper and lower cassette holding pins 211 and 212 are mounted for pivotal motion in the vertical directions indicated by a double-sided arrow mark o around fulcrums 213 and 214, respectively, on a hand block body 181 and a driving member 218 is driven to move in the directions indicated by a double-sided arrow mark p by way of a nut 217 by a feed screw 216 which is driven to rotate by a motor 215 so that the cassette holding pins 211 nd 213 are driven to pivot in the directions of the arrow mark o opposite to each other around the fulcrums 213 and 214 by the driving member 218.

Figure 43B:
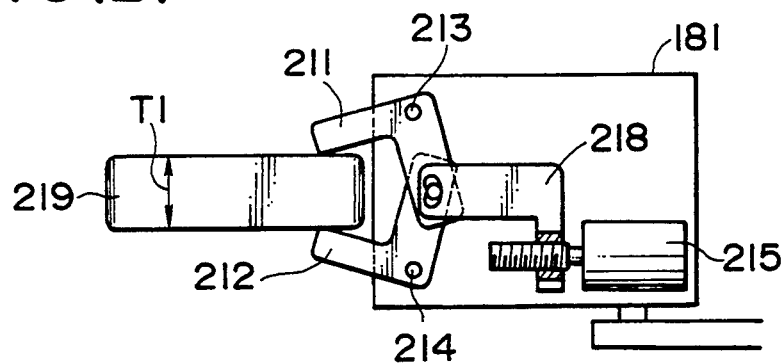
Figure 43C:
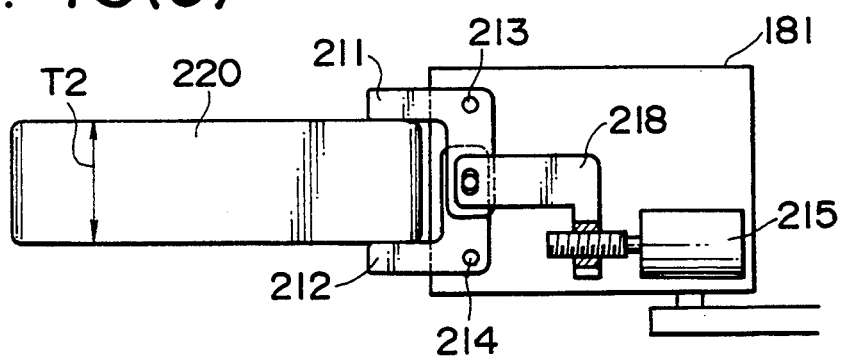
Figure 43D:
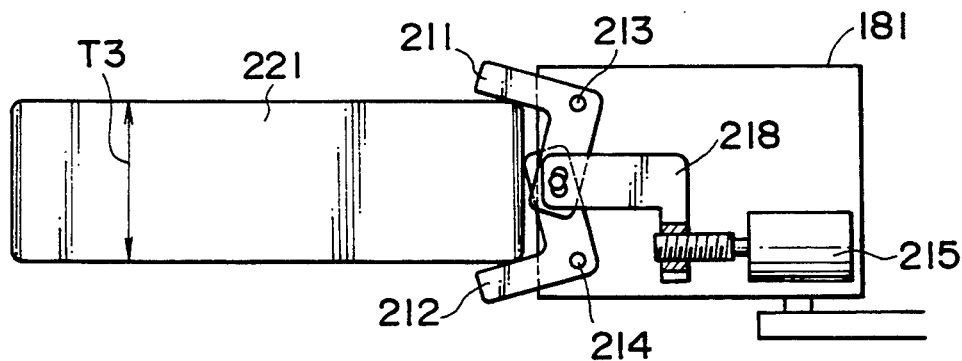

With the arrangement described just above, however, if it is attempted to hold several tape cassettes 219, 220 and 221 of different thicknesses T1, T2 and T3 in the thicknesswise direction by means of the cassette holding pins 211 and 212 as shown in FIGS. 43(B), 43(C), and 43(D), respectively, then for example, it is impossible for the cassette holding pins 211 and 212 to hold the tape cassettes 219 and 221 stably in parallel therebetween. Consequently, the holding conditions for the tape cassettes 219 and 221 are very unstable, and the tape cassette 219 or 221 may readily be released from between the cassette holding pins 211 and 212 because of slight vibrations or the like during transportation of the cassette between a cassette storage rack and a video tape recorder. Another problem with this arrangement is that insertion or removal of the tape cassette into or from a cassette storage rack or a video tape recorder is not performed reliably.

On the other hand, with the automatic cassette changer of the embodiment described above, since the horizontal cassette holding pins 182 are moved in parallel in the vertical direction of the arrow mark m or m' with respect to the horizontal cassette holding pins 183 as seen from FIGS. 37 and 38, so that a tape cassette 9a, 9d or the like having thickness which varies among several values is held in a parallel manner in the thicknesswise direction by the cassette holding pins 182 and 183, the tape cassette can be held in the most stable posture whichever thickness the tape cassette has. Accordingly, the tape cassettes 9a to 9d having different thicknesses can be inserted and removed into and from the cassette storage racks 8a to 9d and the video tape recorders 7a and 7b, and, transported therebetween in due course, and with stability and reliability. Consequently, it can be assured that a tape cassette 9a, 9b, 9c or 9d is not inadvertently released from between the cassette holding pins 182 and 183 during transportation.

Cassette Slide Guides

The left and right cassette slide guides 102 will now be described with reference to FIGS. 44 to 47.

The left and right cassette slide guides 102 are mounted horizontally at upper portions of the opposite left and right end portions of the transport mechanism body 75 and are each formed from a belt-shaped plate having a predetermined width W1 and extending in parallel to the directions of the arrow mark g which are the cassette inserting and removing directions. The height H2 of the left and right cassette slide guides 102 with respect to the transporting machine body 75 is set to be substantially flush with upper end faces of the left and right cassette holding pins 183 at the lower portion of the hand block 11. The distances W2 and W3 between the outer sides and the inner sides of the left and right cassette slide guides 102 in the leftward and rightward directions, the width W4 of a large tape cassette 9d having the greatest size in the leftward and rightward directions and the width W5 of a medium size tape cassette 9c having the second greatest size in the leftward and rightward directions are set so as to have the relationship W2 > W3 > W4 > W5.

When a large tape cassette 9d is to be held by the cassette holding pins 182 and 183 of the hand block 11 and inserted into or removed from the cassette storage rack 8d or the video tape recorder 7a as seen in FIGS. 44 and 45, the hand block 11 holds the tape cassette 9d on the center line P1 of the transport mechanism 10 and moves to effect insertion or removal of the tape cassette 9d by linear motion thereof in either of the directions of the arrow mark g.

In this instance, since the large tape cassette 9d is quite heavy, it may be difficult to support the tape cassette 9d only by means of the two pairs of cassette holding pins 182 and 183 of the hand block 11. However, the tape cassette 9d can be inserted or removed in such a manner that the opposite left and right ends thereof are placed on the left and right cassette slide guides 102 and the tape cassette 9d is slidably moved in either of the directions of the arrow mark g on the cassette slide guides 102. Consequently, the heavy tape cassette 9d can be inserted and removed smoothly and with good stability. Further, as the tape cassette 9d is supported on the left and right cassette slide guides 102, the burden (load) on the cassette holding pins 182 and 183 is correspondingly reduced, and accordingly, the operation is performed very safely.

On the other hand, an 8 mm tape cassette 9a, a small tape cassette 9b or a medium size tape cassette 9c is light in weight compared to a large tape cassette 9d, and consequently, it can be inserted or removed in either of the directions of the arrow mark g while being held with sufficient stability only by the four cassette holding pins 182 and 183 of the hand block 11 as seen from FIG. 46 or 47. Besides, since the dimensions of the cassette slide guides 102, the large size tape cassette 9d and the medium size tape cassette 9c in the leftward and rightward widthwise direction are set to the relationship W2 > W4 > W3 > W5, the hand block 11 can be freely moved in the leftward and right directions indicated by the arrow mark f with a sufficient margin within the inner distance W3 between the left and right cassette slide guides 102.

This allows the position at which an 8 mm tape cassette 9a, a small tape cassette 9b or a medium size tape cassette 9c is held by the hand block 11 and inserted or removed linearly in either of the directions of the arrow mark g, to be selected freely in the leftward and rightward directions of the arrow mark f within the inner side distance W3.

Due to the construction described above, the positions in which the tape cassettes 9a to 9d are accommodated with respect to the center line P1 of the transport mechanism 10 can be set freely in the directions of the arrow mark f in such a manner that, for example, as shown in FIG. 1, the 8 mm tape cassettes 9a, which have the smallest size, are stored in three vertical columns arranged in one horizontal row in a cassette storage rack unit 6a, or the small cassettes 9b, which have the second smallest size, are stored in two vertical columns arranged in one horizontal row in a cassette storage rack unit 6b. Accordingly, since a plurality of types of tape cassettes 9a to 9d having different recording formats can be stored compactly in a comparatively small space and also since displacement of the cassette insertion openings 15a and 15b of the video tape recorders 7a and 7b in the leftward and rightward directions does not cause problems, the automatic cassette changer can accommodate therein all available different types of tape cassettes and can include all available types of video tape recorders for recording or reproducing the tape cassettes.

Cassette Inclination Detecting Mechanism of Hand Block

Figure 48:
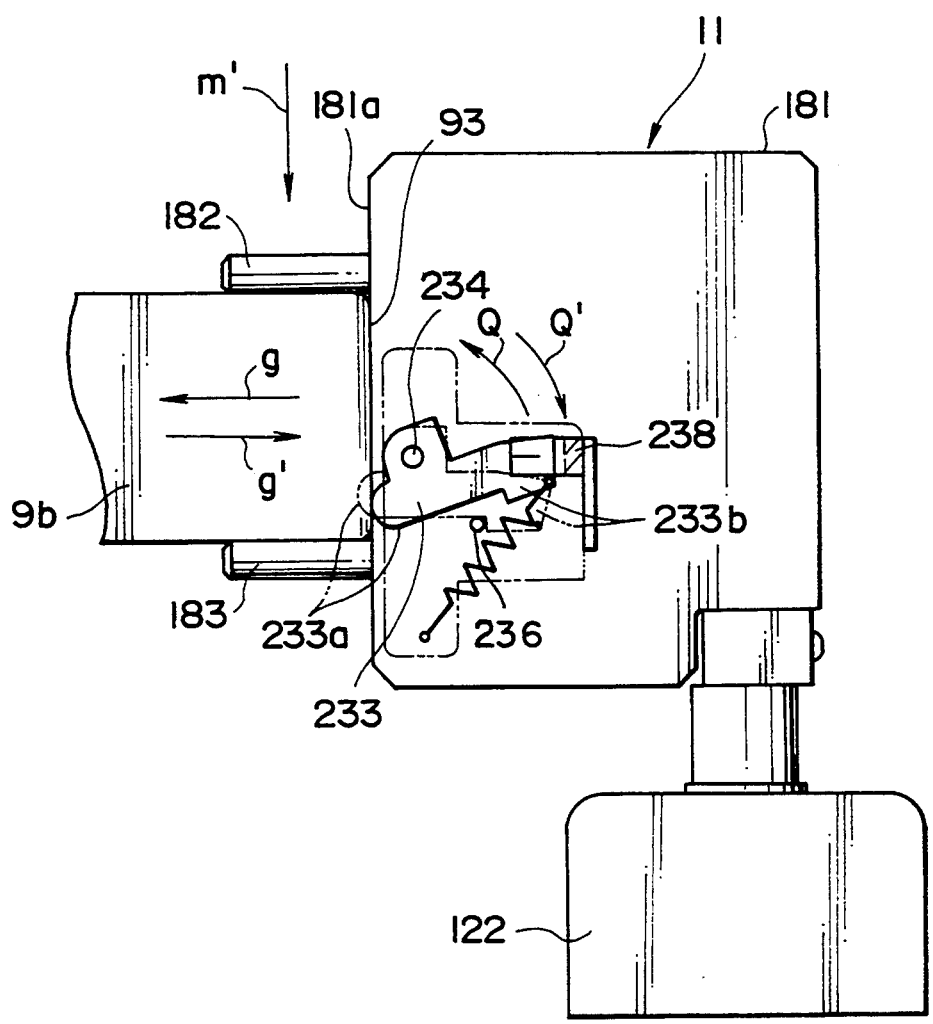
FIG. 48 is a side elevational view showing a cassette inclination detecting mechanism for the hand block.
Figure 49:
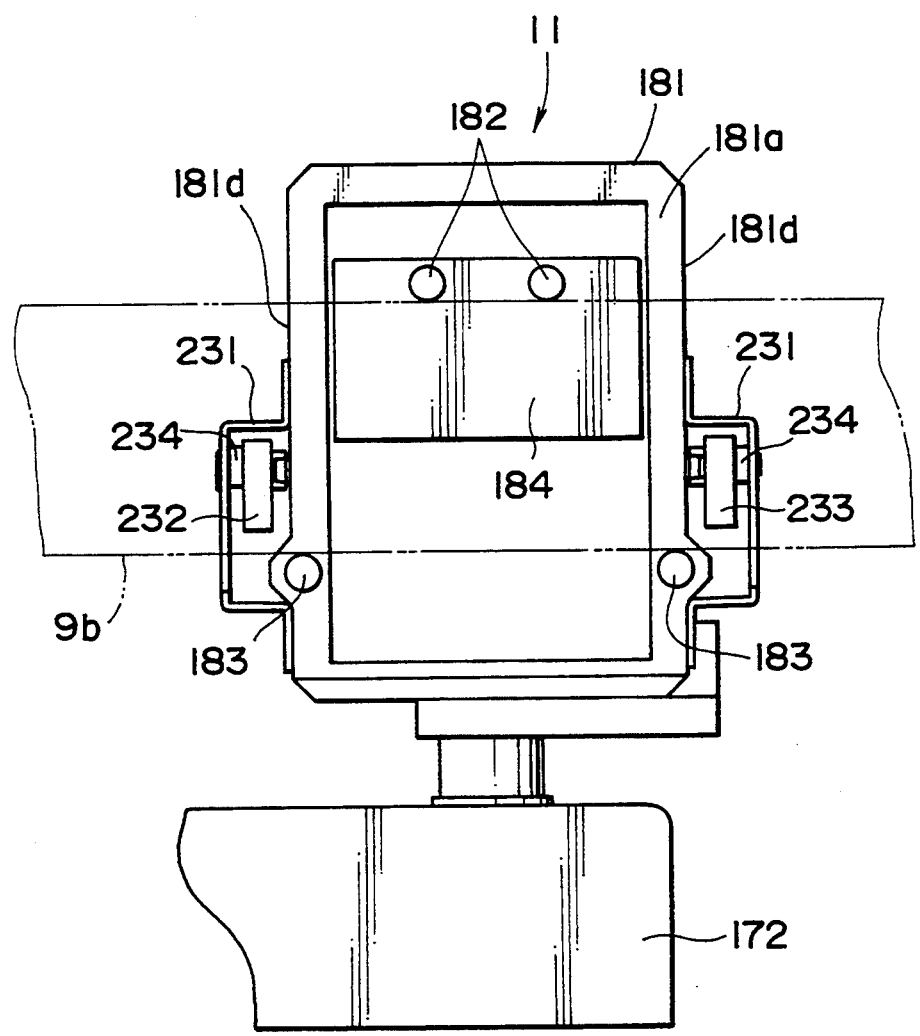
FIG. 49 is a front elevational view of the cassette inclination detecting mechanism shown in FIG. 48.

The cassette inclination detecting mechanism mounted on the hand block 11 will be now described with reference to FIGS. 48 and 52(C).

Figure 50:
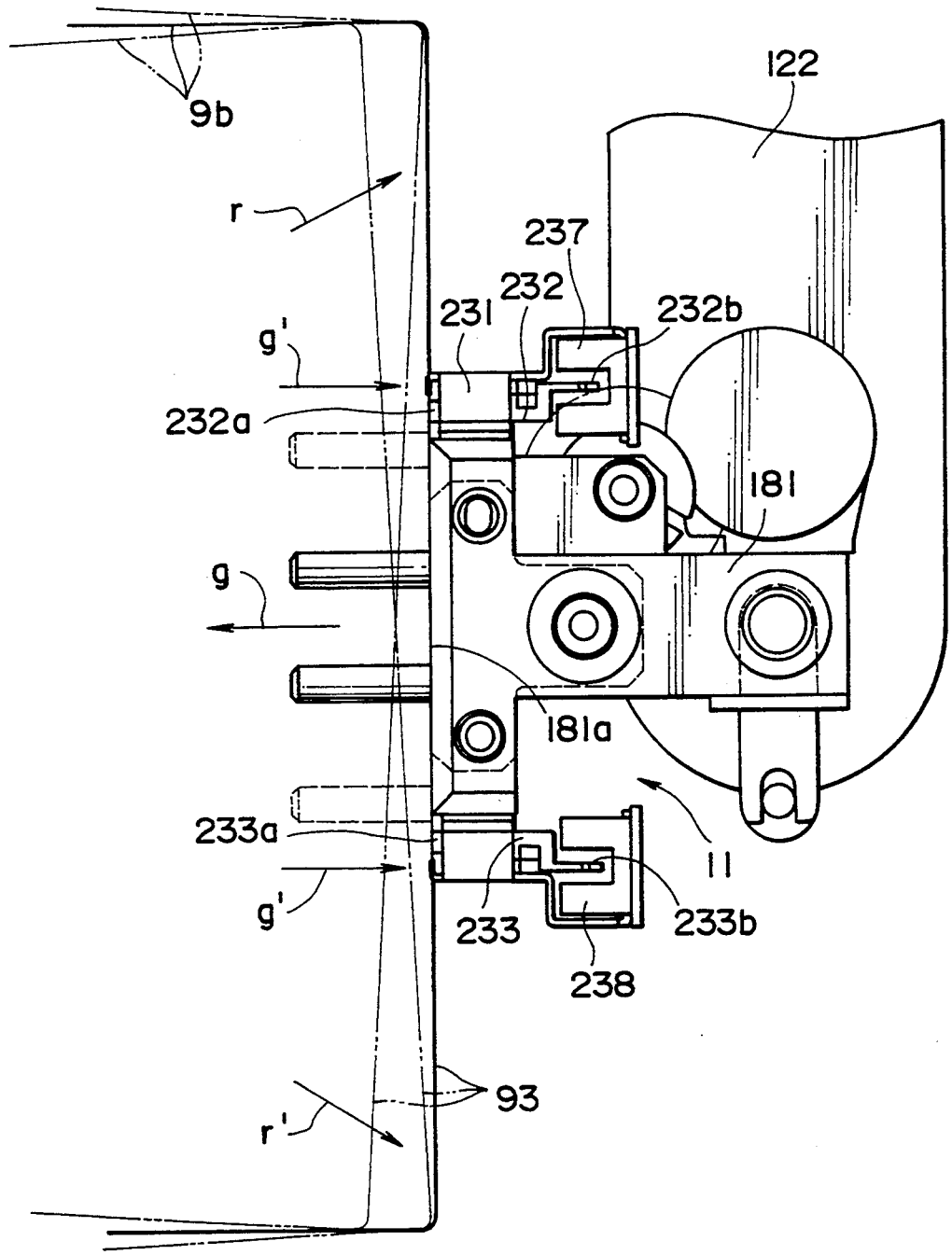
FIG. 50 is a plan view illustrating a cassette inclination detecting operation by the hand block.

A pair of left and right mounting plates 231 are securely mounted at locations of the opposite left and right side faces 181d of the hand block body 181 displaced toward the front face 181a. A pair of left and right cassette detecting levers 232 and 233 are mounted for pivotal motion in the directions indicated by arrow marks Q and Q' each around a fulcrum 234. Each of the cassette detecting levers 232 and 233 is normally biased to pivot in the direction of the arrow mark Q' by a tension spring 235, and when the cassette detecting levers 232 and 233 are abutted with respective stoppers 236 as indicated by a broken line in FIG. 48, ends 232a and 233a thereof are projected a little forwardly in the direction of the arrow mark g from the front face 181a of the hand block body 181. A pair of left and right cassette inclination sensors 237 and 238 each in the form of a photo-coupler or the like are mounted on the left and right mounting plates 231 such that they are turned on or off by shutter plates 232b and 233b formed at rear end portions of the cassette detecting levers 232 and 233, respectively, According to the cassette inclination detecting mechanism, when the upper and lower cassette holding pins 182 and 183 are to be inserted in the direction of the arrow mark g, for example, above and below a tape cassette 9b in order to hold the tape cassette 9b by and between the cassette holding pins 182 and 183 as shown in FIGS. 48 and 50, if there is no inclination of the tape cassette 9b within a horizontal plane with respect to the hand block 11, the rear end face 93 of the tape cassette 9b is abutted in parallel with the front face 181a of the hand block body 181, as indicated by a solid line in FIG. 50. In this instance, the left and right cassette detecting levers 232 and 233 are pivoted in the direction of the arrow mark Q against the tension springs 235 around the fulcra 234 by the rear end face 93 of the tape cassette 9b as indicated by a solid line in FIG. 48, whereupon the shutter plates 232a and 233a of the cassette detecting levers 232 and 233 are detected by the left and right cassette inclination sensors 237 and 238, respectively. When both of the left and right cassette inclination sensors 237 and 238 detect the rear end face 93 of the tape cassette 9b, it is determined that there is no inclination of the cassette 9b within a horizontal plane with respect to the hand block 11. Then and only in this instance, the cassette holding pins 182 are moved down in the direction of the arrow mark m' to hold the tape cassette 9b in its thicknesswise direction between the cassette holding pins 182 and 183.

On the other hand, if, when the cassette holding pins 182 and 183 are inserted in the direction of the arrow mark g above and below the tape cassette 9b, there is an inclination of the tape cassette 9b in the direction indicated by an arrow mark r or r' within a horizontal plane with respect to the hand block 11 as indicated by a chain line in FIG. 50, only one of the left and right cassette inclination sensors 237 and 238 will detect the rear end face 93 of the tape cassette 9b. Accordingly, in this instance, before the cassette holding pins 182 are moved down in the direction of the arrow mark m' the entire hand block 11 is pressed in the direction of the arrow mark g against the tape cassette 9b to correct the posture of the tape cassette 9b so that the rear end face 93 of the tape cassette 9b may be abutted in parallel with the front face 181a of the hand block body 181. This operation which corrects for the inclination of the tape cassette 9b also automatically compensates for any disparity in relative distance between the transport mechanism 10 and the tape cassette 9b in the directions of the arrow marks g and g'. Thereafter, the cassette holding pins 182 are moved down in the direction of the arrow mark m' until the tape cassette 9b is held in the thicknesswise direction by and between the cassette holding pins 182 and 183.

Figure 51A:
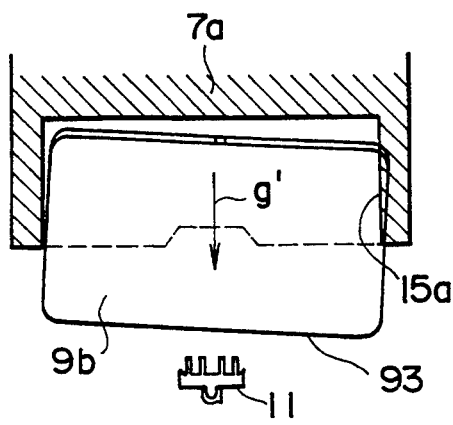
FIGS. 51(A) to 51(E) are schematic views illustrating an inclination correcting operation for a cassette by the hand block.
Figure 51B:
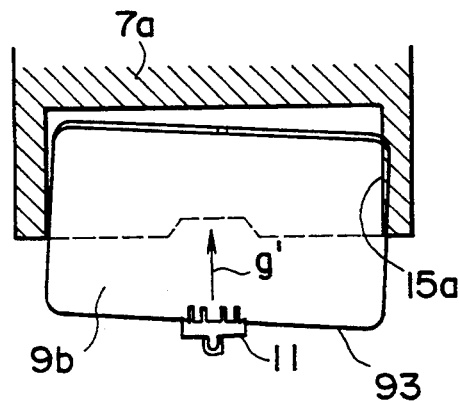
Figure 51C:
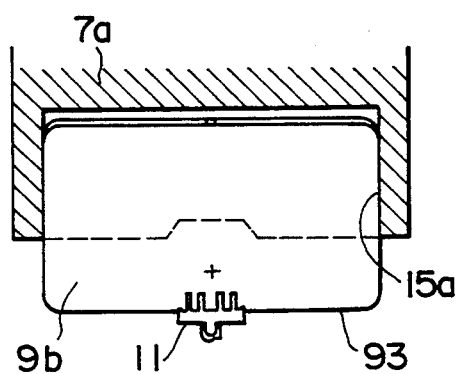
Figure 51D:
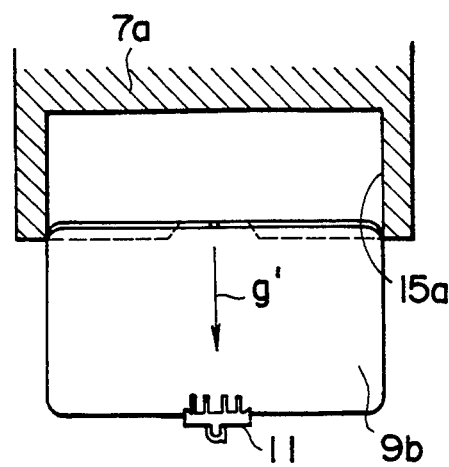
Figure 51E:
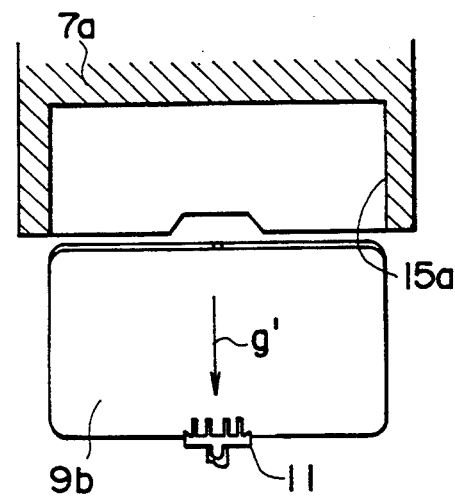

Referring to FIGS. 51(A) to 51(E), there are shown different successive steps of an operation of removing, for example, a tape cassette 9b from a video tape recorder 7a. The tape cassette 9b discharged in the direction of the arrow mark g' from the cassette insertion opening 15a of the video tape recorder 7a does not always assume a fixed correct posture due to the structure of the cassette and the recorder, but in most cases presents an inclination within a horizontal plane with respect to the hand block 11 as seen in FIG. 51(A). Therefore, the rear end face 93 of the tape cassette 9b is pushed once in the direction of the arrow mark g by the hand block 11 as shown in FIG. 51(B) to correct the posture of the tape cassette 9b so that the tape cassette 9b has no inclination within the horizontal plane with respect to the hand block 11 as shown in FIG. 51(C). Then, the tape cassette 9b is held by the hand block 11 and pulled out in the direction of the arrow mark g' from the cassette insertion opening 15a of the video tape recorder 7a by the hand block 11 as seen from FIGS. 51(D) and 51(E).

Figure 52A:
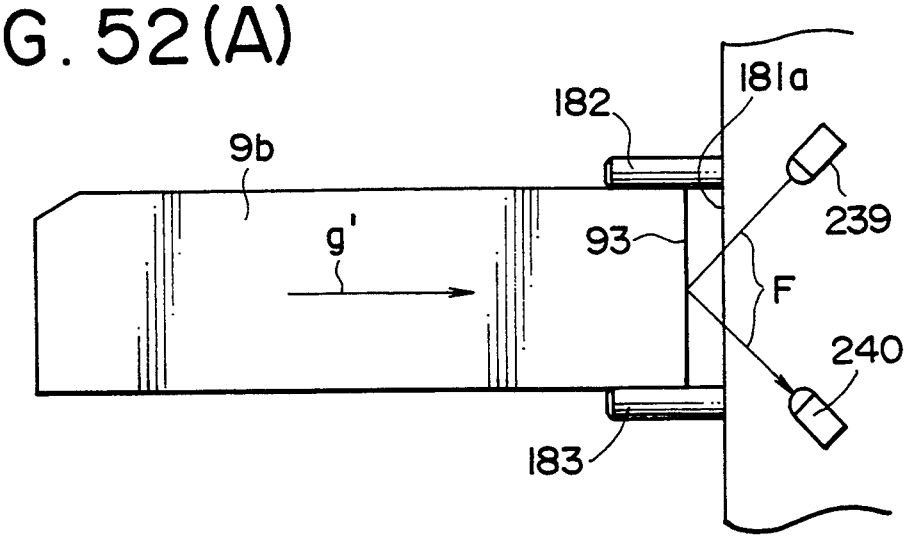
FIGS. 52(A) to 52(C) are side elevational views showing different modified cassette inclination detecting mechanisms.
Figure 52B:
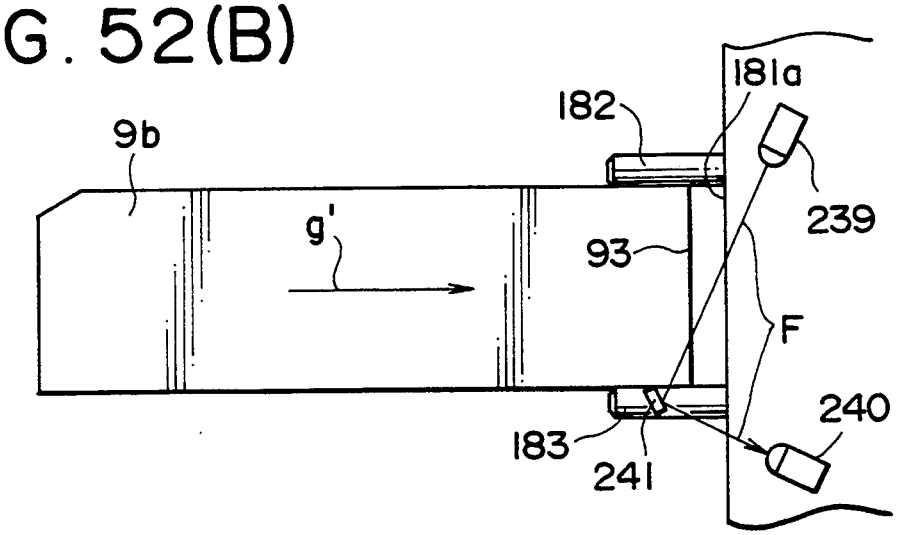
Figure 52C:
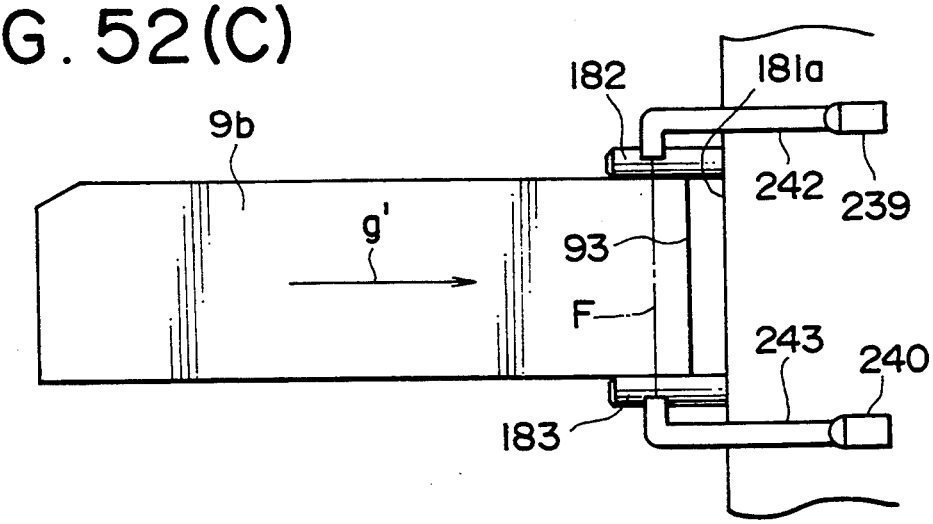

FIGS. 52(A) to 52(C) show different modifications to the cassette inclination sensors 237 and 238 described above. In particular, in the modified arrangement shown in FIG. 52(A), light F emitted from a light emitting element 239 is reflected by the rear end face 93 of a tape cassette 9b and received by a light receiving element 240, and an inclination of the tape cassette 9b is detected from the position at which the light receiving element 240 receives the light F. Meanwhile, in the modified apparatus shown in FIG. 52(B), light emitted from a light emitting element 239 is reflected by a mirror 241 and received by a light receiving element 240, and an inclination of a tape cassette 9b is detected from the position at which the rear end face 93 of the tape cassette 9b intercepts the light F. Further, in the modified apparatus shown in FIG. 52(C), a pair of optical fibers 242 and 243 extend from a light emitting element 239 and a light receiving element 240, and an inclination of a tape cassette 9b is detected from the position at which light F between the other ends of the optical fibers 242 and 243 is intercepted by the rear end face 93 of the tape cassette 9b. Or alternatively, the cassette inclination sensors 237 and 238 may be replaced simply by mechanical sensors such micro-switches. As another alternative, only one cassette inclination sensor may be provided.

With the present automatic cassette changer, when a tape cassette 9a, 9b, 9c or 9d is to be held by the hand block 11, an inclination of the tape cassette 9a, 9b, 9c or 9d within a horizontal plane with respect to the hand block 11 can be detected by means of the cassette inclination sensors 237 and 238. Since an inclination of a tape cassette 9a, 9b, 9c and 9d can be detected in this manner, the inclination can be corrected. Further, any disparity in relative distance between the transport mechanism 10 and the tape cassette 9a, 9b, 9c or 9d can be compensated for by the same operation which corrects the inclination. Accordingly, the tape cassette 9a, 9b, 9c or 9d can be held in a correct posture by the hand block 11, and consequently, it can be transferred smoothly in due course to and from any of the cassette storage racks 8a and 9d and the video tape recorders 7a and 7b and can be transported with desired stability by the transport mechanism 10.

Automatic Centering Mechanism for Hand Block

The automatic centering mechanism of the hand block 11 will now be described with reference to FIGS. 53 to 60(B).

The vertical mounting hole 164 is formed at a portion of the hand block body 181 rearwardly of the feed screw 186, and the pair of upper and lower sleeves 165 are mounted in the vertical mounting hole 164. The projection 166 extends horizontally sidewardly from a lower portion of the rear end of the hand block body 181, and the groove 167 is formed at the end of the projection 166. The hand block body 181 is fitted for upward and downward movement in the directions indicated by the arrow marks i and i' on the outer periphery of the vertical mounting shaft 133 of the pivotal arm 122 by means of the pair of upper and lower sleeves 165, and the vertical turning portion preventing pin 160 is fitted for upward and downward movement in the directions of the arrow marks i and i' in the groove 167 of the arm 166. Consequently, the entire hand block 11 is mounted for upward and downward movement in the directions of the arrow marks i and i' against the weight thereof on the mounting shaft 133 and the turning portion preventing pin 160. The hand block 11 normally remains in contact with the arm 159 by its own weight.

With this construction, even if some relative vertical displacement occurs between the hand block 11 and any of the cassette storage racks 8a and 8d and the cassette insertion openings 15 and 15b of the video tape recorders 7a and 7b, a tape cassette 8a, 8b, 8c or 8d can be transferred smoothly by the automatic centering function of the entire hand block 11 in the directions of the arrow marks i and i' only by the effect of the tapered faces 44b and so forth at upper and lower portions of each of the opening ends of the cassette storage racks 8a and 9d and the cassette insertion openings 15 and 15b.

Operations for extracting a small tape cassette 9b from a cassette storage rack 8b will be described with reference to FIGS. 54(A) to 56(F) and operations for inserting the tape cassette 9b from the transport mechanism 10 into the cassette storage rack 8b will be described with reference to FIGS. 57(A) to 59(F). It is to be noted here that the arrangement is constructed so that, even if a relative displacement takes place by an amount up to ±3 mm in the vertical direction between the cassette storage rack 8b and the hand block 11, the tape cassette 9b can still be transferred smoothly. Further, the gap between the cassette storage rack 8b and the tape cassette 9b in the vertical direction is 1 mm, and the tapered face 44b accounting for 6 mm is formed on the lower face at the opening end of the cassette accommodating rack 8b.

First, an operation for extracting the tape cassette 9b from the tape storage rack 8b when the relative height between the tape storage rack 8b and the hand block 11 coincides with the position of a designed center will be described with reference to FIGS. 54(A) to 54(F).

Figure 54A:
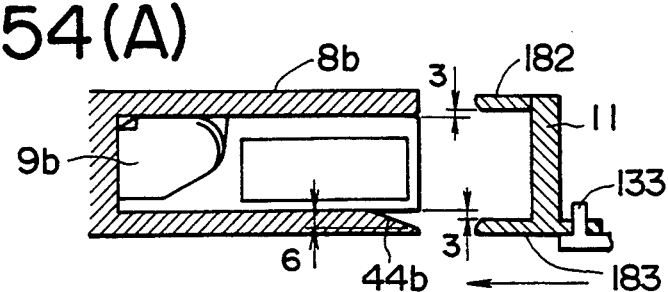
FIGS. 54(A) to 54(F) are schematic views illustrating an automatic centering operation by the automatic centering mechanism when a cassette is pulled out.
Figure 54B:
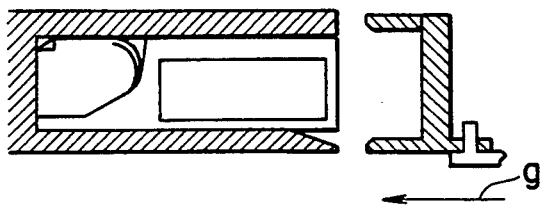
Figure 54C:
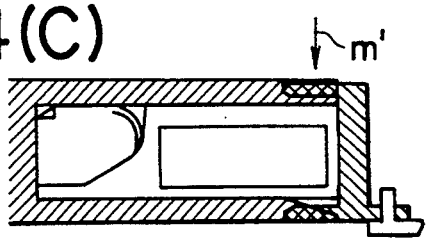
Figure 54D:
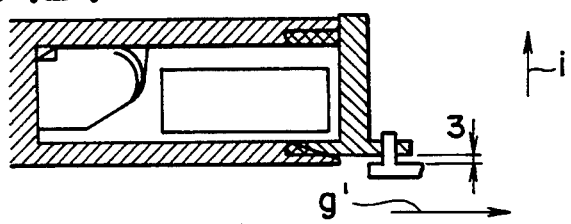
Figure 54E:
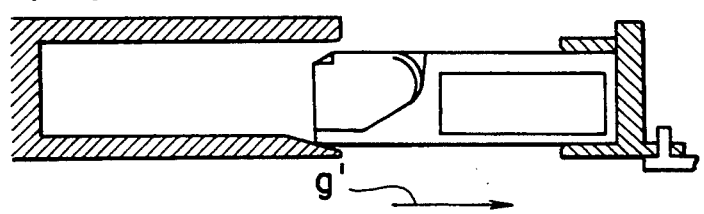
Figure 54F:
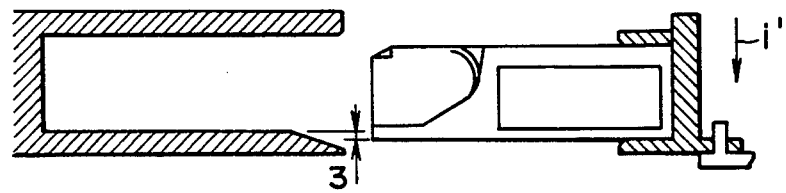

In this instance, the cassette holding pins 182 and 183 approach the tape cassette 9b in the direction of the arrow mark g as shown in FIG. 54(B) while they have the gap of 3 mm in the vertical direction with respect to the upper and lower faces of the tape cassette 9b as seen in FIG. 54(A), and they are inserted above and below the tape cassette 9b as seen in FIG. 54(C). Then, after detection of an inclination of the tape cassette 9b by the cassette inclination sensors 237 and 238 described above, the cassette holding pins 182 are moved downwardly in the direction of the arrowmark m' so that the tape cassette 9b is held in its thicknesswise direction by and between the cassette holding pins 182 and 183 as shown in FIG. 54(D). Thereupon, the entire hand block 11 is moved upwardly by 3 mm in the direction of the arrow mark i along the mounting shaft 133 against the weight of the hand block 11 itself. Then, the tape cassette 9b is pulled out in the direction of the arrow mark g' from the cassette storage rack 8b by means of the hand block 11 as seen in FIG. 54(E), and after the tape cassette 9b has been completely extracted in the direction of the arrow mark g' from the cassette storage rack 8b as shown in FIG. 54(F), the entire hand block 11 is moved down by 3 mm in the direction of the arrow mark i' to its original position along the mounting shaft 133 by the weight of the hand block 11 itself.

Removal of a tape cassette 9b from a cassette storage rack 8b when the hand block 11 is displaced by 3 mm upwardly with respect to the designed center of the cassette storage rack 8b will now be described with reference to FIGS. 55(A) to 55(F).

Figure 55A:
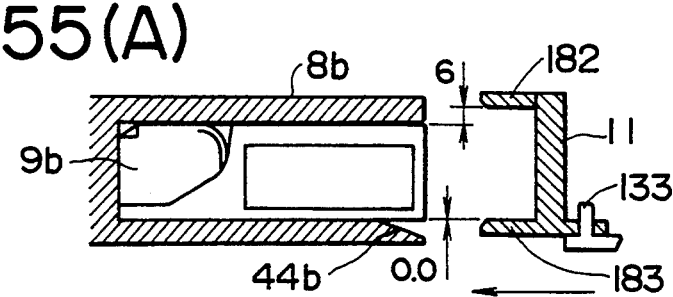
FIGS. 55(A) to 55(F) are similar views but illustrating another automatic centering operation by the automatic centering mechanism when a cassette is pulled out.
Figure 55B:
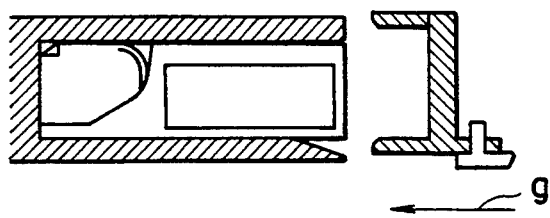
Figure 55C:
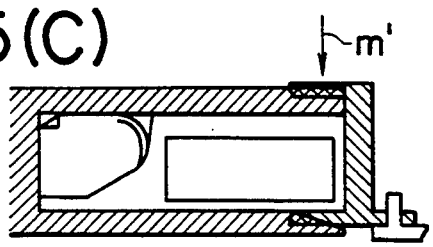
Figure 55D:
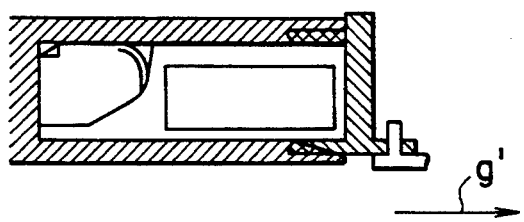
Figure 55E:
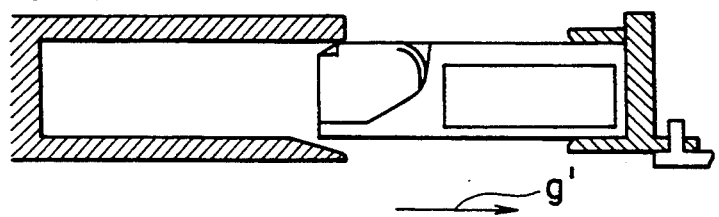
Figure 55F:
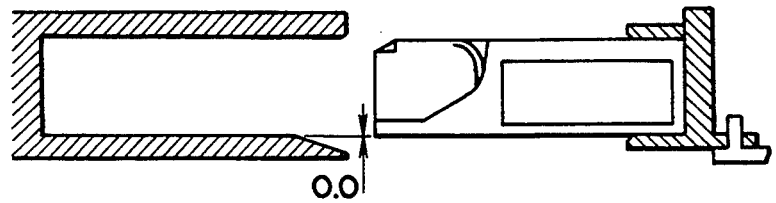

In this instance, while the cassette holding pins 182 have a gap of 6 mm above the tape cassette 9b and the cassette holding pins 183 have a gap of 0 mm with respect to the tape cassette 9b as shown in FIG. 55(A), the cassette holding pins 182 and 183 are inserted in the direction of the arrow mark g above and below the tape cassette 9b as shown in FIG. 55(C). Accordingly, when the tape cassette 9b is held in its thicknesswise direction by and between the cassette holding pins 182 and 183 as seen from FIG. 55(C) and also when the tape cassette 9b is removed completely in the direction of the arrow mark g' from the cassette storage rack 8b by means of the hand block 11 as shown in FIG. 55(F), the hand block 11 maintains the same height with respect to the mounting shaft 133.

Removal of a tape cassette 9b from a cassette storage rack 8b when the hand block 11 is displaced by 3 mm downwardly with respect to the designed center of the cassette storage rack 8b will now be described with reference to FIGS. 56(A) to 56(F).

Figure 56A:
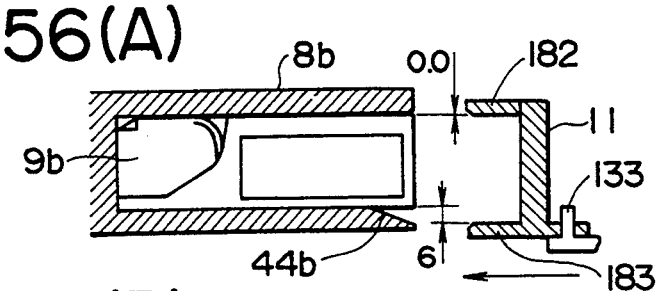
FIGS. 56(A) to 56(F) are similar views but illustrating a further automatic centering operation by the automatic centering mechanism when a cassette is pulled out.
Figure 56B:
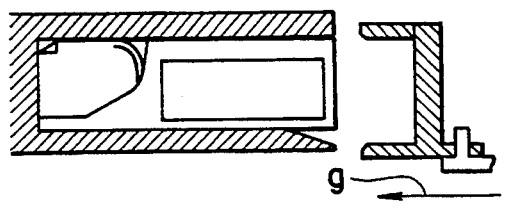
Figure 56C:
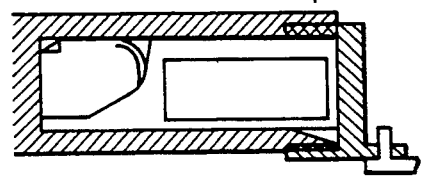
Figure 56D:
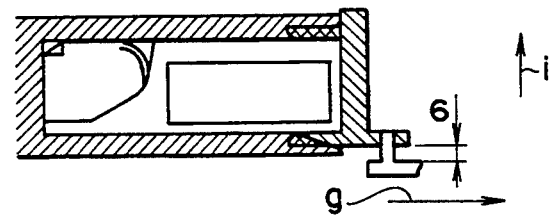
Figure 56E:
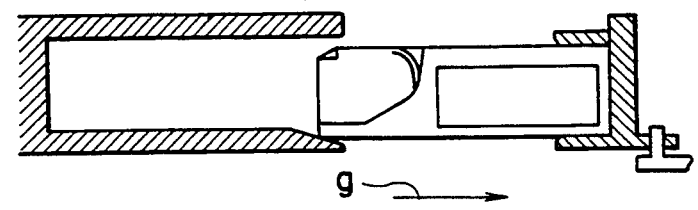
Figure 56F:
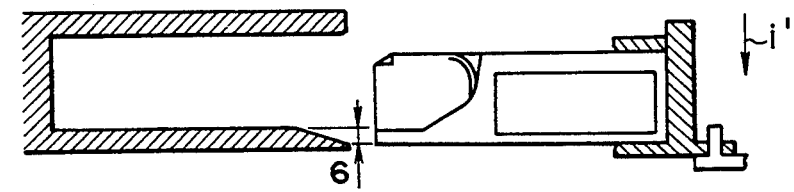

In this instance, while the cassette holding pins 182 have a gap of 0 mm with respect to the tape cassette 9b and the cassette holding pins 183 have a gap of 6 mm below the tape cassette 9b as shown in FIG. 56(A), the cassette holding pins 182 and 183 are inserted in the direction of the arrow mark g above and below the tape cassette 9b as shown in FIG. 56(C). Then, when the tape cassette 9b is held in its thicknesswise direction by and between the cassette holding pins 182 and 183 as shown in FIG. 56(D), the entire hand block 11 is moved upwardly to 6 mm in the direction of the arrow mark i along the mounting shaft 133 against the weight of the hand block 11 itself. Then, when the tape cassette 9b is removed completely in the direction of the arrow mark g' from the cassette storage rack 8b by means of the hand block 11 as shown in FIG. 56(F), the entire hand block 11 is moved down by 6 mm in the direction of the arrow mark i' to its original position along the mounting shaft 133 by the weight of the hand block 11 itself.

An operation for inserting a tape cassette 9b into a tape storage rack 8b when the relative height between the tape storage rack 8b and the hand block 11 coincides with the designed center will be described with reference to FIGS. 57(A) to 57(F).

In this instance, while the tape cassette 9b held by the hand block 11 has the gaps of 4 mm and 3 mm above and below the cassette storage rack 8b as seen in FIG. 57(A), it is moved in the direction of the arrow mark g toward the cassette storage 8b as seen from FIG. 57(B) so that it is inserted into the cassette storage rack 8b with an end thereof guided by the tapered face 44b of the cassette storage rack 8b as seen in FIG. 57(C). Thereupon, the entire hand block 11 is moved upwardly by 3 mm in the direction of the arrow mark i along the mounting shaft 133 against the weight of the hand block 11 itself. Then, the cassette holding pins 182 are moved upwardly by 6 mm in the direction of the arrow mark m as seen in FIG. 57(C) so as to effect disengagement of the tape cassette 9b. Consequently, the entire hand block 11 is moved down by 3 mm in the direction of the arrow mark i' along the mounting shaft 133 to its original position as seen from FIG. 57(D) by the weight of the hand block 11 itself so that the gaps of 3 mm are provided between the tape cassette 9b and the cassette holding pins 182 and 183. Then, the tape cassette 9b is inserted fully in the direction of the arrow mark g into the cassette storage rack 8b by means of the hand block 11 as seen in FIG. 57(E), and thereafter, the hand block 11 is removed in the direction of the arrow mark g' from the storage rack 8b as seen in FIG. 57(F).

An operation for inserting a tape cassette 9b into a tape storage rack 8b when the hand block 11 is displaced upwardly by 3 mm with respect to the designed center of the tape storage rack 8b will now be described with reference to FIGS. 58(A) to 58(F).

Figure 58A:
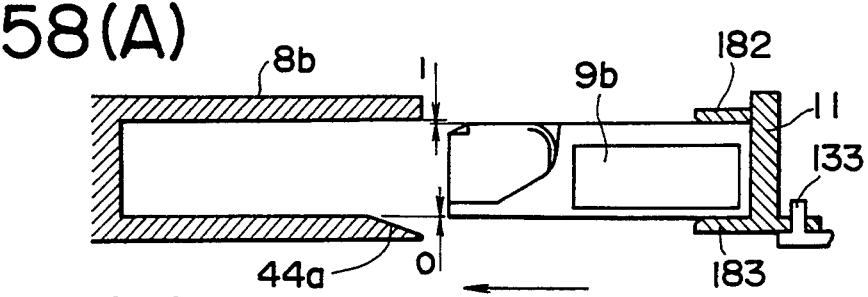
FIGS. 58(A) to 58(F) are similar views but illustrating another automatic centering operation by the automatic centering mechanism when a cassette is inserted.
Figure 58B:
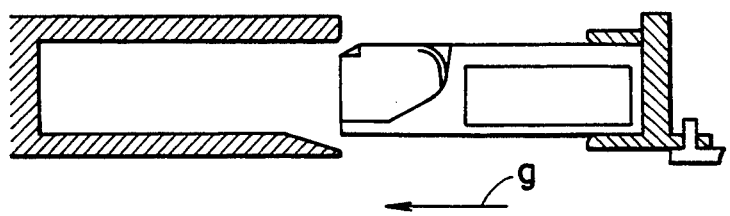
Figure 58C:
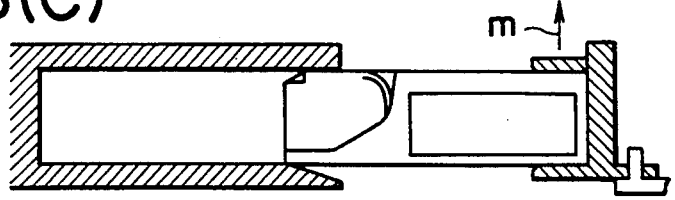
Figure 58D:
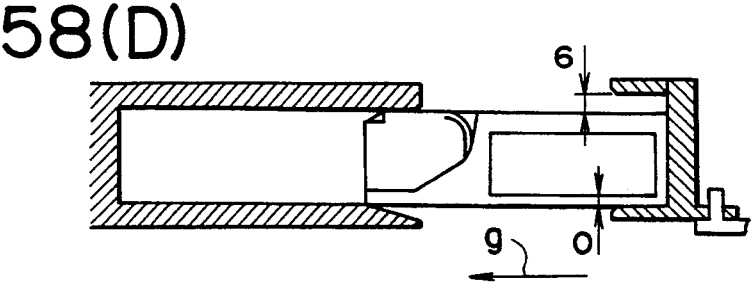
Figure 58E:
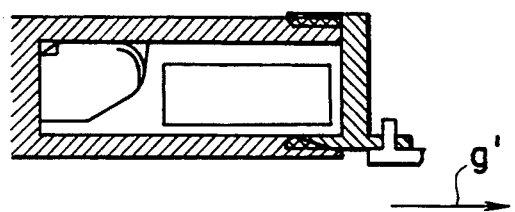
Figure 58F:
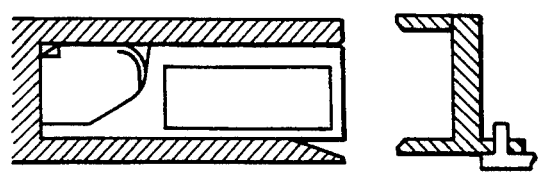

In this instance, while the tape cassette 9b has the gaps of 1 mm and 0 mm above and below the cassette storage rack 8b as seen in FIG. 58(A), an end of the tape cassette 9b is inserted into the cassette storage rack 8b as shown in FIG. 58(C), and then the cassette holding pins 182 are moved upwardly by 6 mm in the direction of the arrow mark i as seen in FIG. 58(D) so as to effect disengagement of the tape cassette 9b. In this instance, however, the entire hand block 11 is not moved upwardly or downwardly at all with respect to the mounting shaft 133.

An operation for inserting a tape cassette 9b into a tape storage rack 8b when the hand block 11 is displaced downwardly by 3 mm with respect to the designed center of the tape storage rack 8b will now be described with reference to FIGS. 59(A) to 59(F).

Figure 59A:
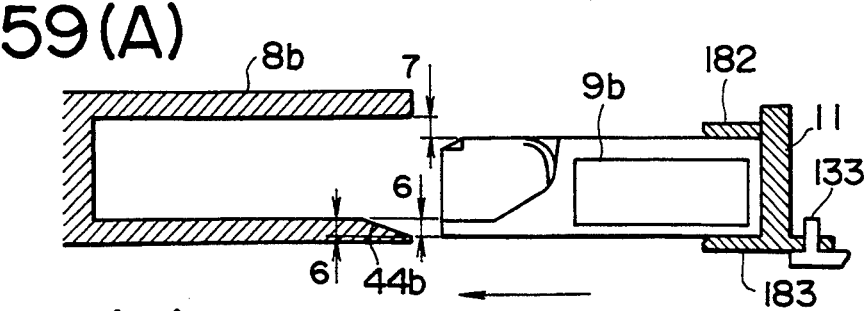
FIGS. 59(A) to 59(F) are similar views but illustrating a further automatic centering operation by the automatic centering mechanism when a cassette is inserted.
Figure 59B:
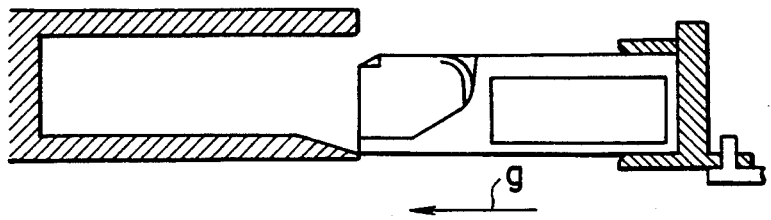
Figure 59C:
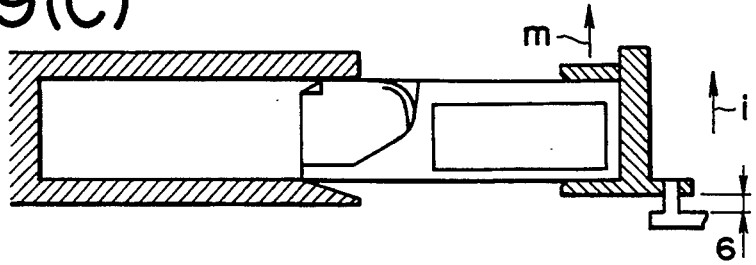
Figure 59D:
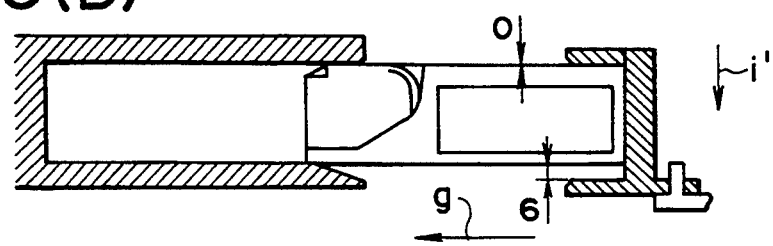
Figure 59E:
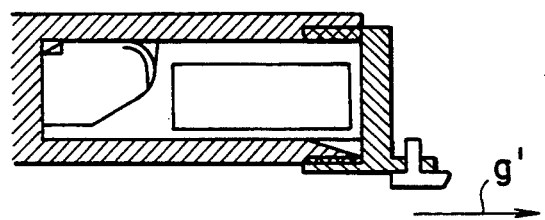
Figure 59F:
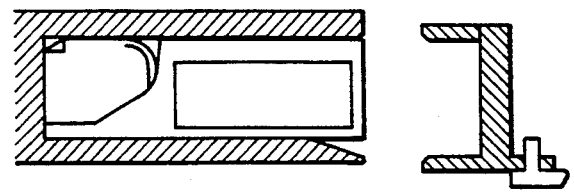

In this instance, while the tape cassette 9b has the gaps of 7 mm and 6 mm above and below the cassette storage rack 8b as seen if FIG. 59(A), the tape cassette 9b is inserted in the direction of the arrow mark g into the cassette storage rack 8b with an end thereof guided by the tapered face 44b of the cassette storage rack 8b as shown in FIG. 59(C). Thereupon, the entire hand block 11 is moved upwardly by 6 mm in the direction of the arrow mark i along the mounting shaft 133 against the weight of the hand block 11 itself. Then, the cassette holding pins 182 are moved upwardly by 6 mm in the direction of the arrow mark m as seen in FIG. 59(D) so as to effect disengagement of the tape cassette 9b. As a result, the entire hand block 11 is moved down by 6 mm in the direction of the arrow mark i' to its original position along the mounting shaft 133 by the weight of the hand block 11 itself. At the original position, the gaps of 0 mm and 6 mm are provided between the tape cassette 9b and the cassette holding pins 182 and 183, respectively.

As described so far, with the present automatic cassette changer, since the entire hand block 11 has the automatic centering function in the upward and downward directions of the arrow marks i and i', even if some relative displacement takes place between the transport mechanism 10 and any of the cassette storage racks 8a to 8d and the video tape recorders 7a and 7b, transfer of any cassette 9a, 9b, 9c or 9d to and from any of the cassette storage racks 8a and 8d and the video tape recorders 7a and 7b can be performed smoothly in due course, and accordingly, the entire system is highly reliable. Since a sufficient margin can be provided for relative vertical displacement between the transport mechanism 10 and any of the cassette storage racks 8a to 8d and the video tape recorders 7a and 7b upon transfer of the tape cassette 9a, 9b, 9c or 9d, the tolerances of the components of the system and the accuracy in assembly of the components as well as of the stopping position of the transport mechanism 10 with respect to each of the cassette storage racks 8a to 8d and the video tape recorders 7a and 7b need not be made very strict, and consequently, the overall cost of the apparatus can be reduced. Further, a special servo circuit or the like for stopping transport mechanism 10 at a precise position can be eliminated. It is only necessary for the tapered face 44b or a like formation to be provided at the opening end of each of the cassette storage racks 8a to 8d and the cassette insertion openings 15a and 15b of the video tape recorders 7a and 7b, and specifically, commercially available video tape recorders can be used, without modification rather than specially designed video tape recorders.

Figure 60A:
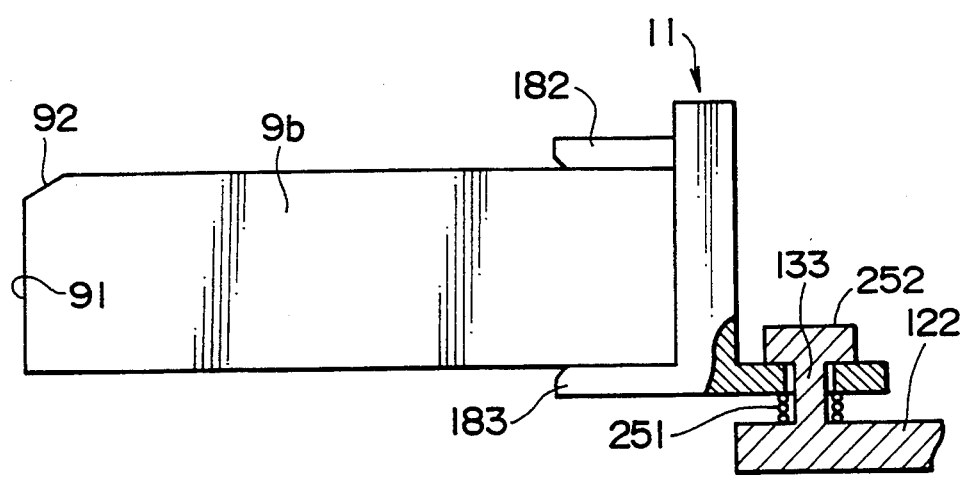
FIGS. 60(A) and 60(B) are side elevational views, partly in section, showing different modified automatic centering mechanisms of the hand block.
Figure 60B:
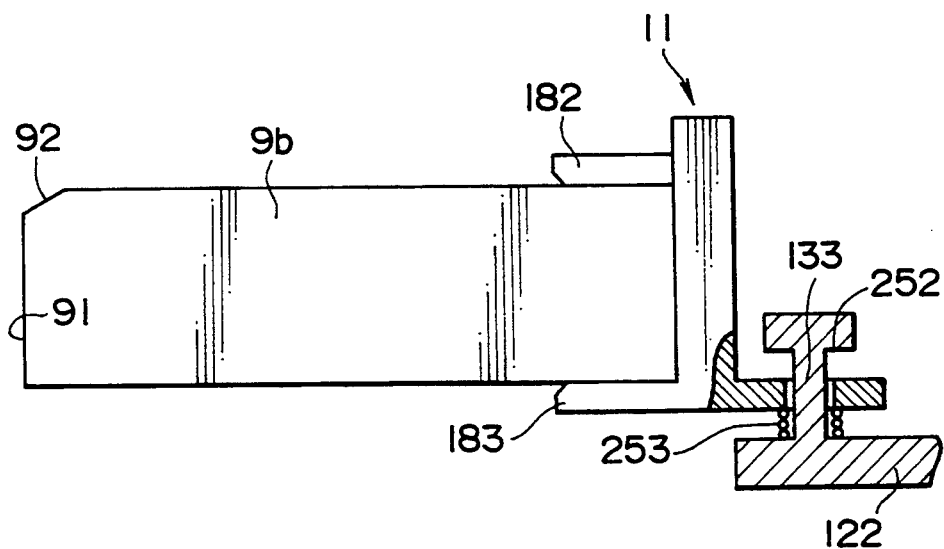

FIGS. 60(A) and 60(B) show different modifications to the automatic centering mechanism of the hand block 11 described above. In particular, in the modified automatic centering mechanism shown in FIG. 60(A), the hand block 11 is resiliently pressed from below against a flange 252 at an upper end of the mounting shaft 133 by means of a compression coil spring 251. Meanwhile, in the modified automatic centering mechanism shown in FIG. 60(B), the hand block 11 floats at a position at which the biasing force of a compression coil spring 253 is balanced with the weight of the hand block 11.

With both of the modified automatic centering mechanisms shown in FIGS. 60(A) and 60(B), since the entire hand block 11 can be moved down, upon insertion of a tape cassette 9a, 9b, 9c or 9d into any of the cassette storage racks 8a to 8d and the video tape recorders 7a and 7b, in the direction of the arrow mark i' against the compression coil spring 251 or 253 by use of the cut face 92 at the front end face 91 of the cassette 9a, 9b, 9c or 9d, a substantial margin can be assured with respect to relative displacement between the transport mechanism 10 and any of the cassette storage racks 8a to 8d and the video tape recorders 7a and 7b. Further, the modified automatic centering mechanism of FIG. 60(A) is particularly advantageous when the cassettes 8a to 8d are provided in an upright position during use. On the other hand, with the modified automatic centering mechanism of FIG. 60(B), the automatic centering operation of the entire hand block 11 in the upward direction can be performed smoothly since the entire hand block 11 can be held readily at the designed center for transfer of a tape cassette and the overall weight of the hand block 11 is supported by the compression coil spring 253.

Positive Pushing-in Mechanism for Cassette

A mechanism for positively pushing in a small tape cassette 9b will now be described with reference to FIGS. 61(A) to 61(C) and 62(A) to 62(E).

As described hereinabove in connection with FIG. 41, with the present automatic cassette changer, the opening distance H1 between the upper and lower cassette holding pins 182 and 183 of the hand block 11 can be adjusted freely and the adjustment is not restricted to stepwise movements.

Figure 61A:
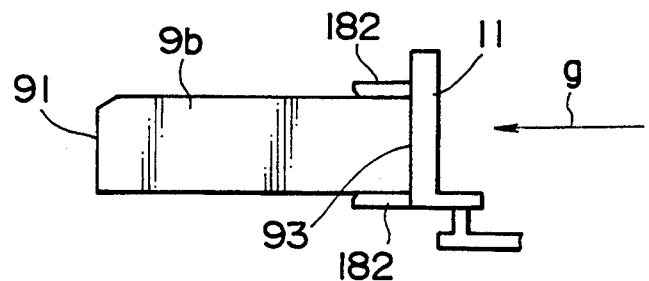
FIGS. 61(A) to 61(C) are schematic views showing a mechanism of the hand block for pushing in a cassette.
Figure 61B:
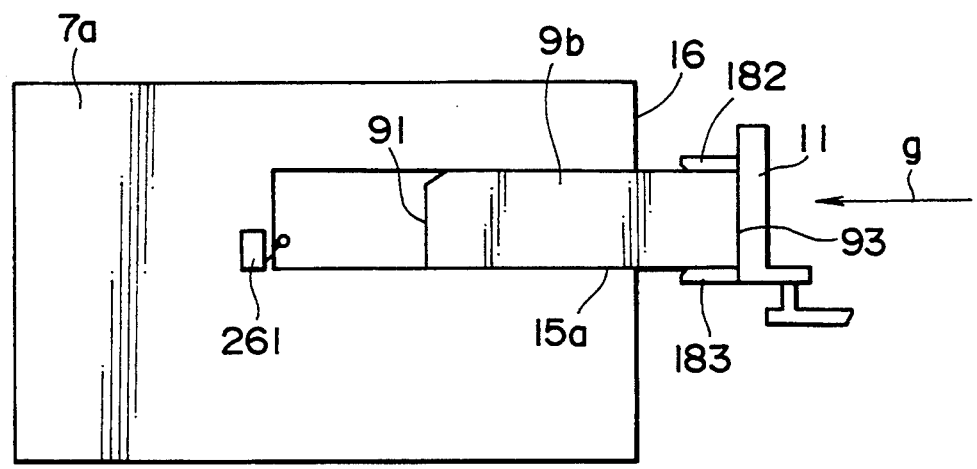
Figure 61C:
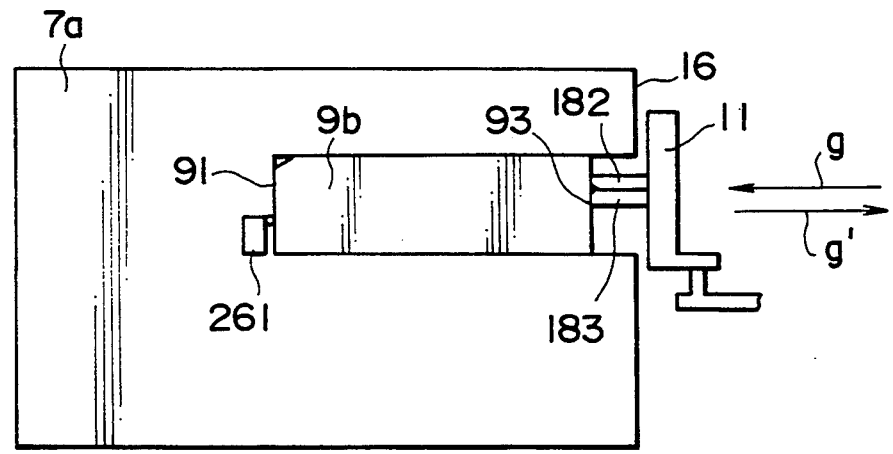
Figure 62A:
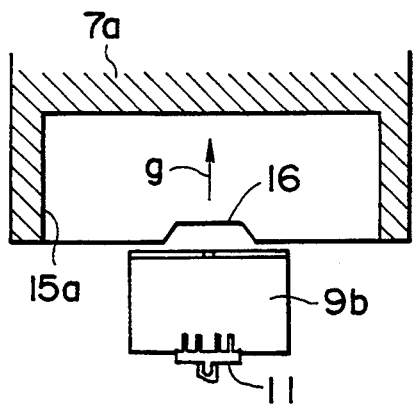
FIGS. 62(A) to 62(E) are schematic views illustrating operation of the cassette pushing mechanism shown in FIGS. 61(A) to 61(C).
Figure 62B:
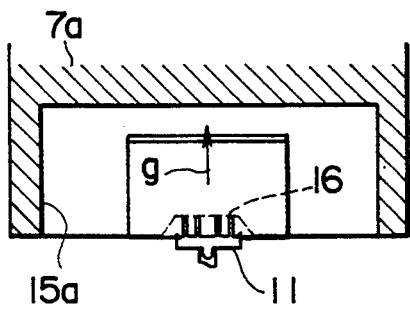
Figure 62C:
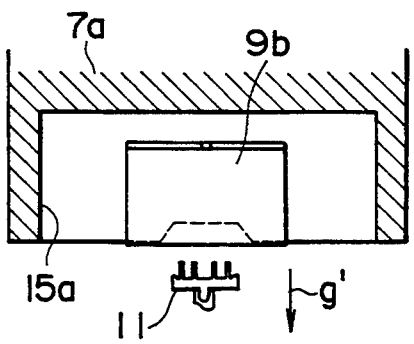
Figure 62D:
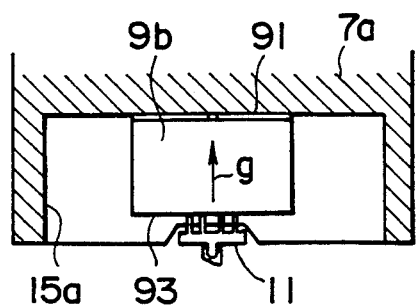
Figure 62E:
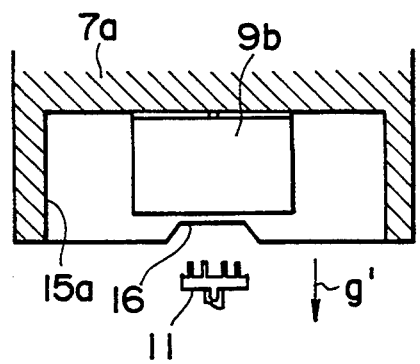

Thus, when a small size tape cassette 9b is to be inserted into a video tape recorder 7a, it is first held in its thicknesswise direction by and between the cassette holding pins 182 and 183 of the hand block 11 as shown in FIGS. 61(A) and 62(A), and in this condition, it is inserted in the direction of the arrow mark g into the cassette insertion opening 15a of the video tape recorder 7a as shown in FIGS. 61(B) and 61(B). Then, the hand block 11 is stopped at a point of time when the tape cassette 9b is inserted into the cassette insertion opening 15a to a position immediately before the position at which the ends of the cassette holding pins 182 and 183 are abutted with the front panel 16 of the video tape recorder 7a as shown in FIG. 62(B). Next, the cassette holding pins 182 and 183 are opened so as to be disengaged from the tape cassette 9b as shown in FIG. 62(B), whereafter the hand block 11 is retracted once in the direction of the arrow mark g'. Subsequently, the opening distance H1 between the cassette holding pins 182 and 183 is reduced to an amount less than the thickness of the tape cassette 9b while the transport mechanism 10 is moved upwardly to set the cassette holding pins 182 and 183 to a vertical position within the thickness of the tape cassette 9b as shown in FIG. 61(C). Then, the hand block 11 is moved in the direction of the arrow mark g again so that the rear end face 93 of the tape cassette 9b is pushed in the direction of the arrow mark g by the cassette holding pins 182 and 183 to insert the tape cassette 9b fully until the front end face 91 of the tape cassette 9b actuates the cassette insertion detection switch 261 in the video tape recorder 7a as shown in FIGS. 61(C) and 62(D). Thereafter, the hand block 11 is retracted in the direction of the arrow mark g' to remove the cassette holding pins 182 and 183 completely from within the video tape recorder 7a as seen in FIG. 62(E).

Since the positive pushing in mechanism for a tape cassette 9b is provided, even where the length of the cassette holding pins 182 and 183 is increased to some degree in order to allow a large size tape cassette 9d to be held securely therebetween, a small tape cassette 9b can always be reliably inserted into a deep position within the video tape recorder 7a, that is, to a position at which the cassette insertion detecting switch 261 in the video tape recorder 7a can be reliably actuated, without causing the cassette holding pins 182 and 183 to interfere with the front panel 16 or some other element of the video tape recorder 7a. Particularly with a video tape recorder 7a on which both small and large tape cassettes 9b and 9d can be used, since the front end face 91 of a tape cassette 9b or 9d selectively inserted into the video tape recorder 7a must necessarily be arranged in the same plane and consequently the cassette insertion detection switch 261 is disposed at a very deep position in the video tape recorder 7a, the positive pushing in mechanism is particularly effective. Further, since a tape cassette 9b is pushed into a video tape recorder 7a making use of the cassette holding pins 182 and 183 which are provided for holding tape cassette therebetween, a special mechanism for mechanically taking a tape cassette into the video tape recorder 7a and a driving apparatus for the mechanism can be omitted, and consequently, reduction in cost can be achieved.

It is to be noted that the present invention is not limited to an automatic changer for video tape cassettes but can be applied to automatic changers for various types of cassettes in which various other record media in the form of a tape or disk are accommodated.

Having now fully described the invention, it will be apparent to one of ordinary skill in the art that many changes and modifications can be made thereto without departing from the spirit and scope of the invention as set forth herein.

What is claimed is:

1. A compact arrangement of an automatic cassette changer comprising a frame having mounted therein a plurality of components Of said changer at respective vertical positions, said components mounted in said frame comprising:

a cassette storage rack adapted for storing plural mutually different types of cassettes having a record medium accommodated therein, said cassette storage rack comprising a first cassette rack unit of a first type having a first plurality of cassette storage bins of a first size for accommodating a first type of said plural types of cassettes and a second cassette rack unit of a second type having a second plurality of cassette storage bins of a second size for accommodating a second type of said plural types of cassettes, said first and second cassette rack units being dimensioned so as to have substantially the same height and width so that said rack units are exchangeable within said frame, each of said cassette rack units having a first type detecting section representative of the type of the rack unit; and a plurality of recording and/or reproducing apparatus each provided for selectively recording and/or reproducing a signal on or from the record medium in at least one of said plural types of cassettes, said plurality of recording and/or reproducing apparatus including at least two different types of recording and/or reproducing apparatus each having a respective different sized aperture for receiving a respective type of said plural types of cassettes, each of said recording and/or reproducing apparatus having a second type detecting section representative of the type of the recording and/or reproducing apparatus;

said changer further comprising a transport mechanism for transporting cassettes of said mutually different types in a substantially vertical direction between said cassette storage rack and said recording and/or reproducing apparatus, said transport mechanism having a type detecting sensor for reading the first or second type detecting section to control operation of said transport mechanism.

2. An automatic cassette changer, comprising:
a plurality of cassettes in which record media are individually accommodated;
a cassette storage rack having a plurality of bins for storing said cassettes therein;
a plurality of recording and/or reproducing apparatus for selectively recording and/or reproducing said cassettes; and
a transport mechanism for selectively transporting said cassettes between said bins and said recording and/or reproducing apparatus;
said storage rack and said plurality of recording and/or reproducing apparatus being arranged so as to form a vertical column;
said transport mechanism having a main body that travels in a vertical direction relative to said storage rack and said recording and/or reproducing apparatus, and a hand block for holding a selected one of said cassettes and inserting or removing the selected cassette into or from a selected one of said bins and said recording and/or reproducing apparatus;
said hand block being mounted on said main body for movement relative to said main body in a first direction and in a second direction perpendicular to the first direction, the first direction being a direction in which said hand block inserts or removes the selected cassette into or from the selected one of said bins and said recording and/or reproducing apparatus, said first and second directions being in a horizontal plane; said main body being located in the first direction relative to said vertical column.

3. An automatic cassette changer according to claim 2, wherein said transport mechanism includes a slider disposed for linear movement in the second direction and a pivotal arm mounted at an end thereof for pivotal motion on said slider and having said hand block mounted at the other end thereof, said pivotal arm being pivoted in the first direction with respect to said slider.

4. An automatic cassette changer according to claim 3, wherein said pivotal arm includes turning motion controlling means for controlling said hand block to turn in the direction opposite to the direction of pivotal motion of said pivotal arm in synchronism with pivotal motion of said pivotal arm so that said hand block is maintained in a constant orientation during pivotal motion of said pivotal arm.

5. An automatic cassette changer according to claim 3, wherein said pivotal arm is pivoted between a first position in which said pivotal arm extends in said first direction from said slider towards said vertical column and a second position in which said pivotal arm extends in said first direction from said slider and away from said vertical column.

6. An automatic cassette changer, comprising:
a plurality of cassettes in which record media are individually accommodated;
a cassette storage rack having a plurality of bins for storing said cassettes therein;
a plurality of recording and/or reproducing apparatus for selectively recording and/or reproducing said cassettes; and
a transport mechanism for selectively transporting said cassettes between said bins and said recording and/or reproducing apparatus;
said transport mechanism including a hand block for holding a selected one of said cassettes in a thicknesswise direction of the selected cassette and driving means for driving said hand block to move in a direction in which the selected cassette is inserted into or removed from a selected one of said bins and said recording and/or reproducing apparatus;
said hand block being supported for linear movement in the thicknesswise direction of the selected cassette with respect to said driving means.

7. An automatic cassette changer, comprising:
a plurality of cassettes in which record media are individually accommodated;
a cassette storage rack having a plurality of bins for storing said cassettes therein;
a plurality of recording and/or reproducing apparatus for selectively recording and/or reproducing said cassettes; and
a transport mechanism for selectively transporting said cassettes between said bins and said recording and/or reproducing apparatus;
said transport mechanism including a hand block for holding a selected one of said cassettes in a thicknesswise direction of the selected cassette to insert or remove the selected cassette into or from a selected one of said bins and said recording and/or reproducing apparatus;
said hand block including a pair of upper and lower holding elements disposed in the thicknesswise direction of the selected cassette for holding the selected cassette therebetween and a cassette inclination sensor for detecting an inclination of the selected cassette with respect to said hand block, said inclination to be detected being within a horizontal plane.

8. An automatic cassette changer according to claim 7, wherein said cassette inclination sensor comprises a plurality of sensor elements each for detecting a respective portion of a rear face of said selected cassette, said portions of said rear face being spaced apart from each other in said horizontal plane.

9. An automatic cassette changer, comprising:
a plurality of cassettes in which record media are individually accommodated; ·
a cassette storage rack having a plurality of bins for storing said cassettes therein;
a plurality of recording and/or reproducing apparatus for selectively recording and/or reproducing said cassettes; and
a transport mechanism for selectively transporting said cassettes between said bins and said recording and/or reproducing apparatus;
said transport mechanism including a hand block for holding a selected one of said cassettes in a thicknesswise direction of the selected cassette to insert or remove the selected cassette into or from a selected one of said bins and said recording and/or reproducing apparatus;

said hand block including a pair of upper and lower holding elements disposed in the thicknesswise direction of the selected cassette for holding the selected cassette therebetween, a feed screw for controlling opening and closing movement of said cassette holding elements, drive means for rotationally driving said feed screw, and a torque limiter for controlling the force by which the selected cassette is to be held between said cassette holding elements;

said drive means comprising an intermediate shaft and said torque limiter comprising compliant means associated with said intermediate shaft for selectively transmitting a rotational force to said intermediate shaft in such a manner as to limit a torque with which said feed screw is driven.

10. An automatic cassette changer, comprising:
a plurality of cassettes in which record media are individually accommodated;
a cassette storage rack having a plurality of bins for storing said cassettes therein;
a plurality of recording and/or reproducing apparatus for selectively recording and/or reproducing said cassettes; and
a transport mechanism for selectively transporting said cassettes between said bins and said recording and/or reproducing apparatus;
said transport mechanism including a hand block for holding a selected one of said cassettes in a thicknesswise direction of the selected cassette to insert or remove the selected cassette into or from a selected one of said bins and said recording and/or reproducing apparatus;
said hand block including a pair of upper and lower holding elements disposed in the thicknesswise direction of the selected cassette for holding the selected cassette therebetween;
said transport mechanism further comprising opening distance controlling means for controlling the opening distance between said cassette holding elements in accordance with information concerning the thickness of the selected cassette.

11. An automatic cassette changer according to claim 10, wherein said plurality of cassettes comprises a plurality of types of cassettes having mutually different thickness dimensions, and the opening distance between said cassette holding elements is varied by said opening distance controlling means in accordance with information representing the thickness of said selected cassette.

12. An automatic cassette changer, comprising:
a plurality of cassettes in which record media are individually accommodated;
a cassette storage rack having a plurality of bins for storing said cassettes therein;
a plurality of recording and/or reproducing apparatus for selectively recording and/or reproducing said cassettes;
a self-propelled transport mechanism for selectively transporting said cassettes between said bins and said recording and/or reproducing apparatus, said transport mechanism carrying a motor for driving said transport mechanism to travel in a transport direction relative to said bins and said recording and/or reproducing apparatus;

a slide rail constituting one of a pair of travel guides for said transport mechanism for restricting the movement of said transport mechanism in a first direction in which said transport mechanism inserts or removes a selected one of said cassettes into a selected one of said bins and said recording and/or reproducing apparatus and a second direction perpendicular to the first direction, said first and second directions being in a plane that is perpendicular to said transport direction, said slide rail having a substantially channel-shaped cross section for slidably accommodating therein a sliding element for movement of said sliding element in said transport direction, said sliding element being mounted on said transport mechanism; and a fixed rail constituting the other travel guide for said transport mechanism for cooperating with a plurality of guide rollers mounted on said transport mechanism to restrict the movement of said transport mechanism in the first direction.

13. An automatic cassette changer according to claim 12, further comprising a plurality of balls accommodated within a slot in said sliding element and also within a guide groove in said slide rail for cooperating with said slot and said guide groove to restrict movement of said transport mechanism in at least one of said first and second directions.

14. An automatic cassette changer, comprising:
a plurality of cassettes which have a plurality of different sizes and in which record media are individually accommodated;
a cassette storage rack having a plurality of bins for storing said cassettes therein;
a plurality of recording and/or reproducing apparatus for selectively recording and/or reproducing said cassettes; and
a transport mechanism for selectively transporting said cassettes between said bins and said recording and/or reproducing apparatus;
said transport mechanism including a main body, and a hand block for holding a selected one of said cassettes, said hand block being mounted on said main body for movement relative to said main body in a first direction for inserting or removing the selected cassette to or from a selected one of said bins and said recording and/or reproducing apparatus, said transport mechanism also including a pair of cassette slide guides fixedly mounted on said main body on the opposite sides of the range of movement of said hand block in a second direction perpendicular to the first direction for supporting the opposite ends of the selected cassette when the selected cassette has a larger one of the different sizes.

15. A compact arrangement of an automatic cassette changer comprising a frame having mounted therein a plurality of components of said changer at respective vertical positions, said components mounted in said frame comprising:
a cassette storage rack adapted for storing plural mutually different types of cassettes having a record medium accommodated therein, said cassette storage rack comprising a plurality of cassette rack units each including a plurality of cassette storage bins of the same size and a first type detecting section representative of the type of the rack unit, said plurality of bins comprising respective mutually different sized bins corresponding to said plural different types of cassettes; and a plurality of recording and/or reproducing apparatus each provided for selectively recording and/or reproducing a signal on or from the record medium in at least one of said plural types of cassettes, said plurality of recording and/or reproducing apparatus including at least two different types of recording and/or reproducing apparatus each having a respective different sized aperture for receiving a respective type of said plural types of cassettes, each of said recording and/or reproducing apparatus having a second type detecting section representative of the type of the recording and/or reproducing apparatus;

said changer further comprising a transport mechanism for transporting cassettes of said mutually different types in a substantially vertical direction between said cassette storage rack and said recording and/or reproducing apparatus and having a type detecting sensor for reading the first or second type detecting section to control operation of said transport mechanism.

16. An automatic cassette changer according to claim 15, wherein all of said cassette rack units are dimensioned so as to have substantially the same height and width so that said rack units are exchangeable within said frame.

17. An automatic cassette changer, comprising:

a plurality of cassettes in which record media are individually accommodated and comprising cassettes having a plurality of sizes including at least a smaller size and a larger size;

a cassette storage rack having a plurality of bins for storing said cassettes therein;

a plurality of recording and/or reproducing apparatus for selectively recording and/or reproducing said cassettes; and a transport mechanism for selectively transporting said cassettes between said bins and said recording and/or reproducing apparatus;

said transport mechanism including a hand block for holding a selected one of said cassettes to insert or remove the selected cassette into or from a selected one of said bins and said recording and/or reproducing apparatus by means of a pair of cassette holding elements provided in a thicknesswise direction of the selected cassette on said hand block, an opening and closing mechanism for controlling the opening distance between said cassette holding elements within a range of between distances that are greater and smaller than the thickness of said cassettes, and controlling means for controlling said hand block such that, when the selected cassette held between said cassette holding elements is to be inserted into a selected one of said recording and/or reproducing apparatus, said hand block first inserts the selected cassette held in its thicknesswise direction to a first position in the selected recording and/or reproducing apparatus, then reduces the opening distance between said cassette holding elements so that said distance is smaller than the thickness of the selected cassette and finally pushes in the selected cassette to a second position deeper than the first position in the selected recording and/or reproducing apparatus by means of said cassette holding elements only if said selected cassette is of said smaller size.

* * * * *